US009189144B2

(12) United States Patent
Maunder

(10) Patent No.: US 9,189,144 B2
(45) Date of Patent: Nov. 17, 2015

(54) MULTI-TOUCH GESTURE-BASED INTERFACE FOR NETWORK DESIGN AND MANAGEMENT

(75) Inventor: Richard Maunder, Crassier (CH)

(73) Assignee: CISCO TECHNOLOGY, INC., San Jose, CA (US)

(*) Notice: Subject to any disclaimer, the term of this patent is extended or adjusted under 35 U.S.C. 154(b) by 297 days.

(21) Appl. No.: 13/526,090

(22) Filed: Jun. 18, 2012

(65) Prior Publication Data
US 2013/0335339 A1 Dec. 19, 2013

(51) Int. Cl.
G06F 3/0488 (2013.01)
G06F 3/0486 (2013.01)
G06F 3/0481 (2013.01)

(52) U.S. Cl.
CPC ............ *G06F 3/0488* (2013.01); *G06F 3/0486* (2013.01); *G06F 3/04817* (2013.01); *G06F 2203/04808* (2013.01)

(58) Field of Classification Search
CPC . G06F 3/04817; G06F 3/0486; G06F 3/0488; G06F 17/50; G06F 17/5009; G06F 2203/04808; G06F 2217/06; G06F 2303/048; G06F 3/04812; H04W 16/18; H04L 41/22; H04L 67/36
USPC .................................. 345/173–178; 715/769
See application file for complete search history.

(56) References Cited

U.S. PATENT DOCUMENTS

| 5,546,527 | A  | * | 8/1996  | Fitzpatrick et al. | 715/769 |
| 5,801,699 | A  | * | 9/1998  | Hocker et al. | 715/837 |
| 5,907,324 | A  | * | 5/1999  | Ogura et al. | 715/764 |
| 7,345,675 | B1 | * | 3/2008  | Minakuchi et al. | 345/173 |
| 7,475,351 | B1 | * | 1/2009  | Johnson | 715/736 |
| 2006/0136833 | A1 | * | 6/2006 | Dettinger et al. | 715/769 |
| 2007/0064004 | A1 | * | 3/2007 | Bonner et al. | 345/442 |
| 2007/0130547 | A1 | * | 6/2007 | Boillot | 715/863 |
| 2007/0208840 | A1 | * | 9/2007 | McConville et al. | 709/223 |
| 2008/0042978 | A1 | * | 2/2008 | Perez-Noguera | 345/168 |
| 2009/0228842 | A1 | * | 9/2009 | Westerman et al. | 715/863 |
| 2009/0276701 | A1 | * | 11/2009 | Nurmi | 715/702 |
| 2009/0307589 | A1 | * | 12/2009 | Inose et al. | 715/702 |
| 2010/0058182 | A1 | * | 3/2010 | Jung | 715/702 |
| 2010/0122192 | A1 | * | 5/2010 | Hanna | 715/765 |
| 2011/0134047 | A1 | * | 6/2011 | Wigdor et al. | 345/173 |
| 2014/0082539 | A1 | * | 3/2014 | Tjissen | 715/770 |

OTHER PUBLICATIONS youtube.com, Procedural Compositing with Batch (part 2) video, http://www.youtube.com/watch?v=gzzsr2MosBY, published Apr. 13, 2012, 2 pages.
Wiki Help, "Home Flame Premium English 2012—Flame Procedural Compositing with Batch Processing Assembling a Process Tree Connecting Nodes". Dated 2012, 12 pages.
Vimeo, "Edge Blur with Custom Sliders", Avid DS Tutorial, dated 2012, http://vimeo.com/21473943, 2 pages.

* cited by examiner

*Primary Examiner* — Alexander Eisen
*Assistant Examiner* — Sanjiv D Patel
(74) *Attorney, Agent, or Firm* — Hickman Palermo Becker Bingham LLP; Daniel E. Miller

(57) ABSTRACT

Methods, computing devices, and computer-readable media are provided for interpreting gestures and triggering actions on a graph when the gestures are detected. The triggered actions may include the addition or deletion of nodes, connections between nodes, or connections between node ports; the expansion or collapse of a set of nodes; or the copying of nodes. The input may describe an action of selecting, dragging, holding, flicking, shaking, pinching, unpinching, or spinning a graphical object such as a node or a connection. Gesture interpretation logic determines whether the input matches a stored or known gesture. If the input matches a gesture, then the gesture interpretation logic may perform an action mapped to the gesture instead of or in addition to the normal action that would otherwise be caused by each individual input.

26 Claims, 64 Drawing Sheets

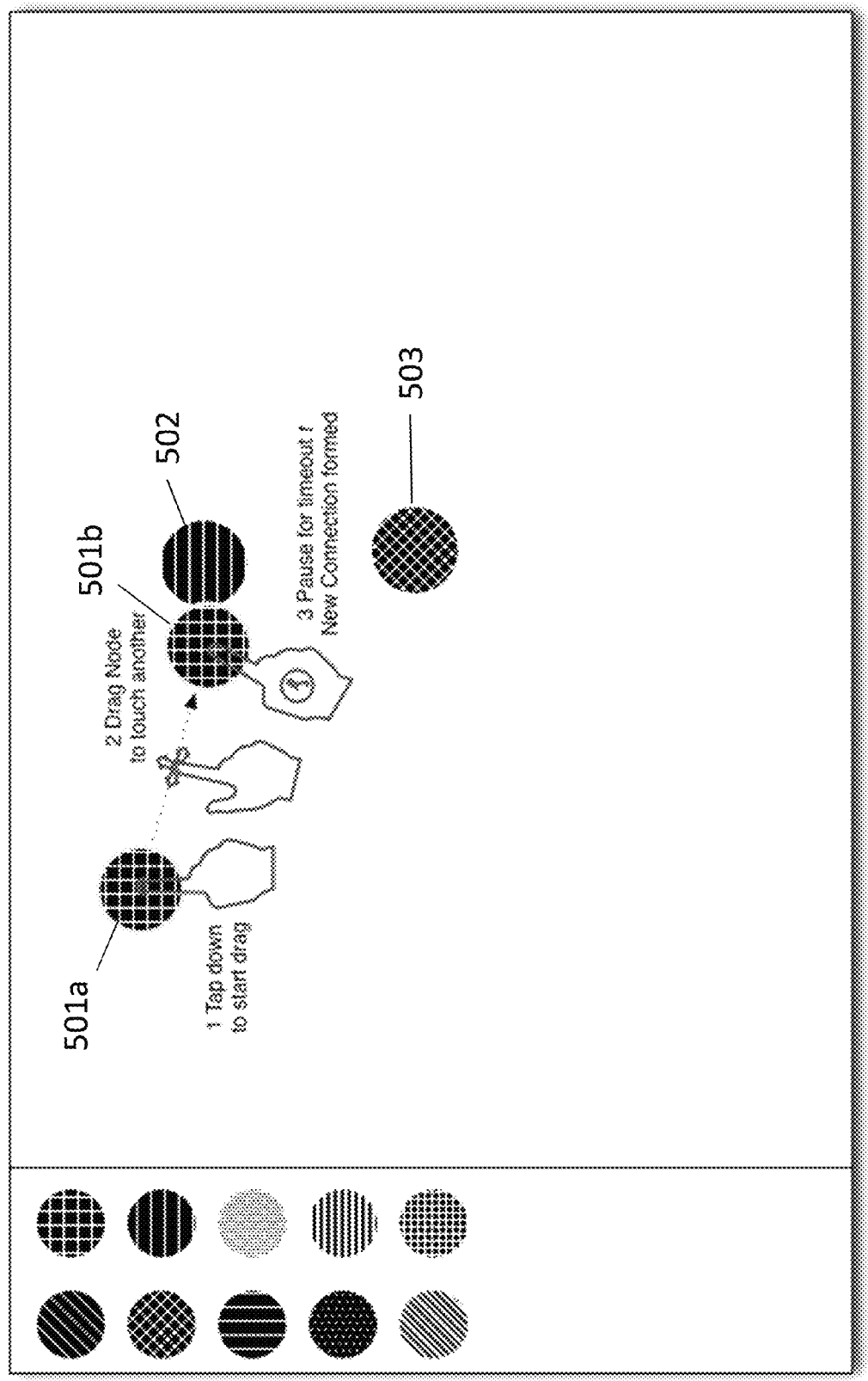

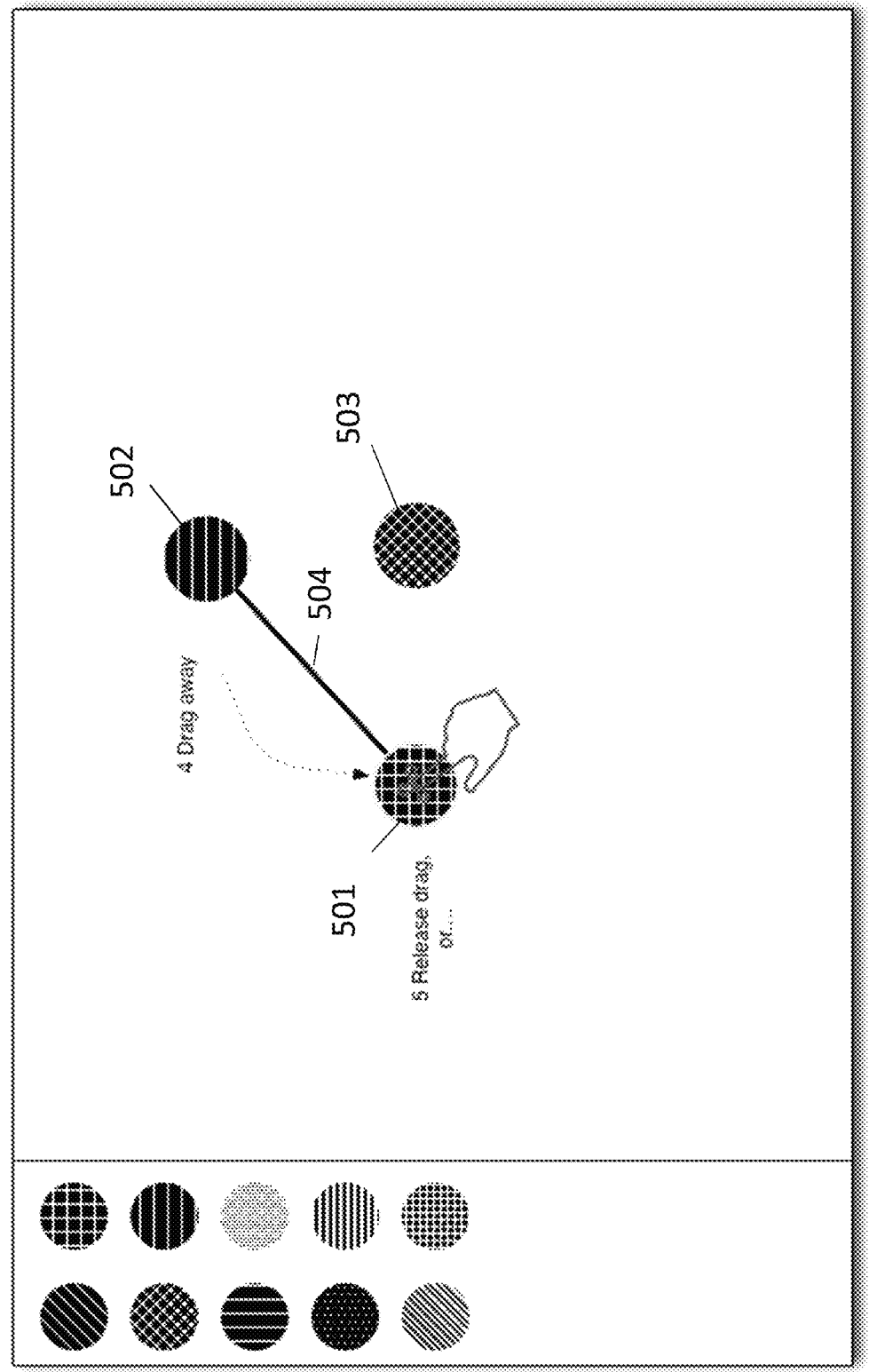

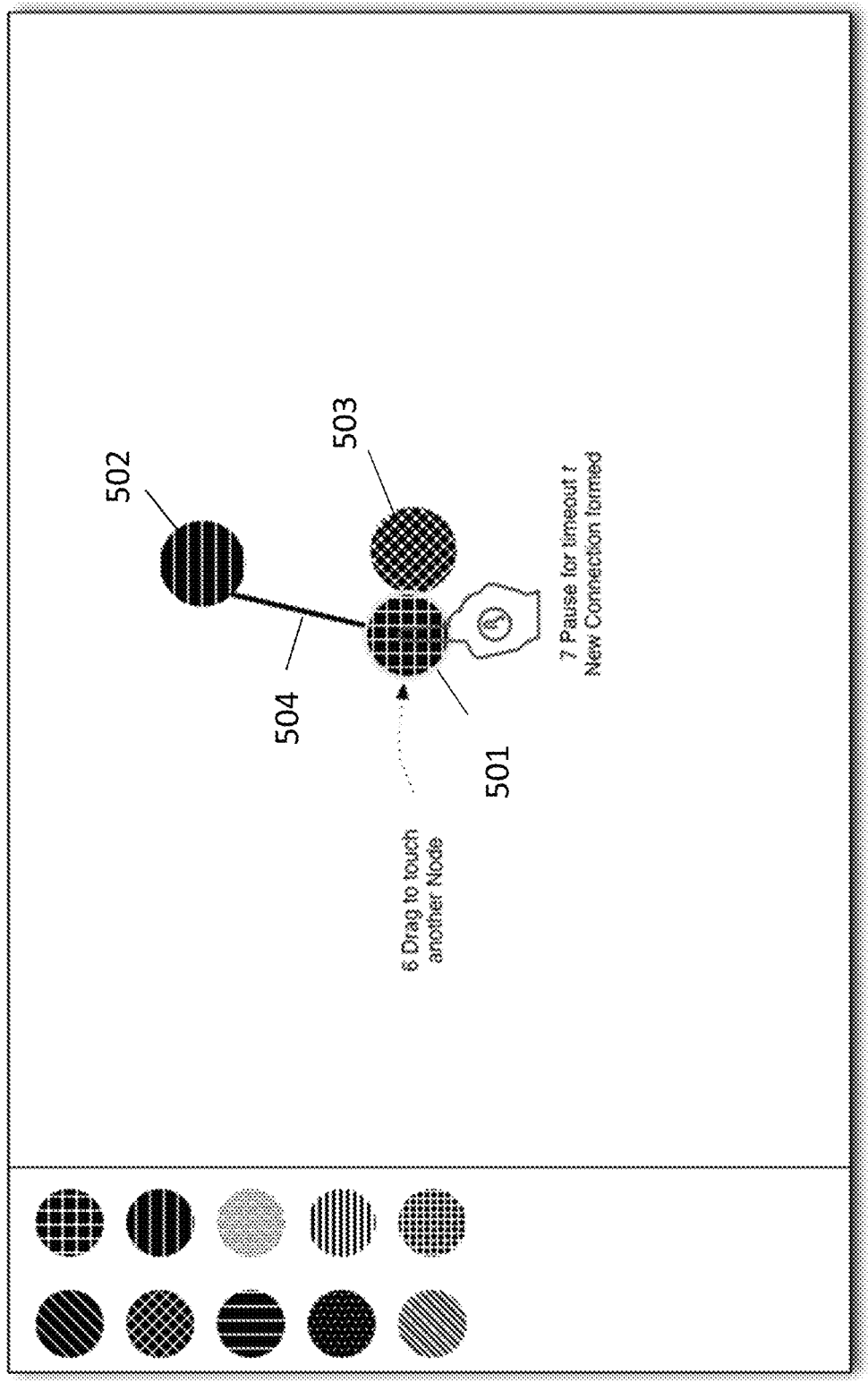

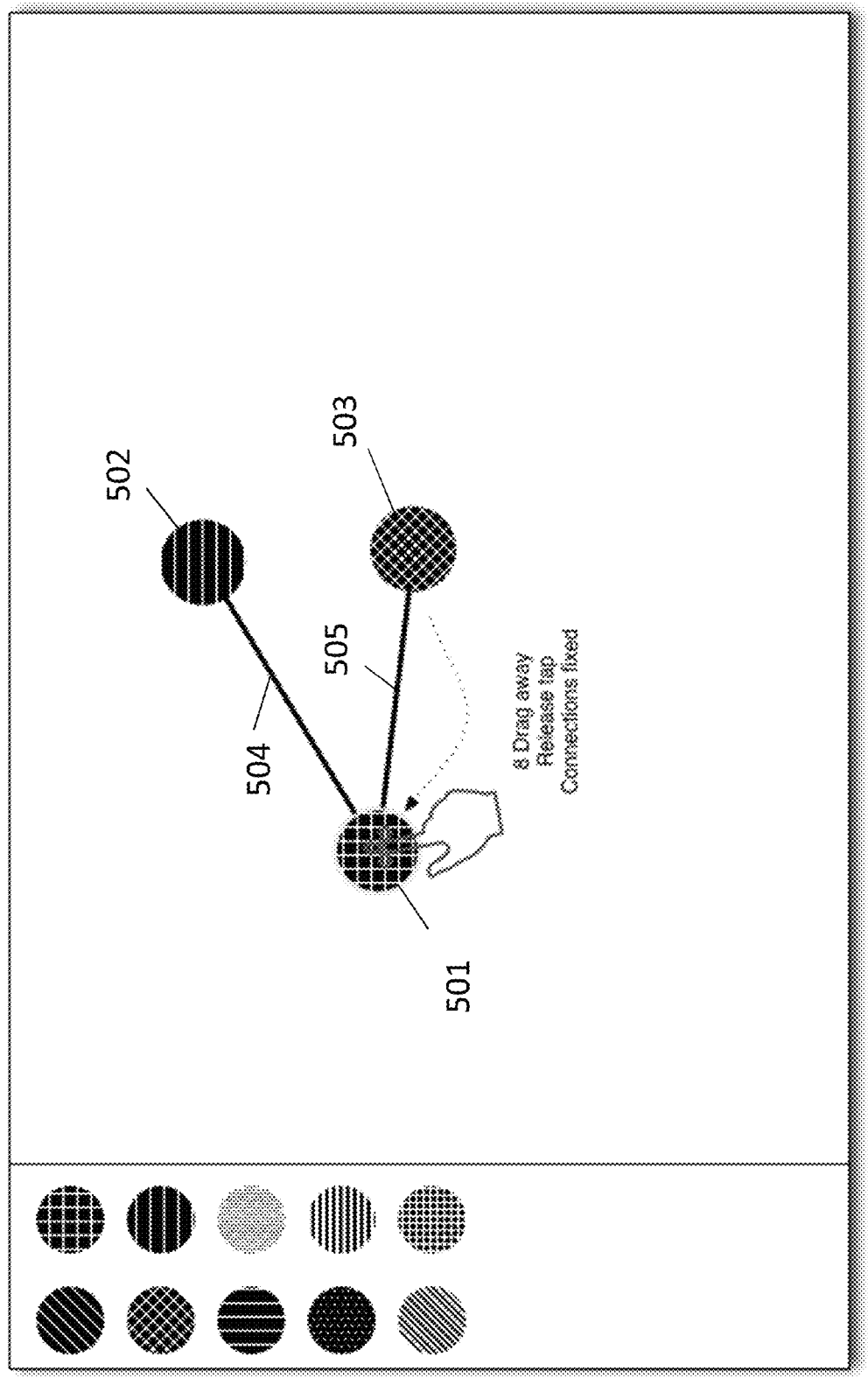

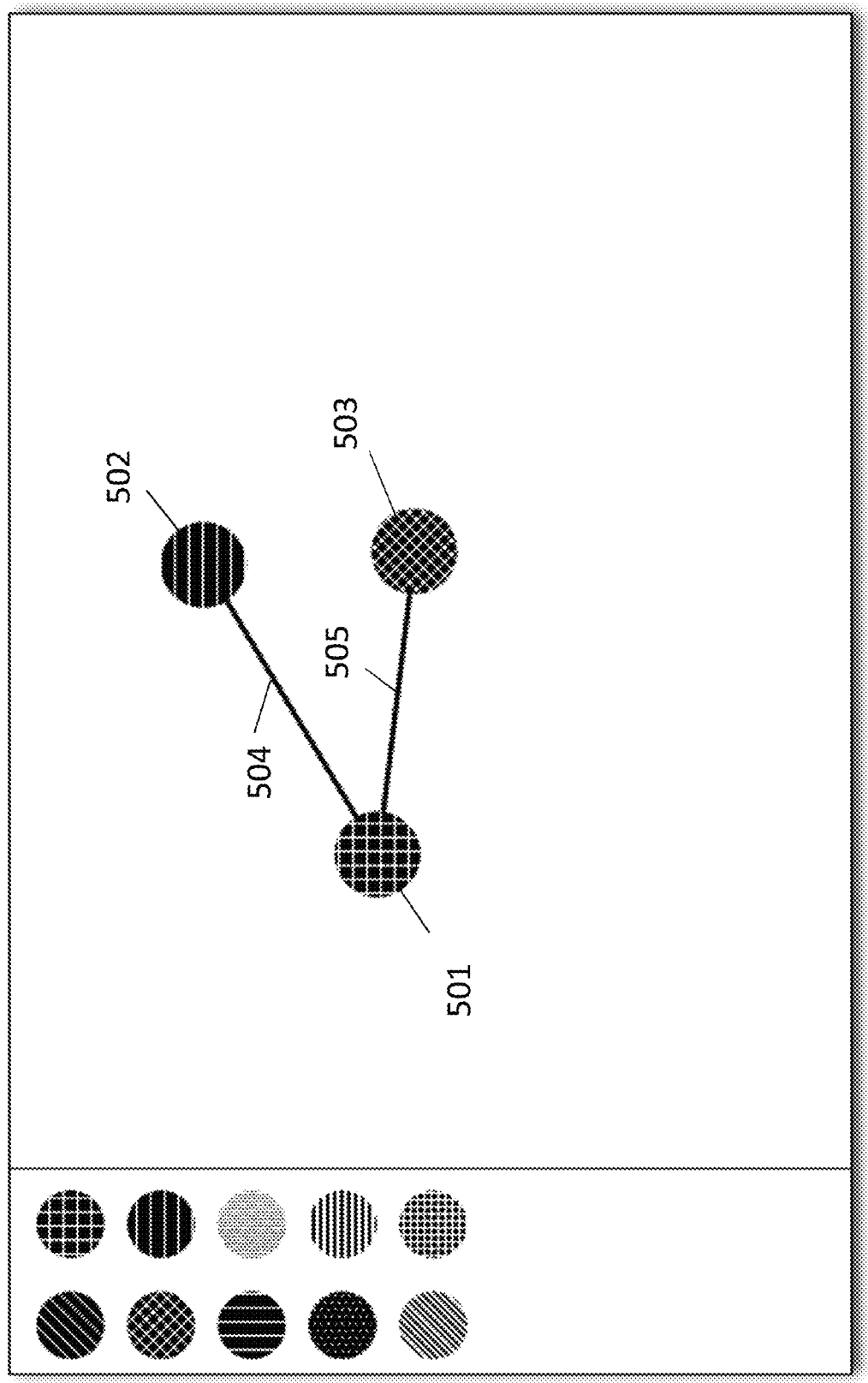

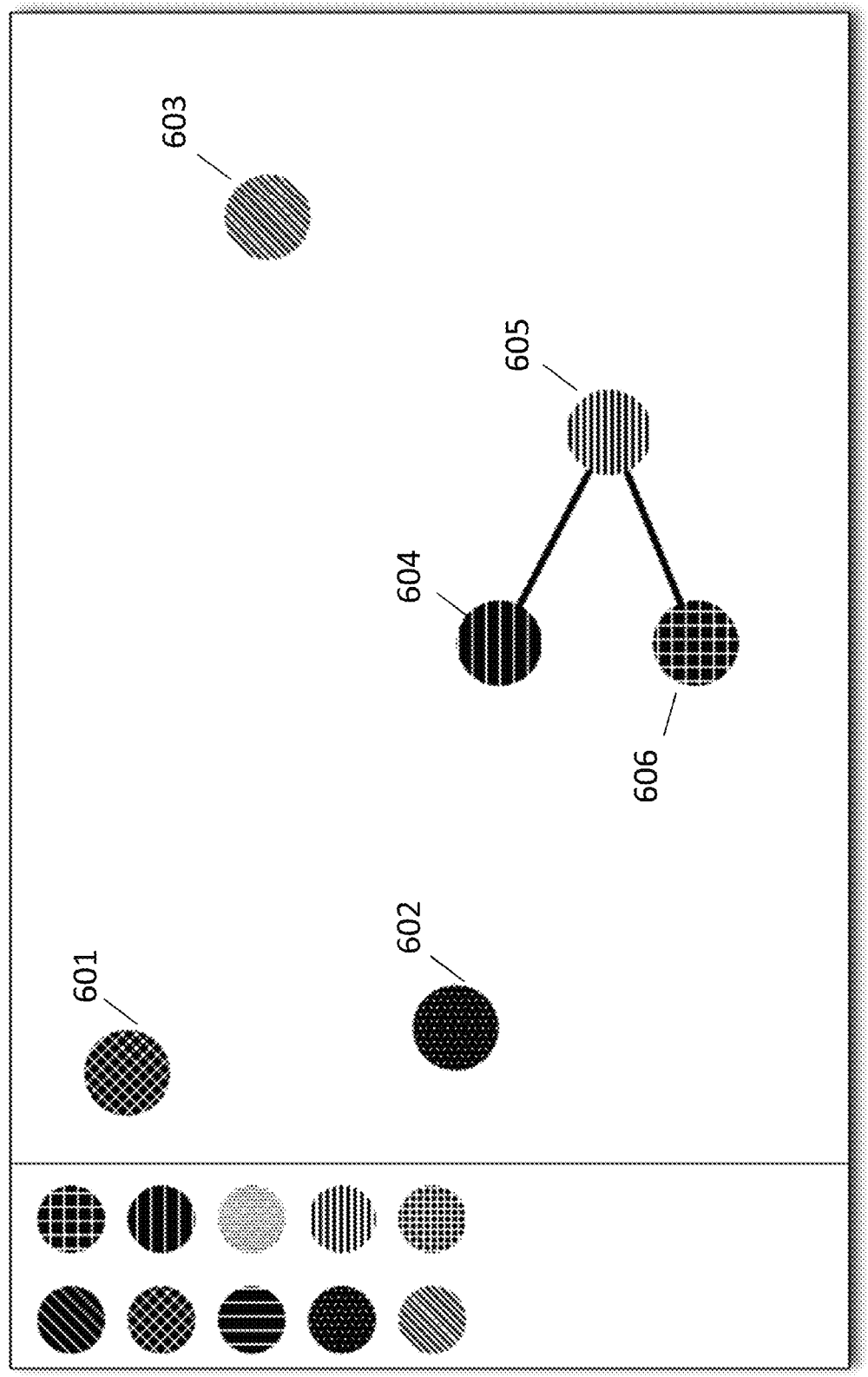

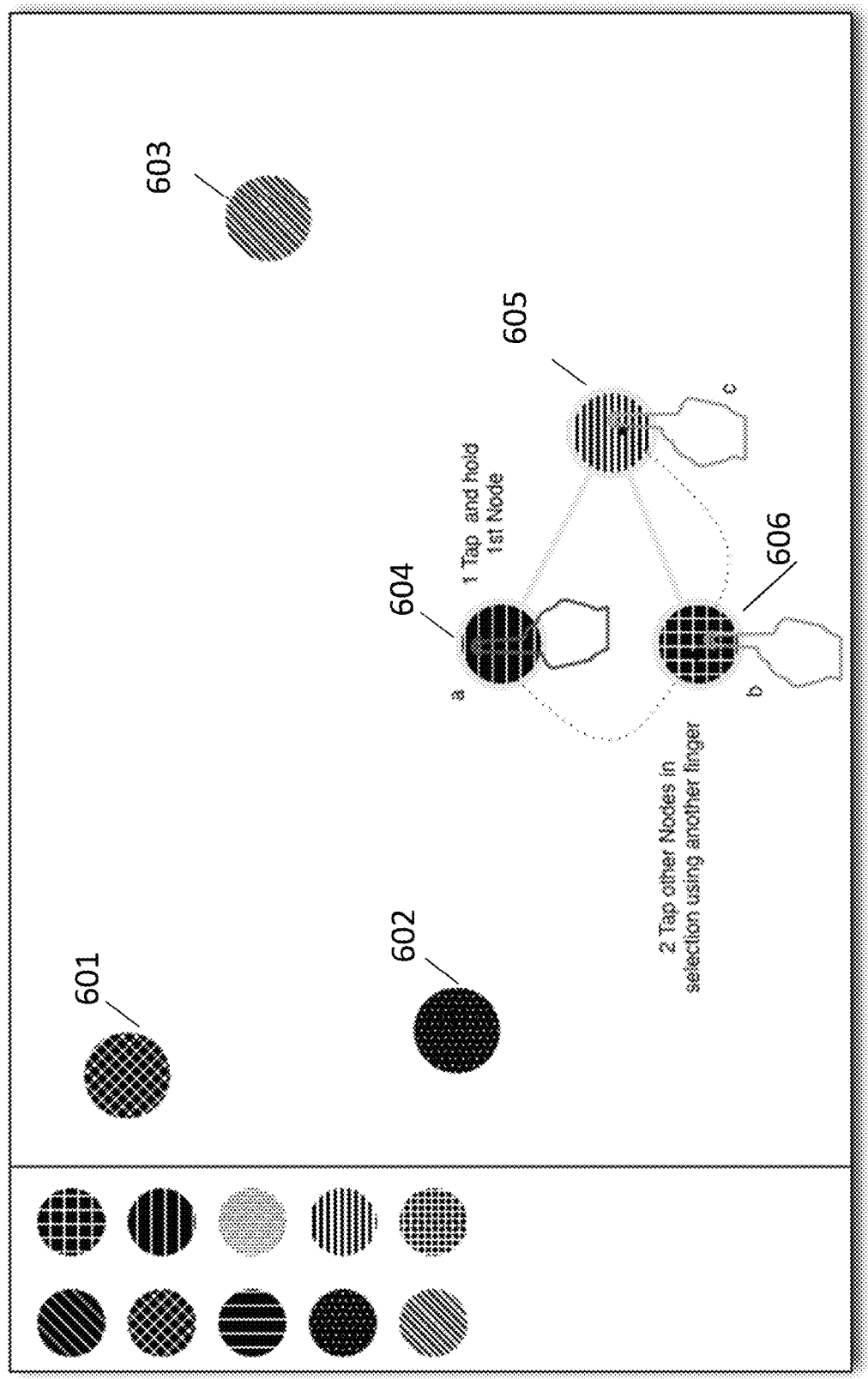
FIG. 6B: Connecting Subtrees

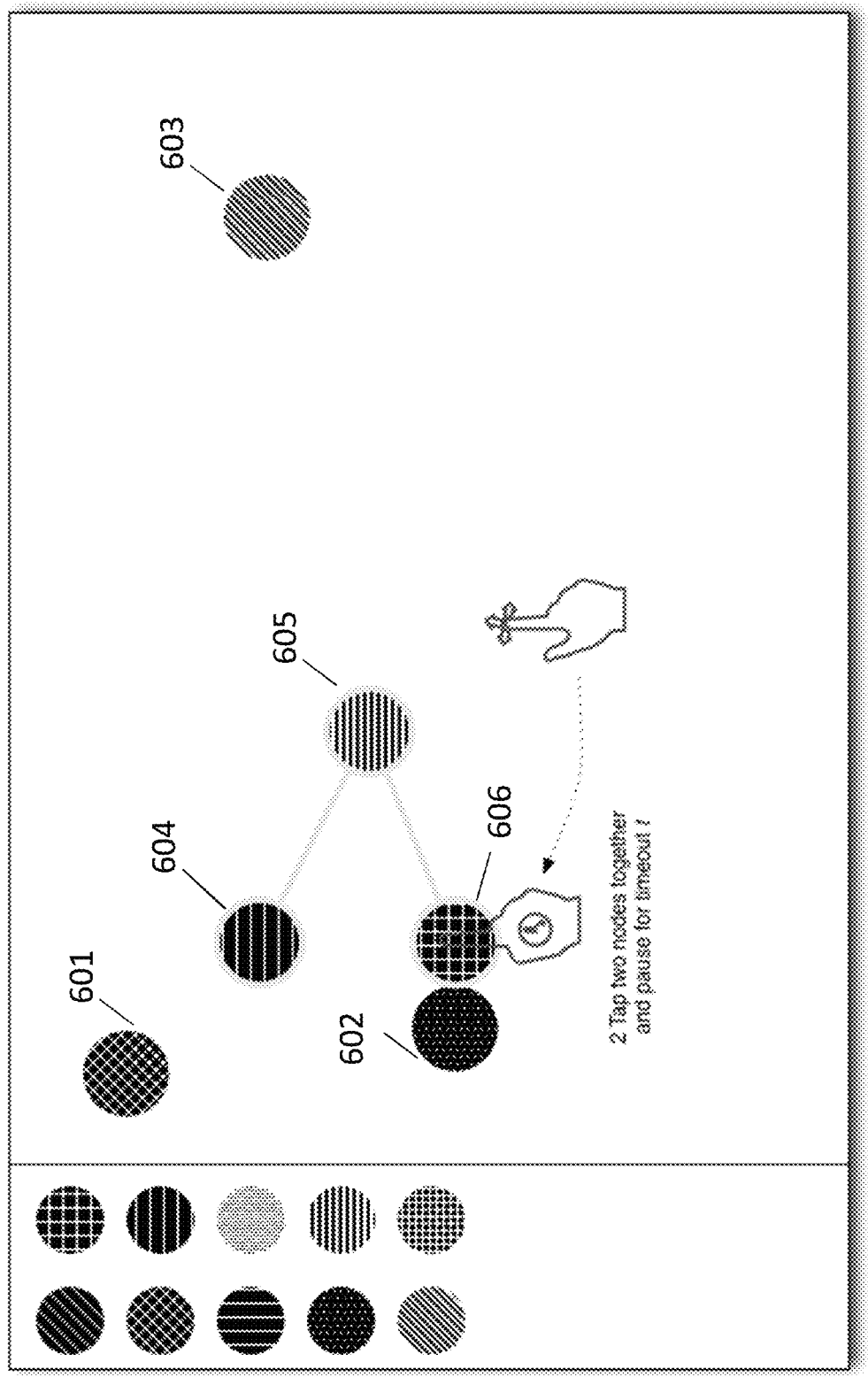

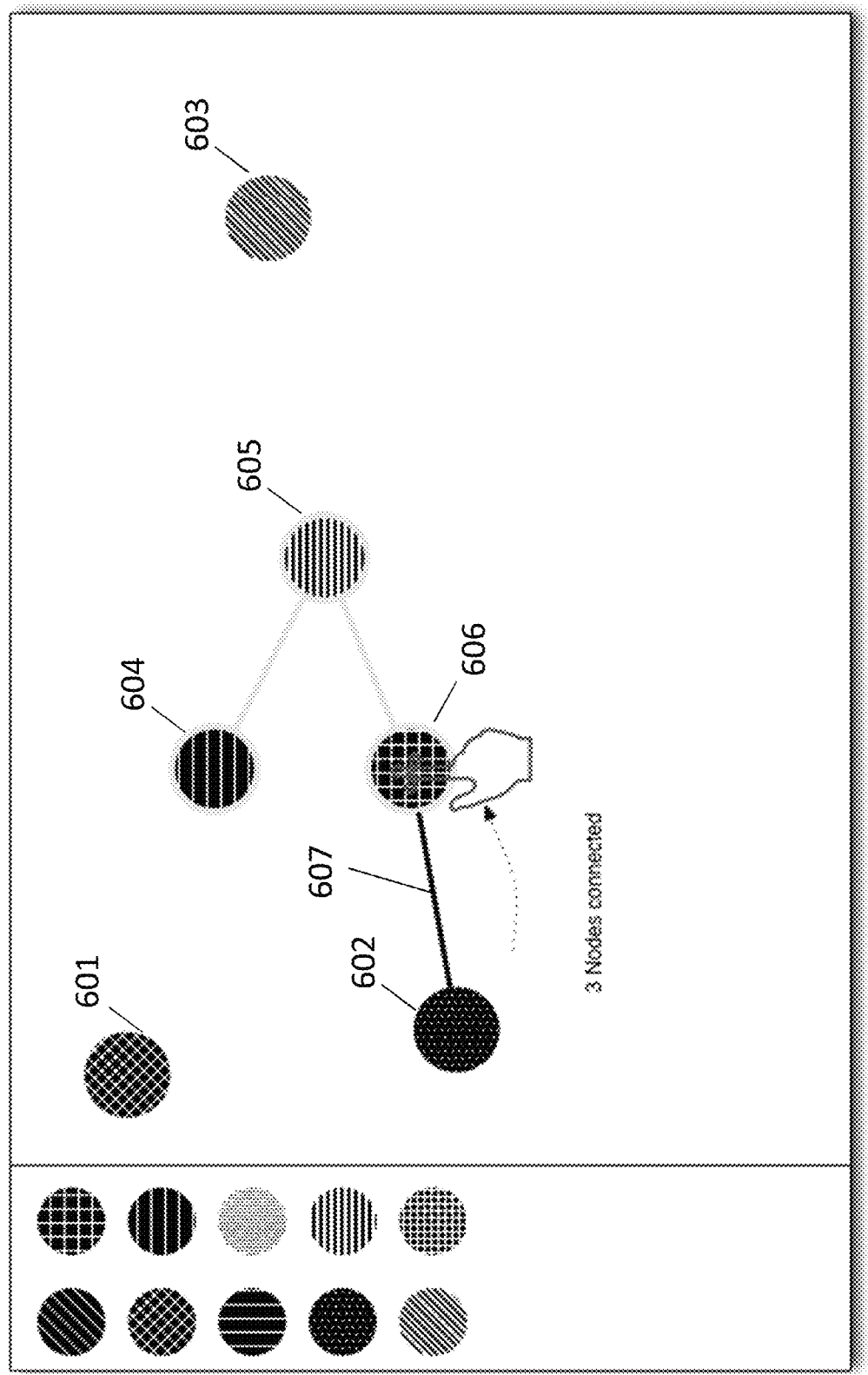

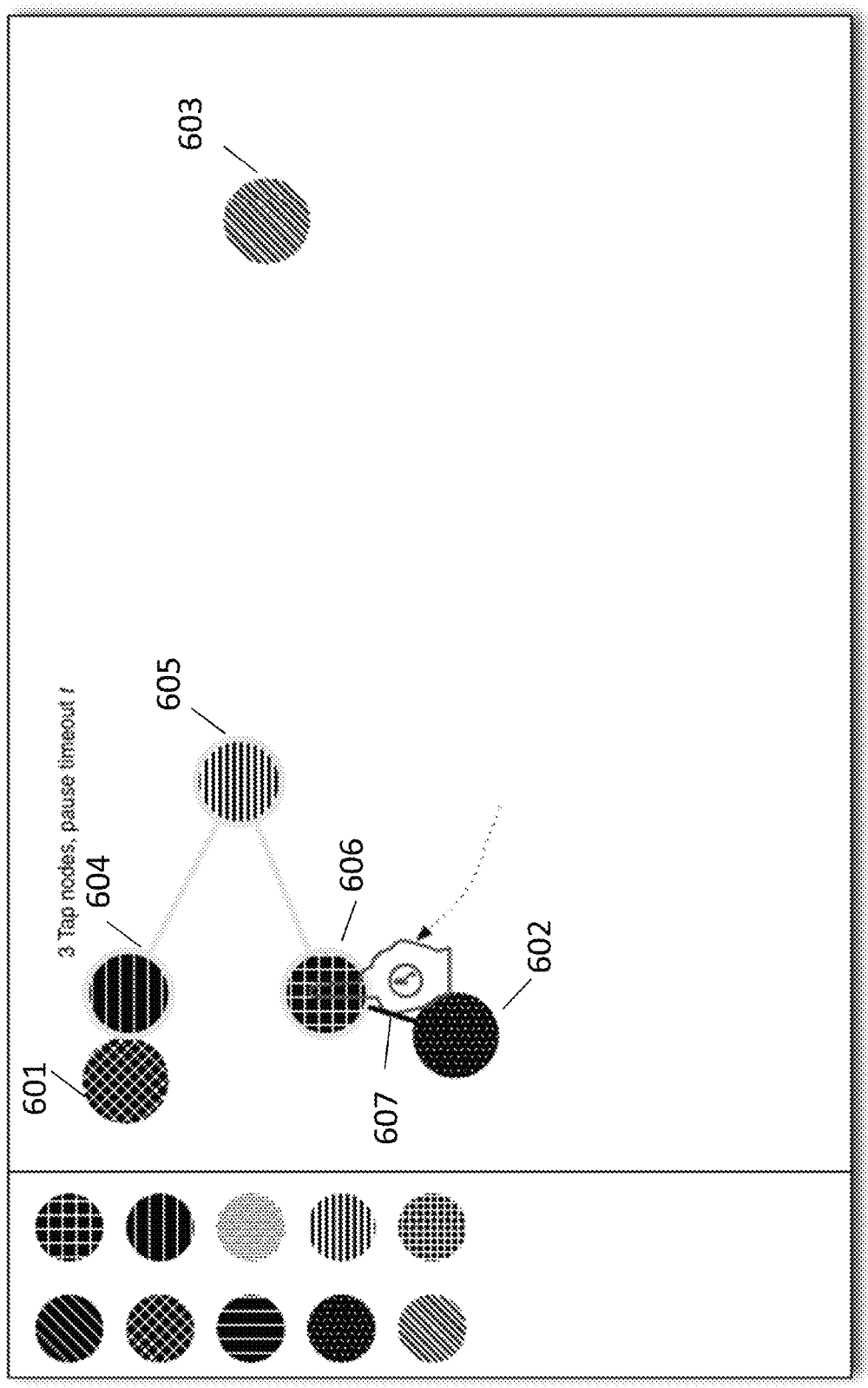
FIG. 6E: Connecting Subtrees

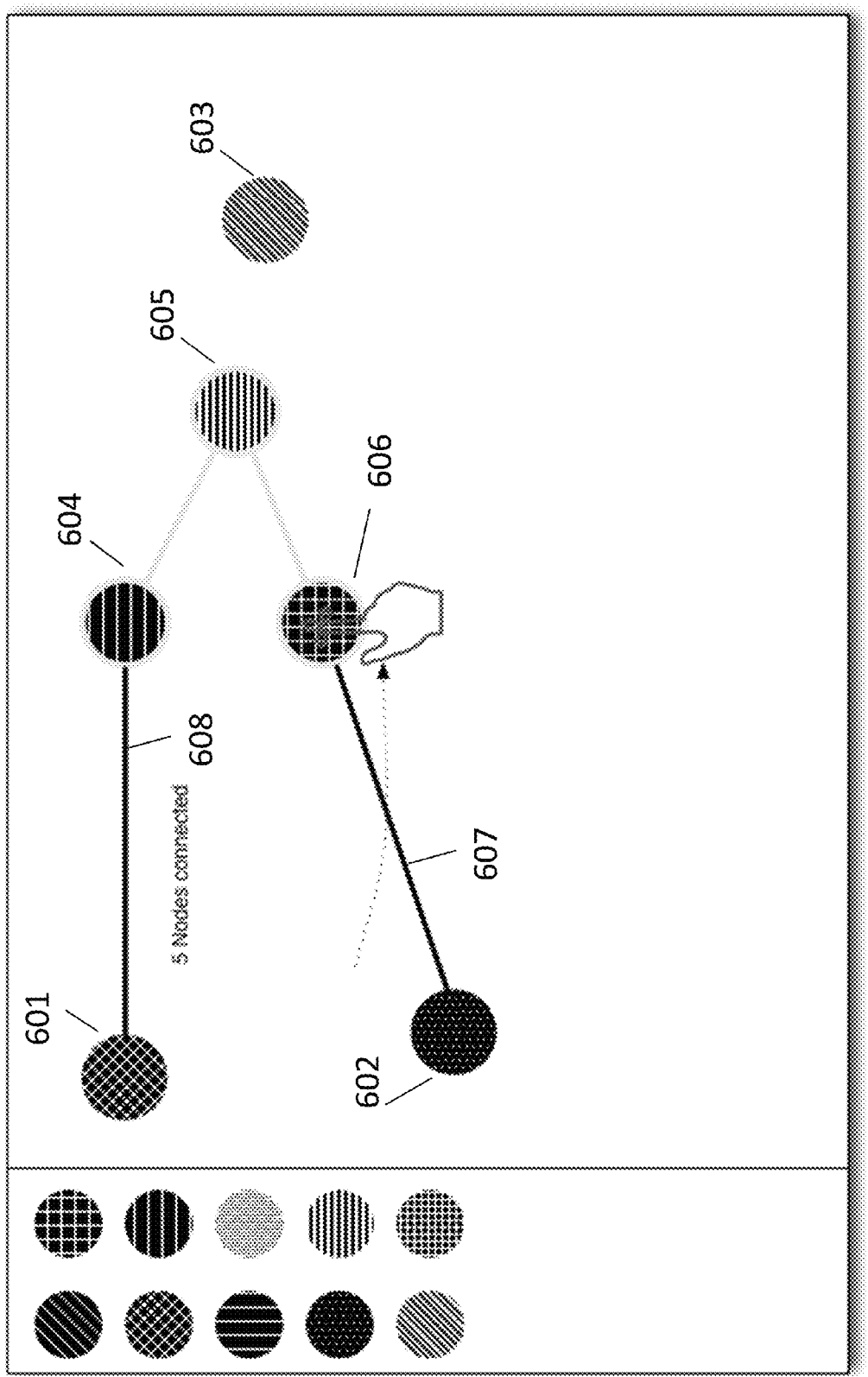
FIG. 6F: Connecting Subtrees

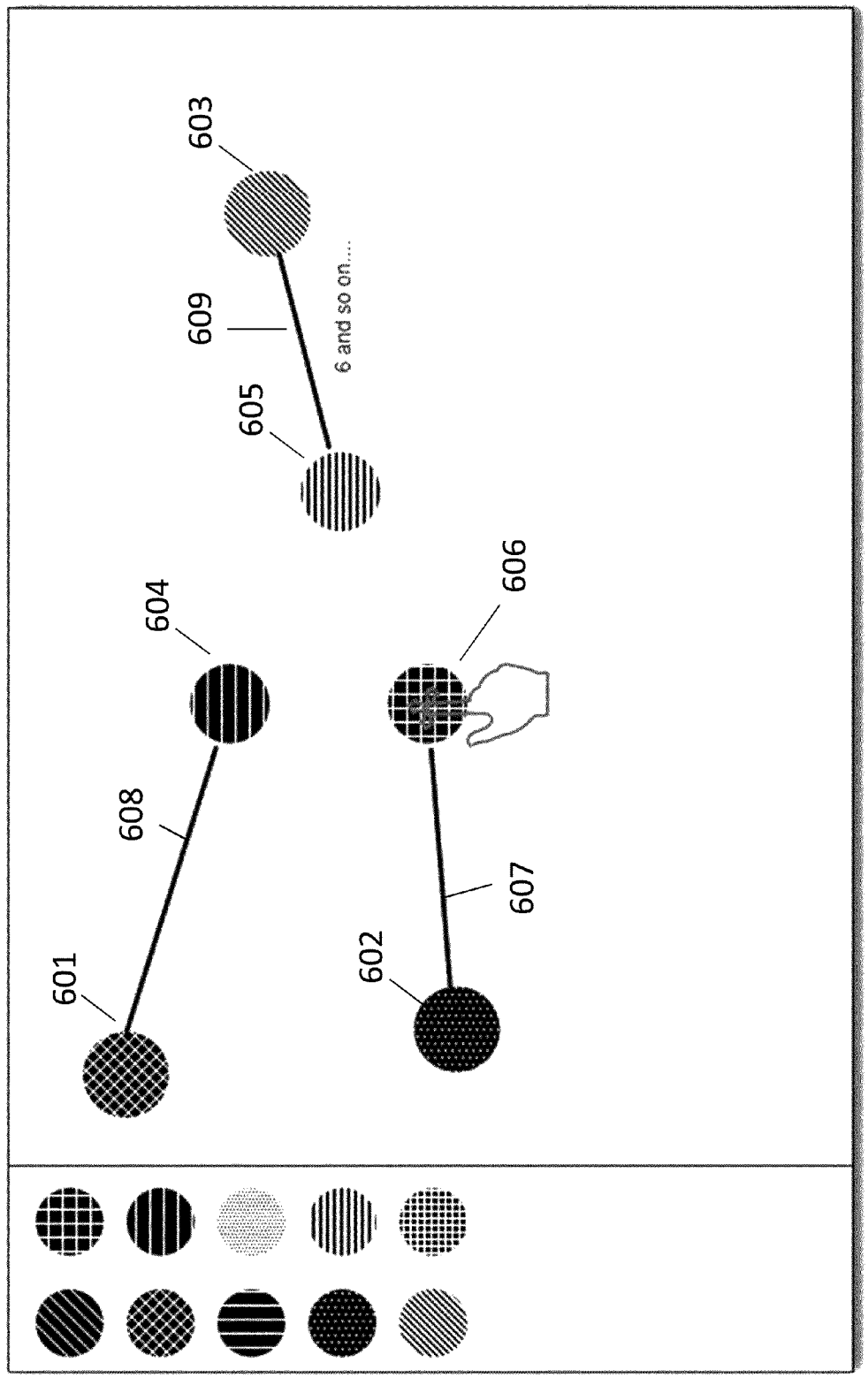

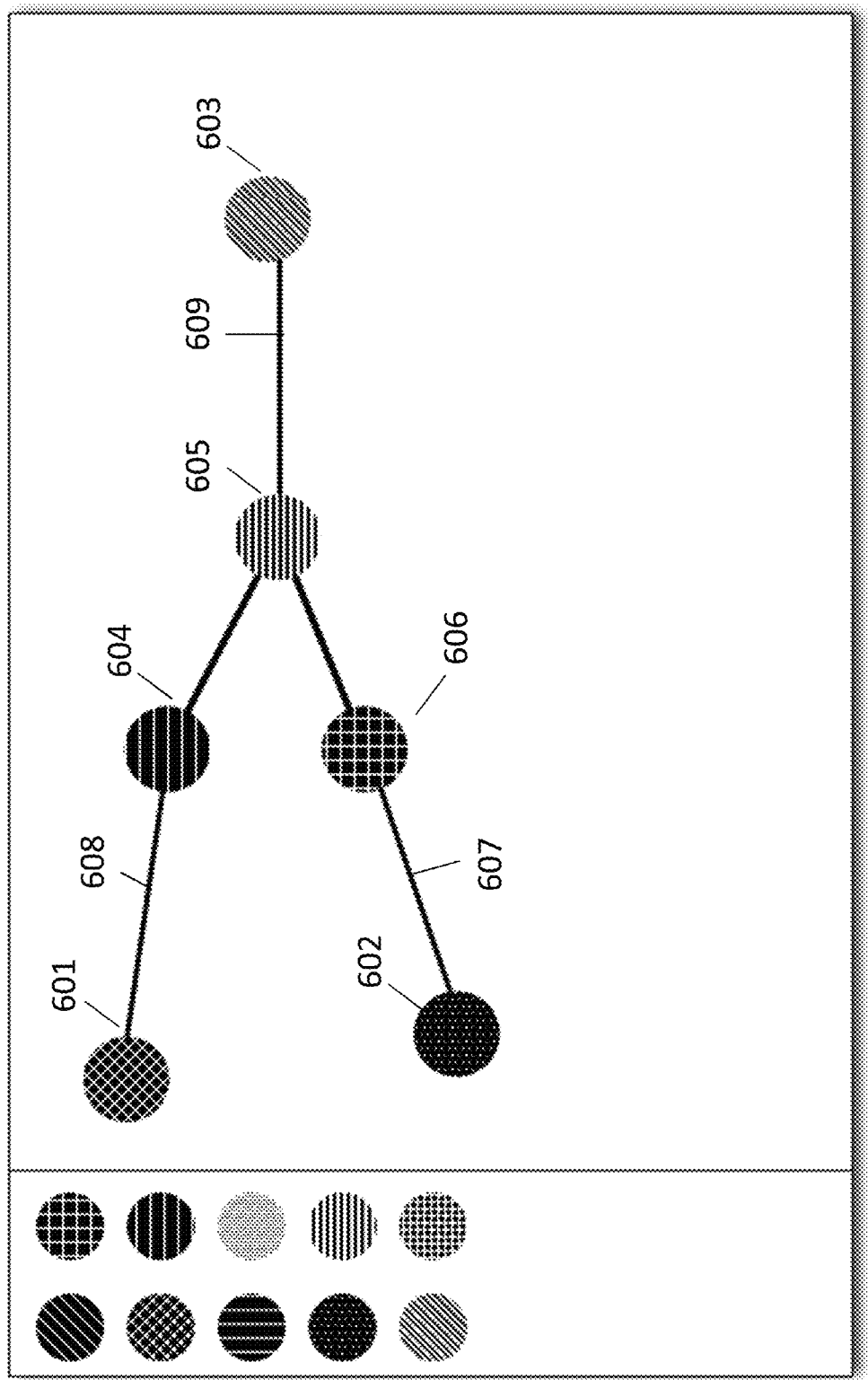

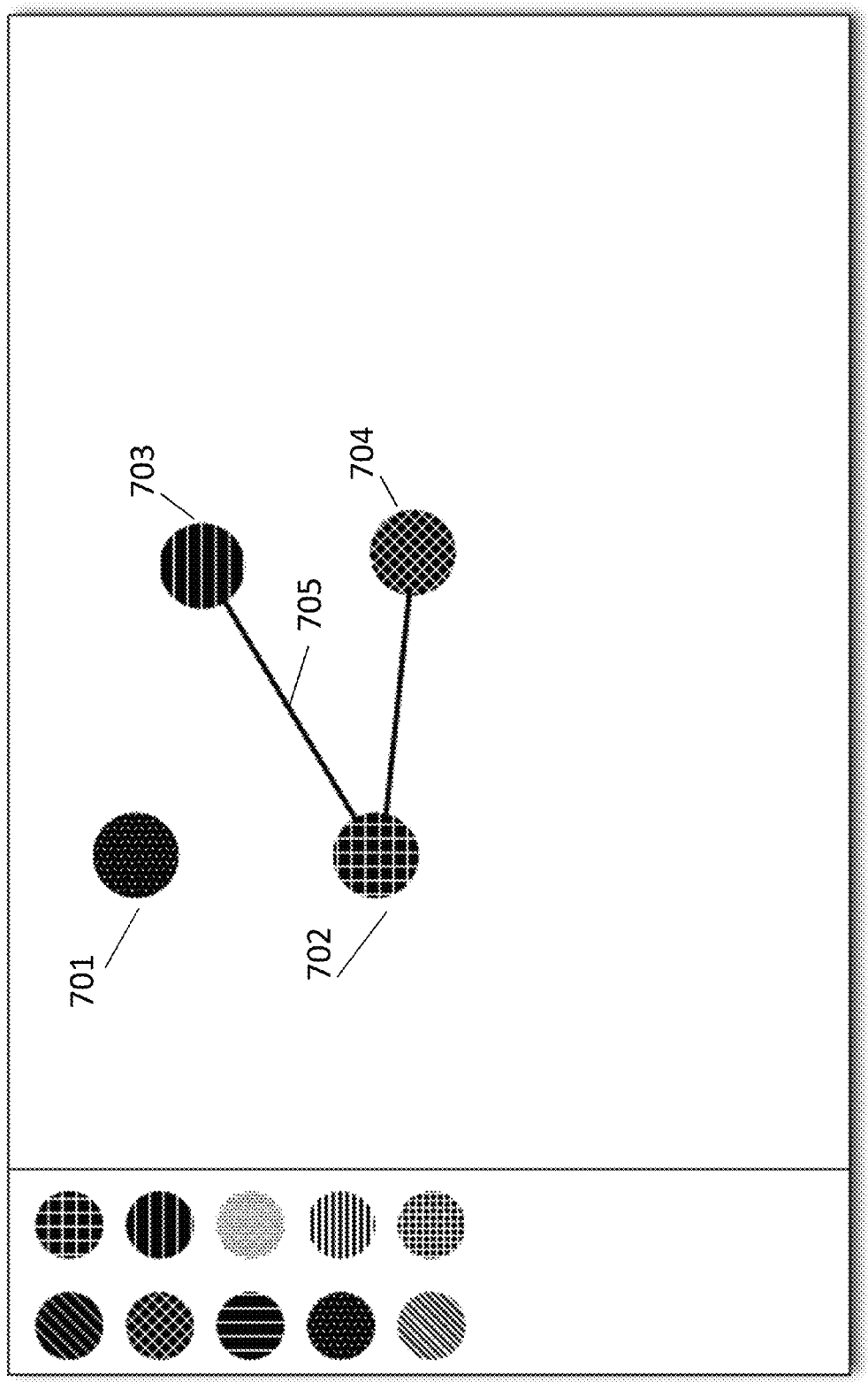

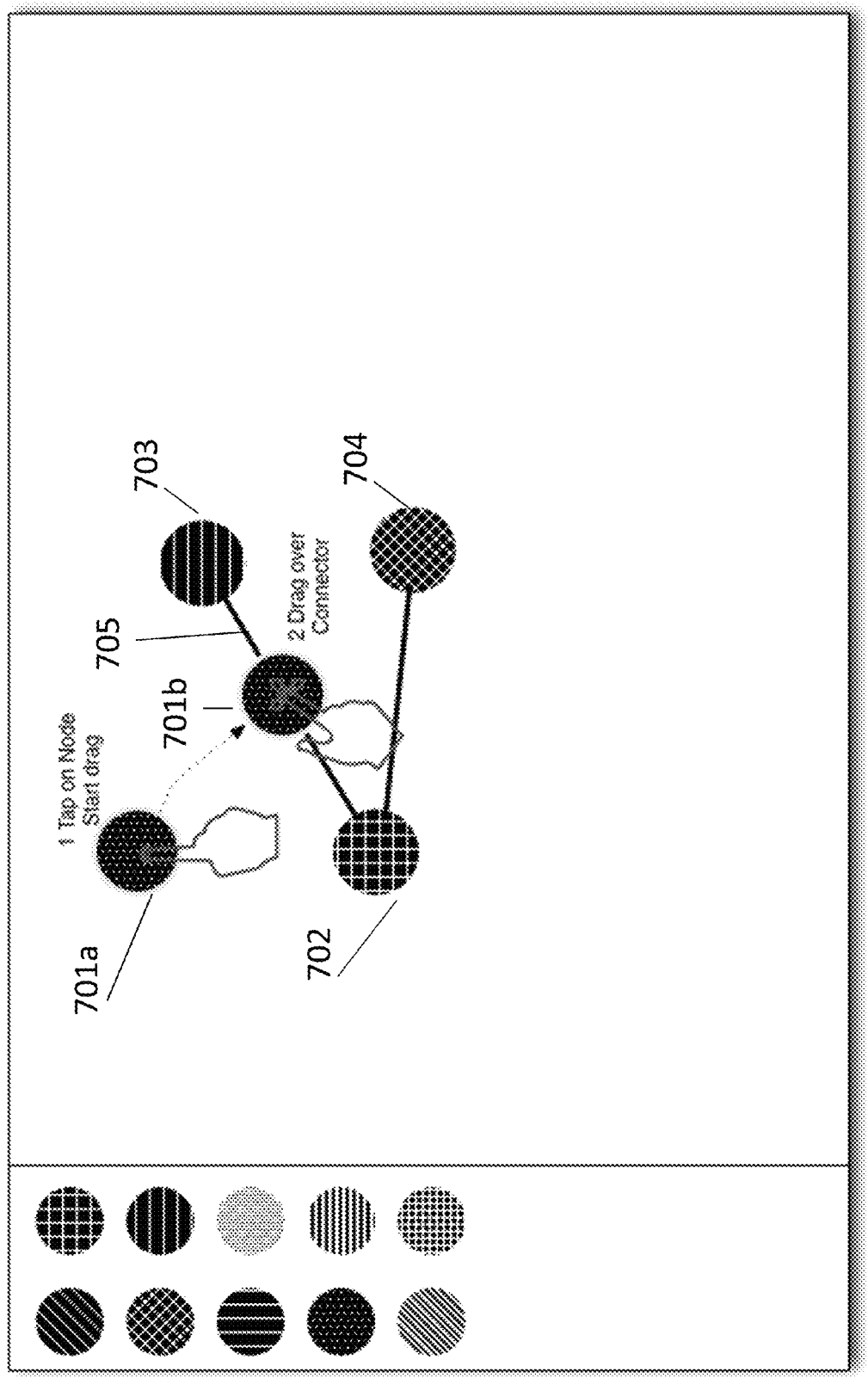
FIG. 7B: Inserting Nodes

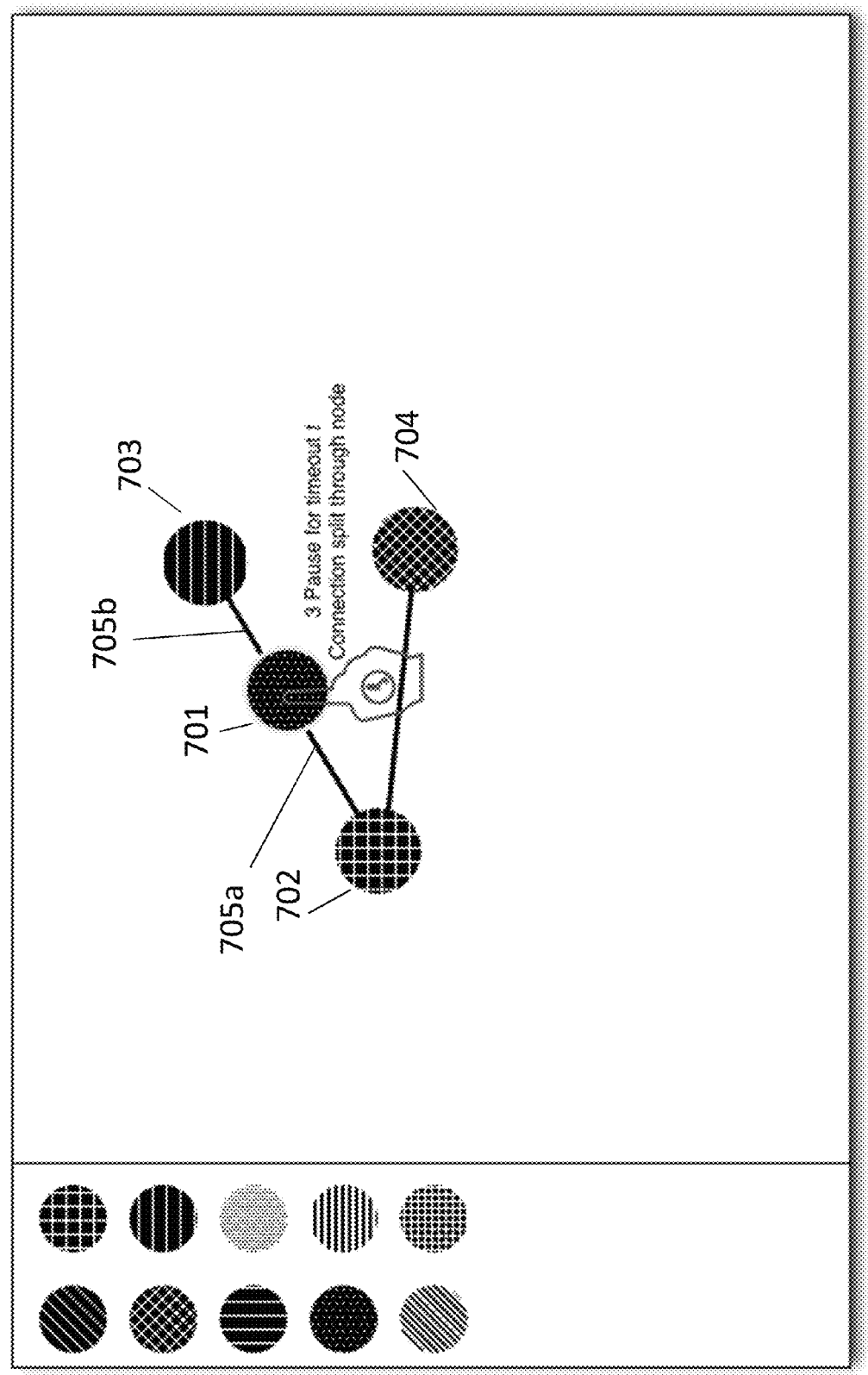
FIG. 7C: Inserting Nodes

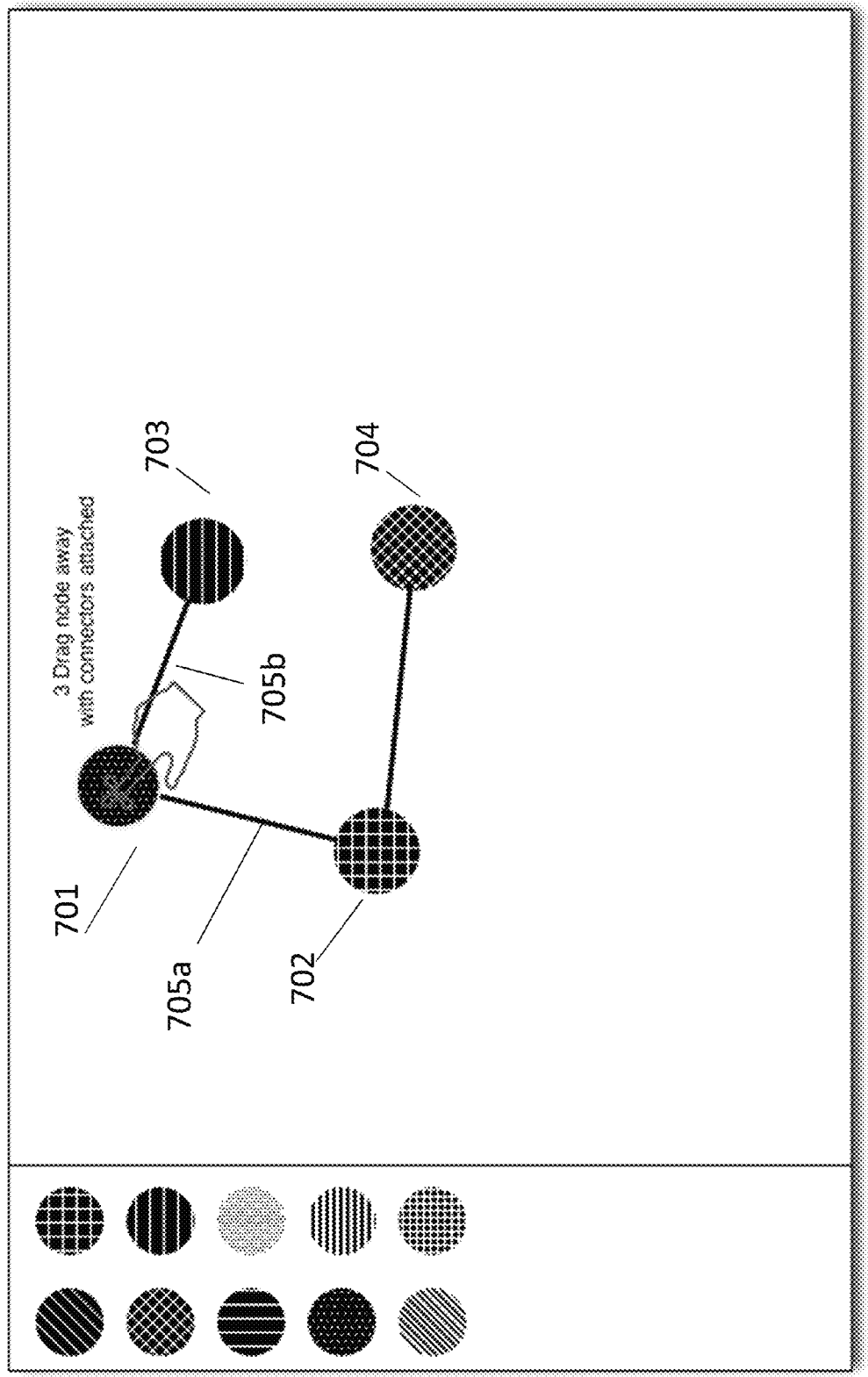
FIG. 7D: Inserting Nodes

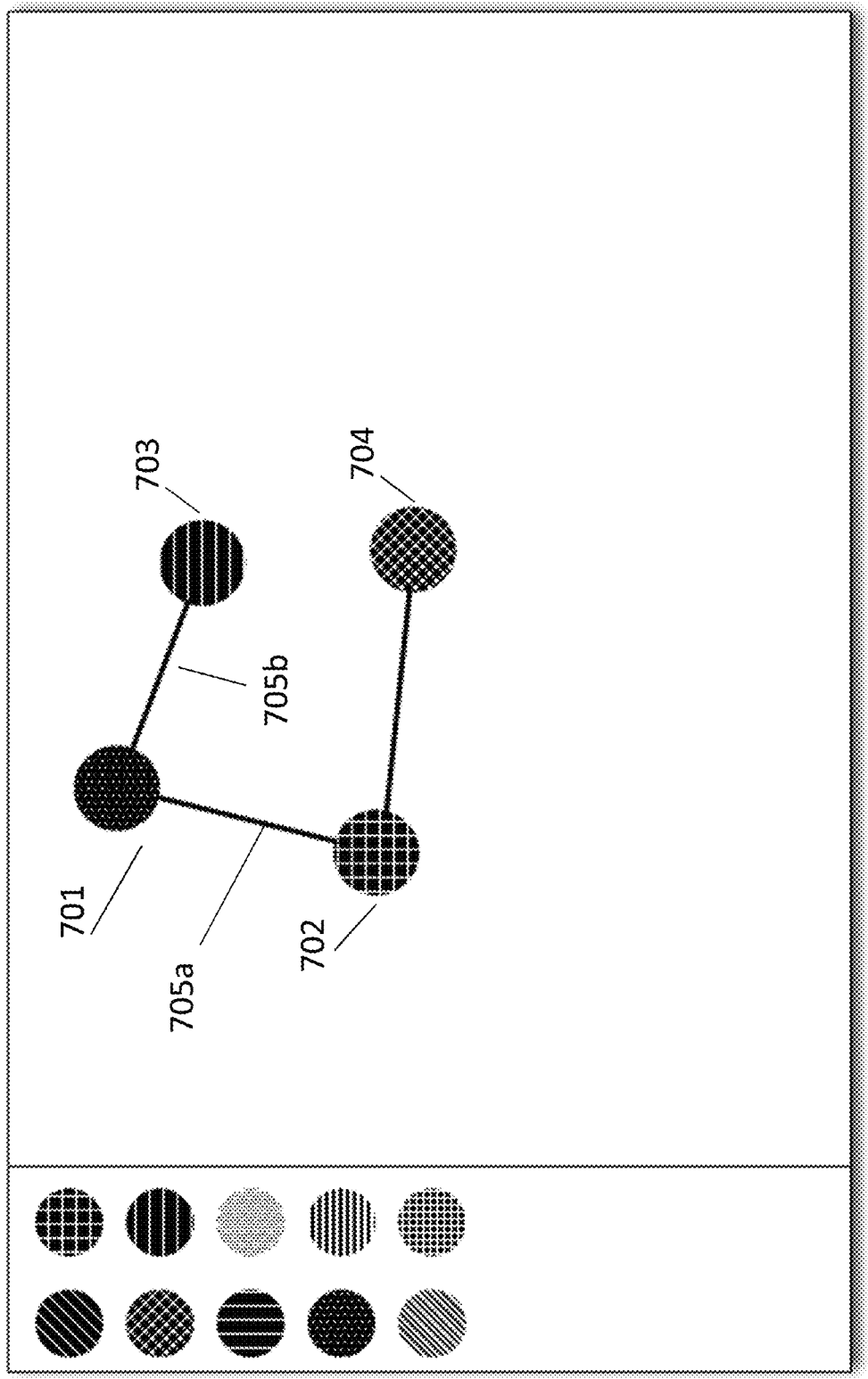

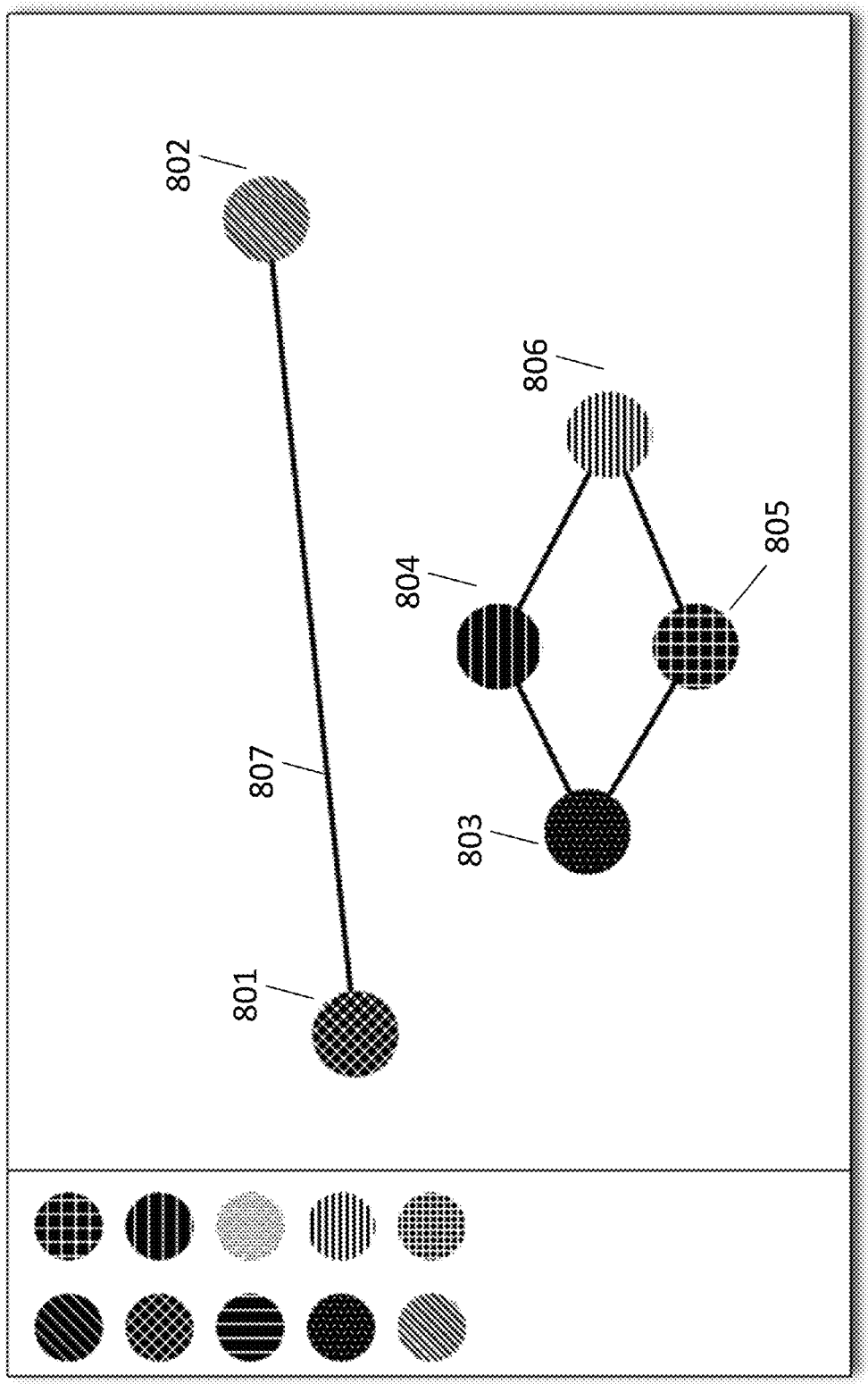
FIG. 8A: Inserting Subtrees

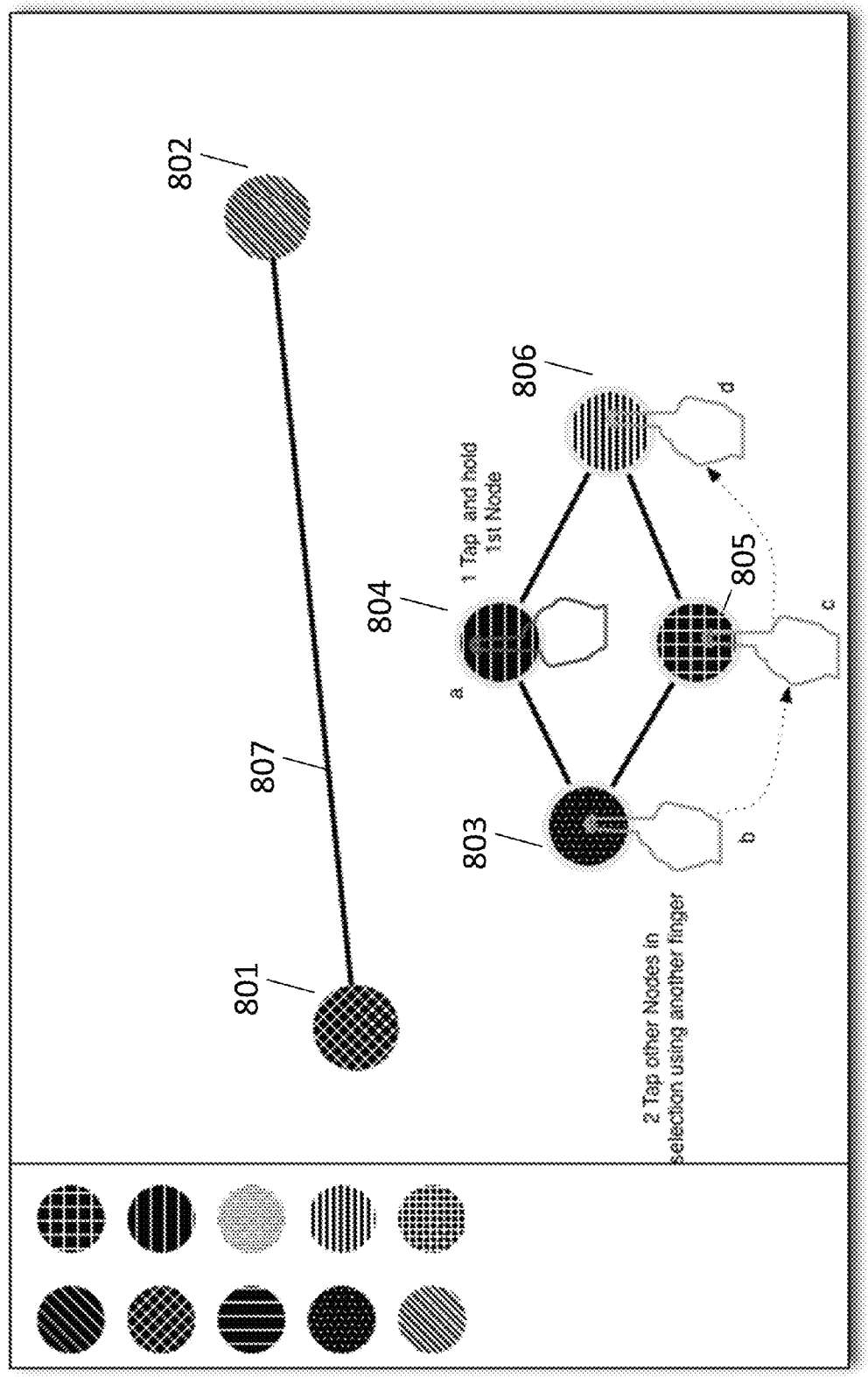
FIG. 8B: Inserting Subtrees

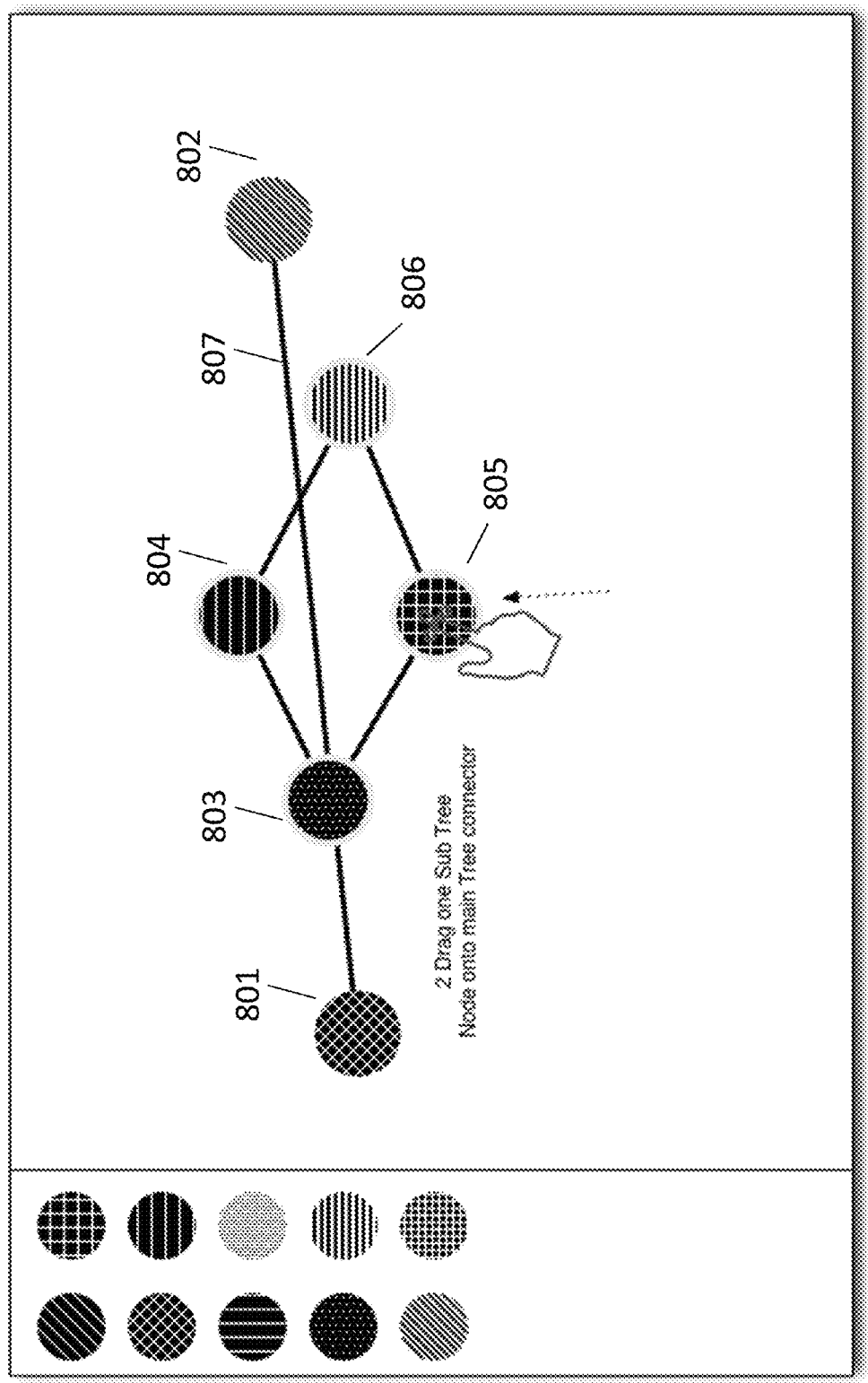
FIG. 8C: Inserting Subtrees

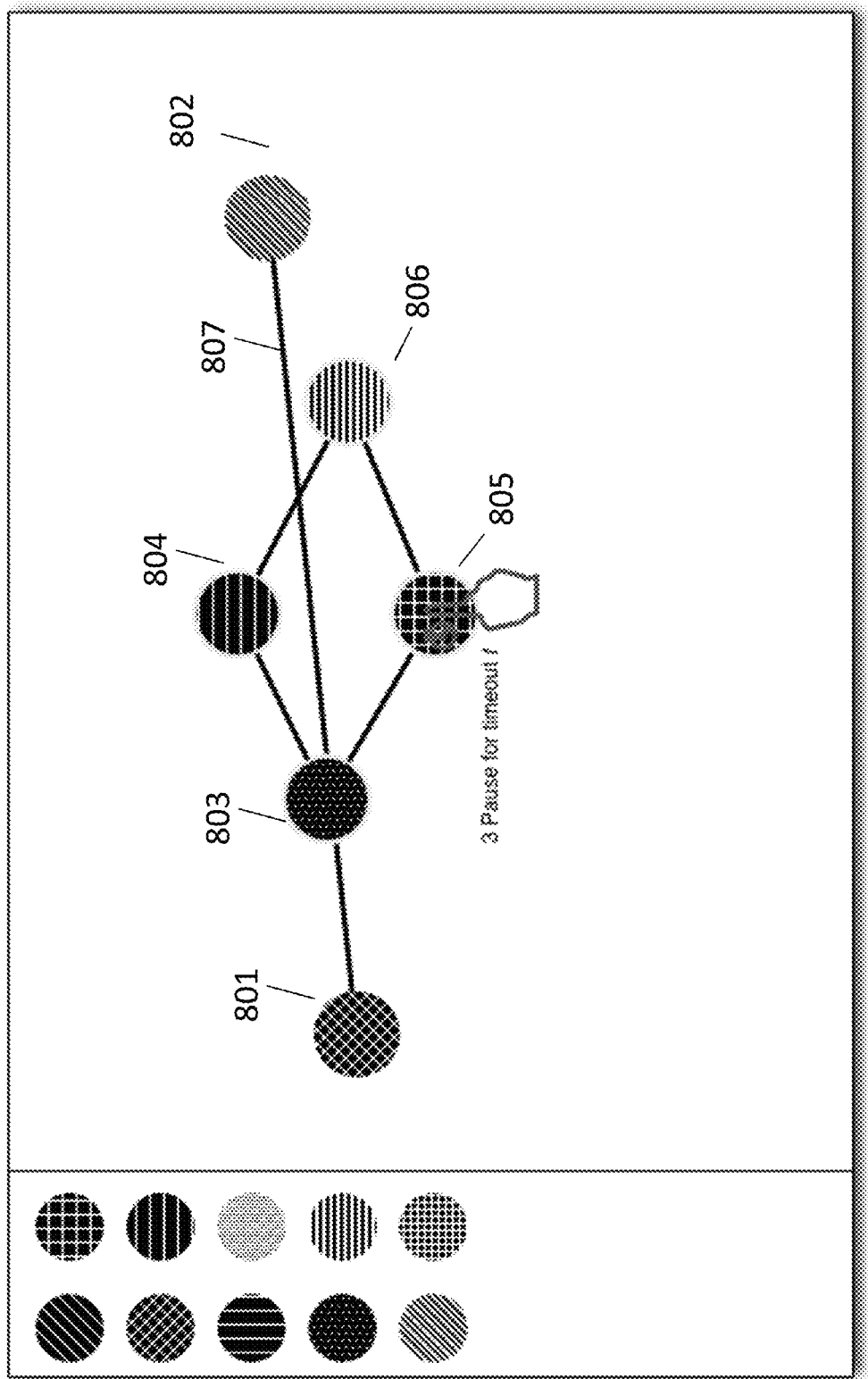
FIG. 8D: Inserting Subtrees

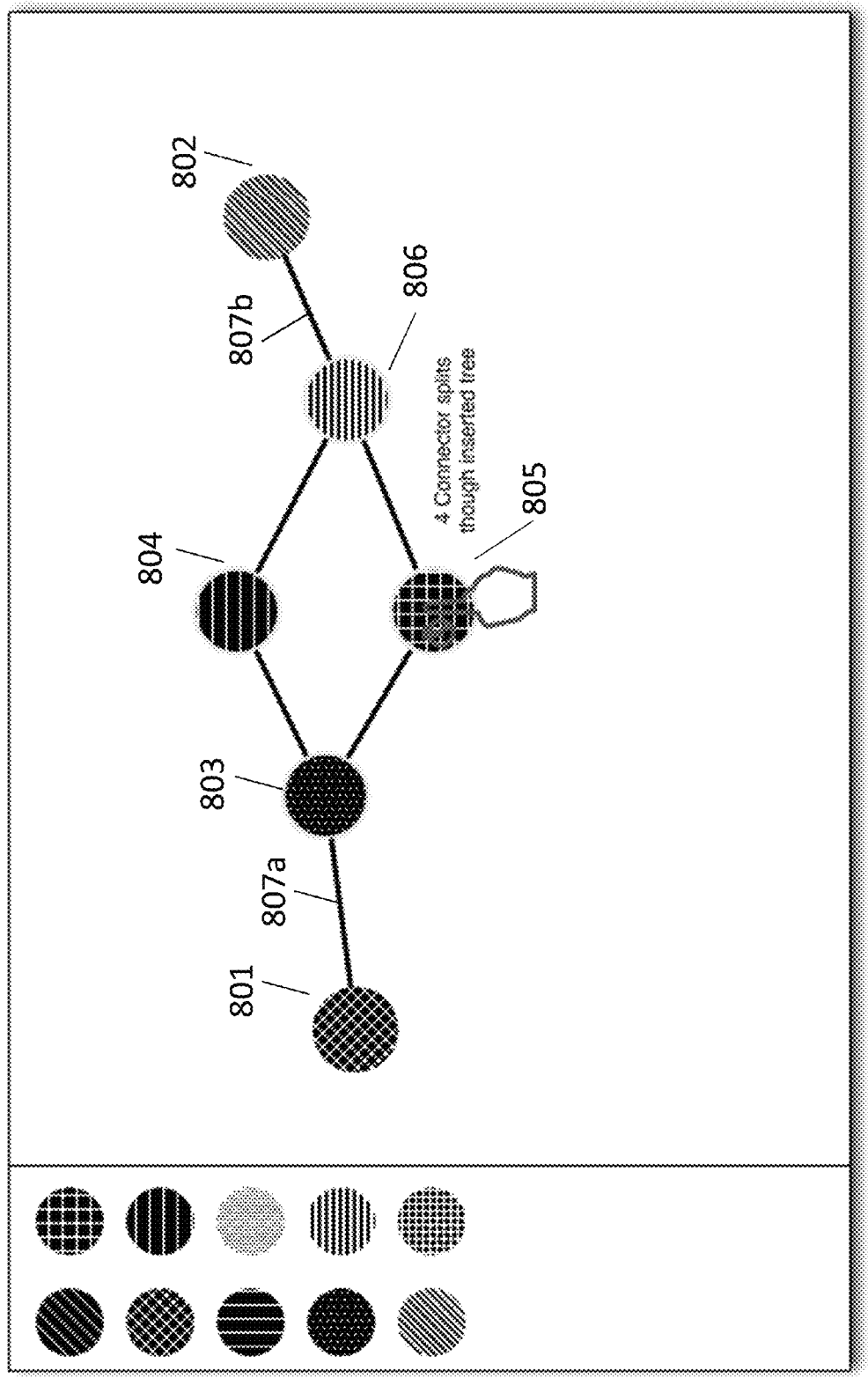

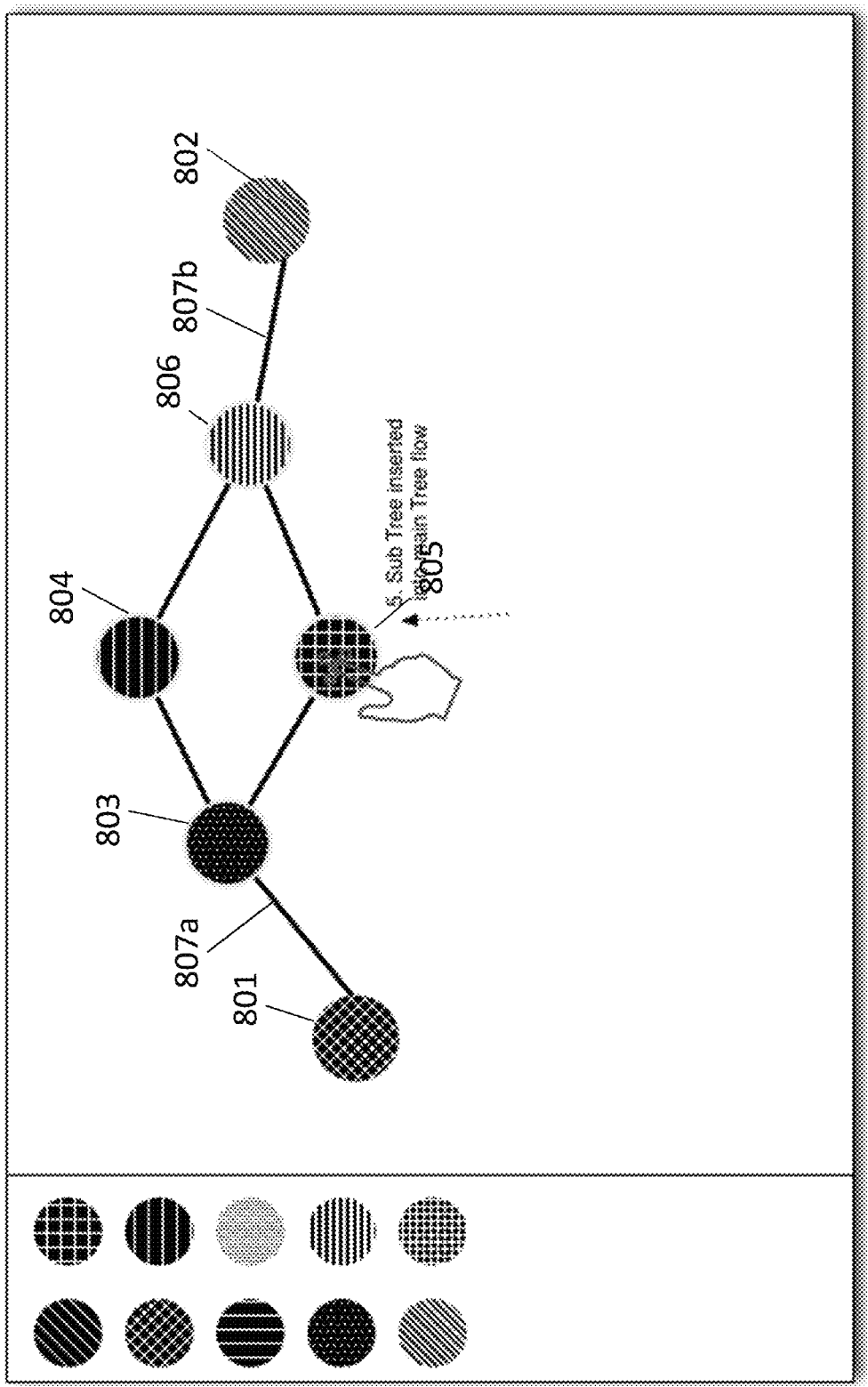
FIG. 8F: Inserting Subtrees

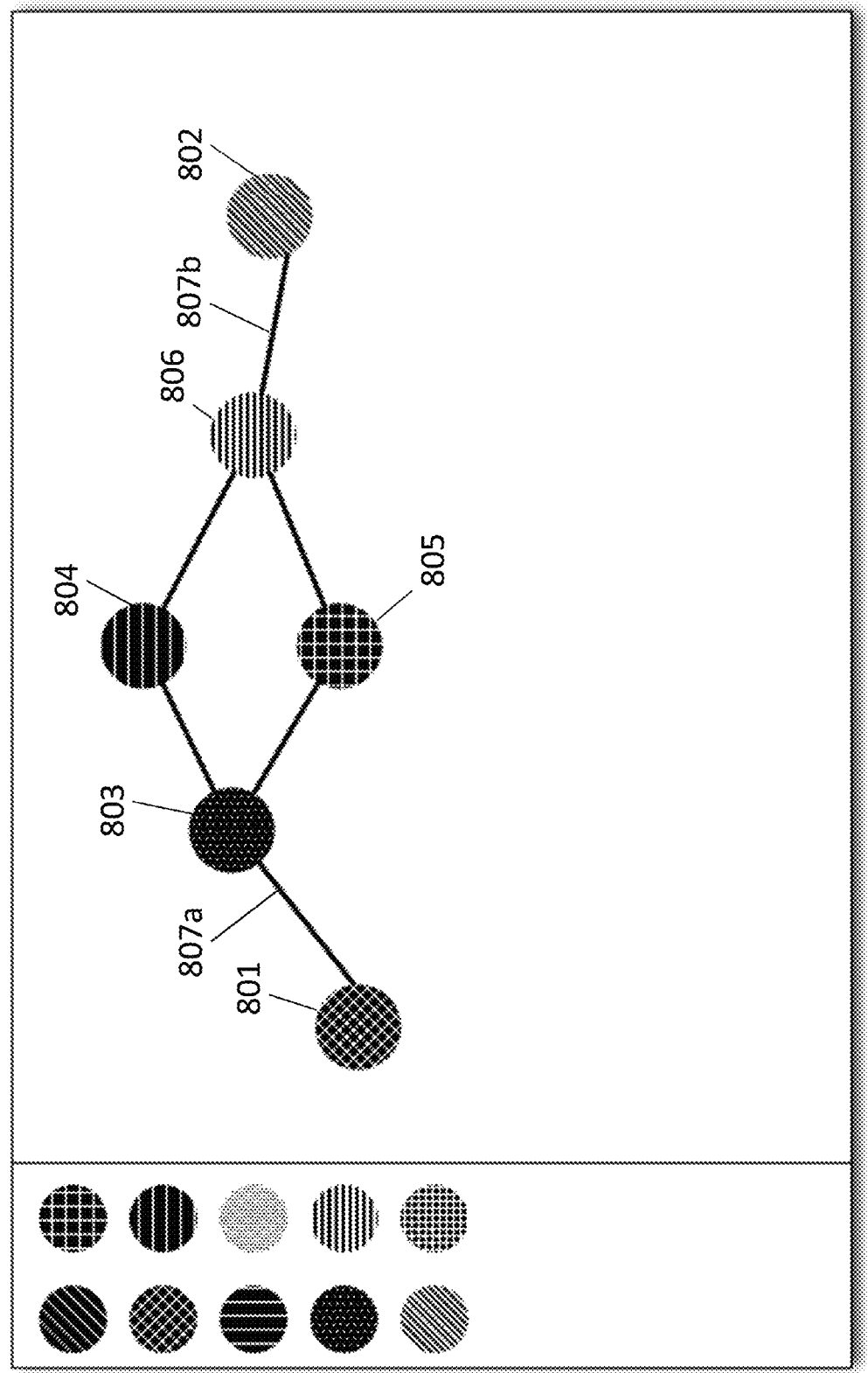
FIG. 8G: Inserting Subtrees

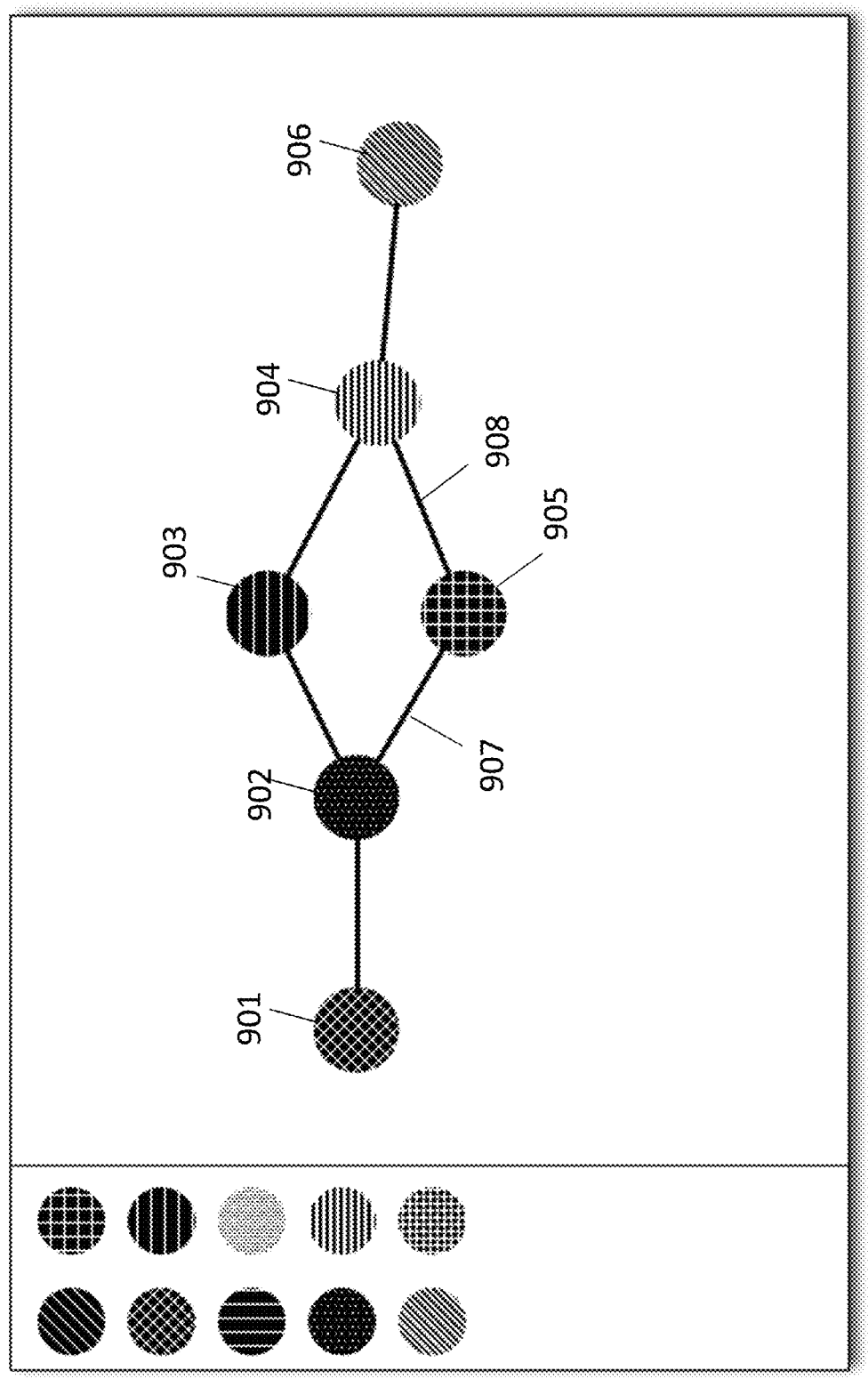
FIG. 9A: Tearing Nodes

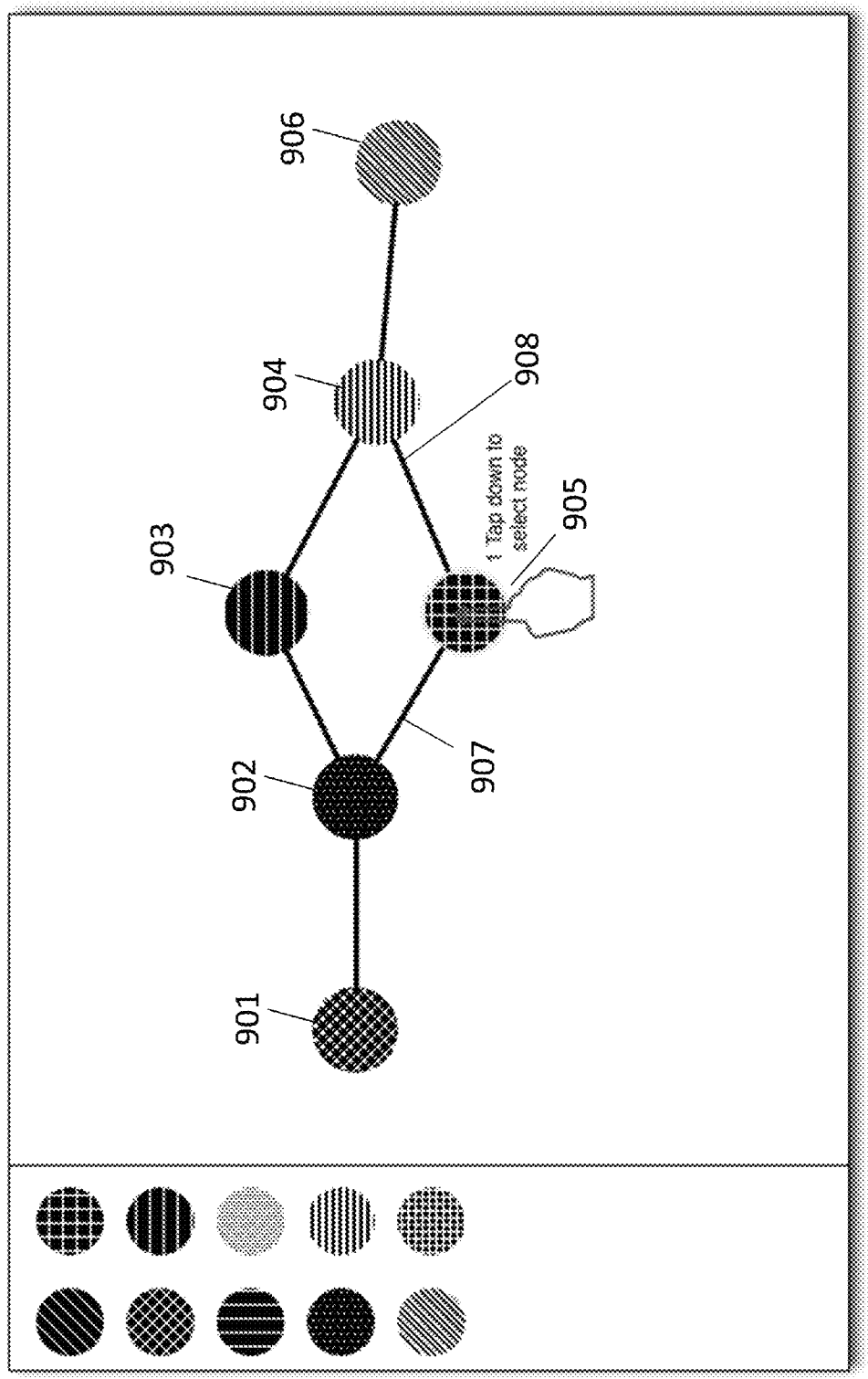

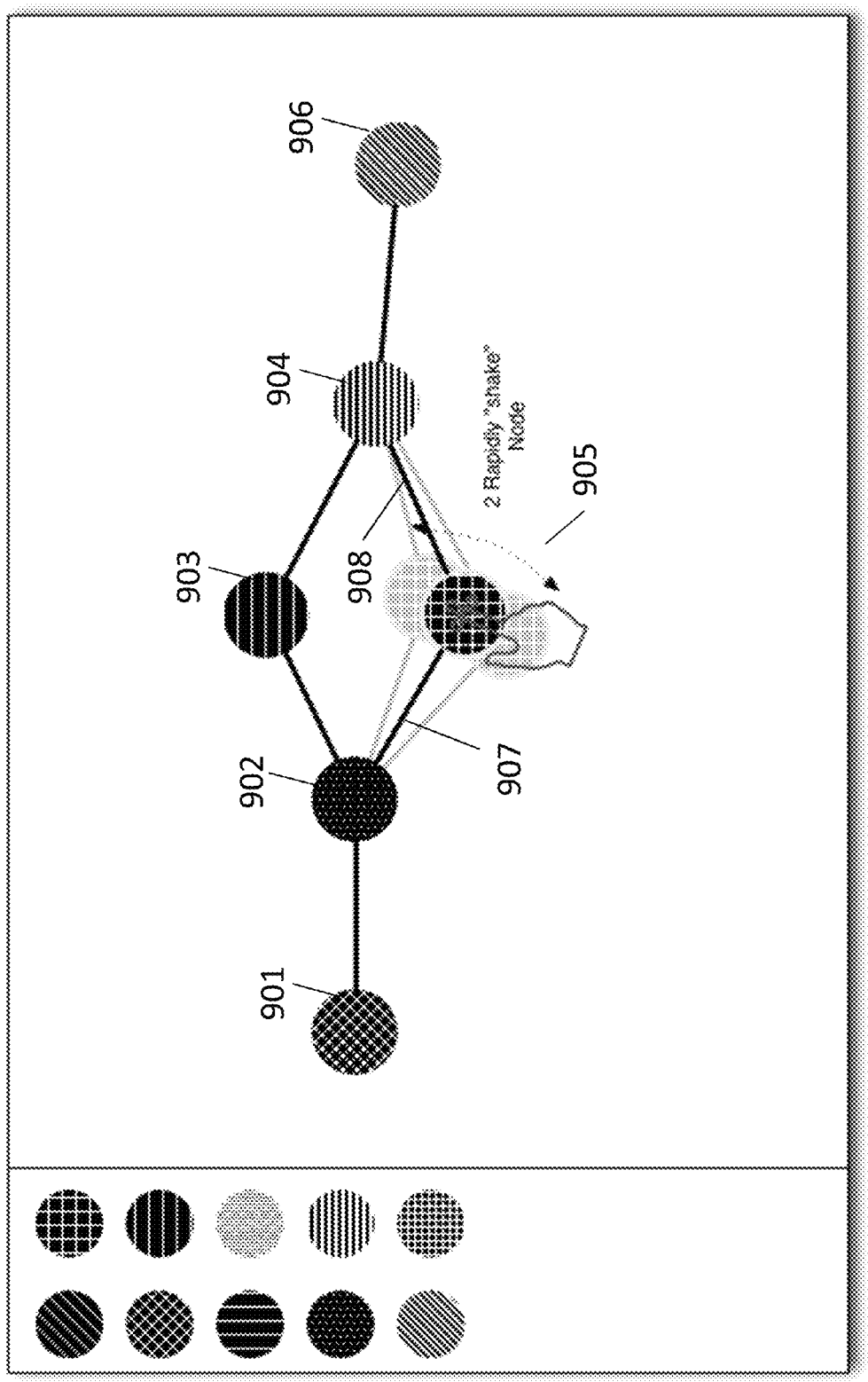
FIG. 9C: Tearing Nodes

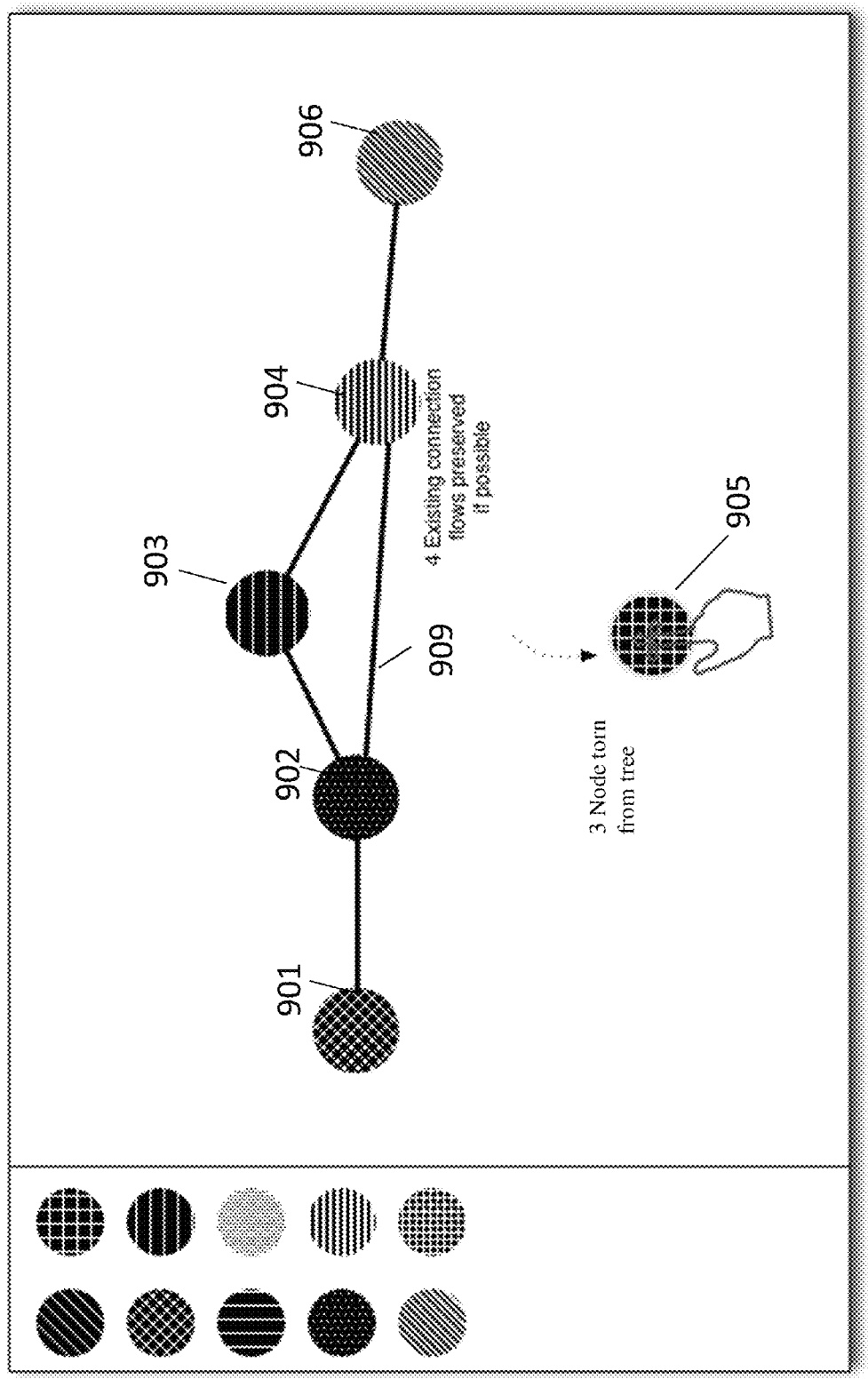

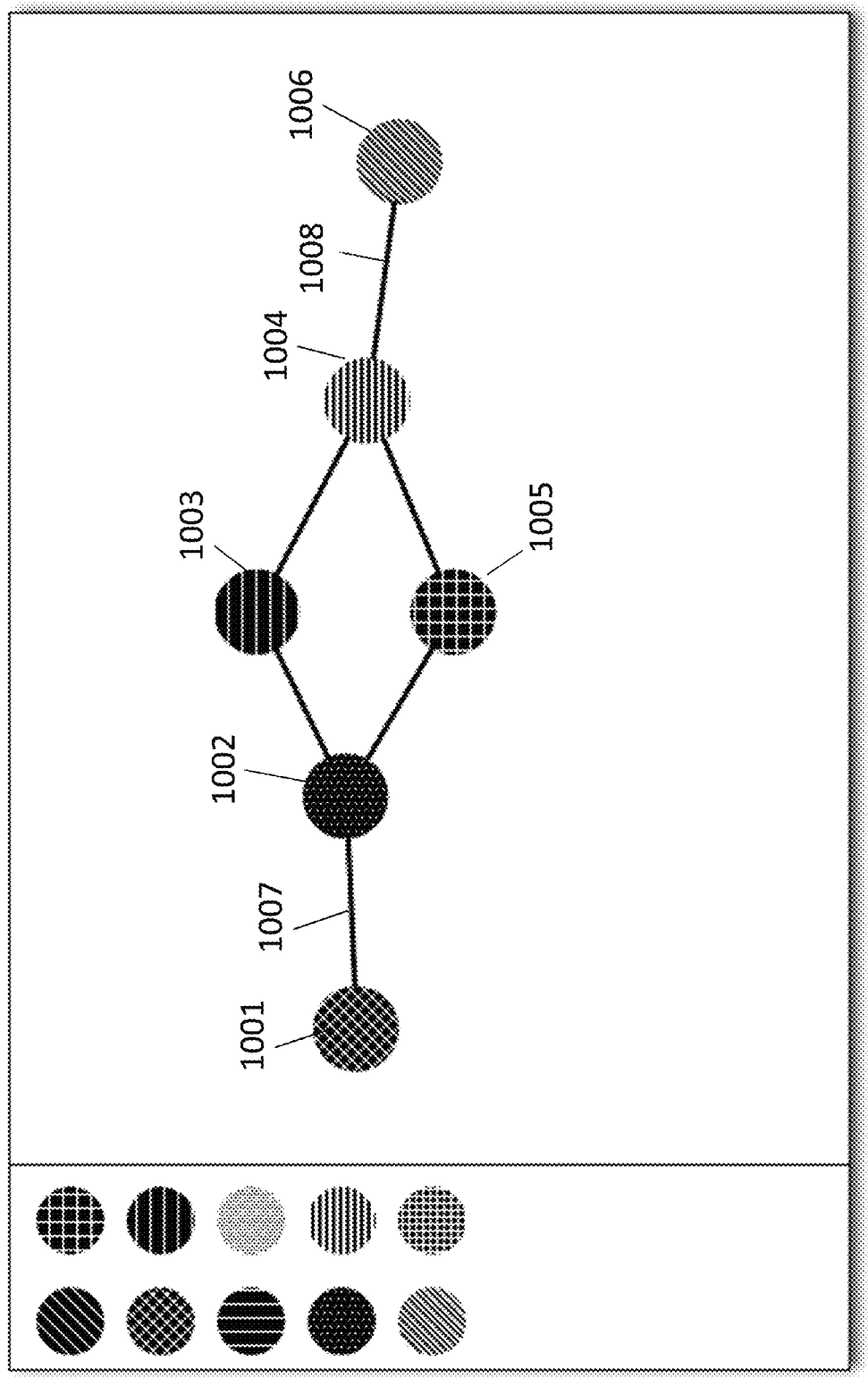
FIG. 10A: Tearing Subtrees

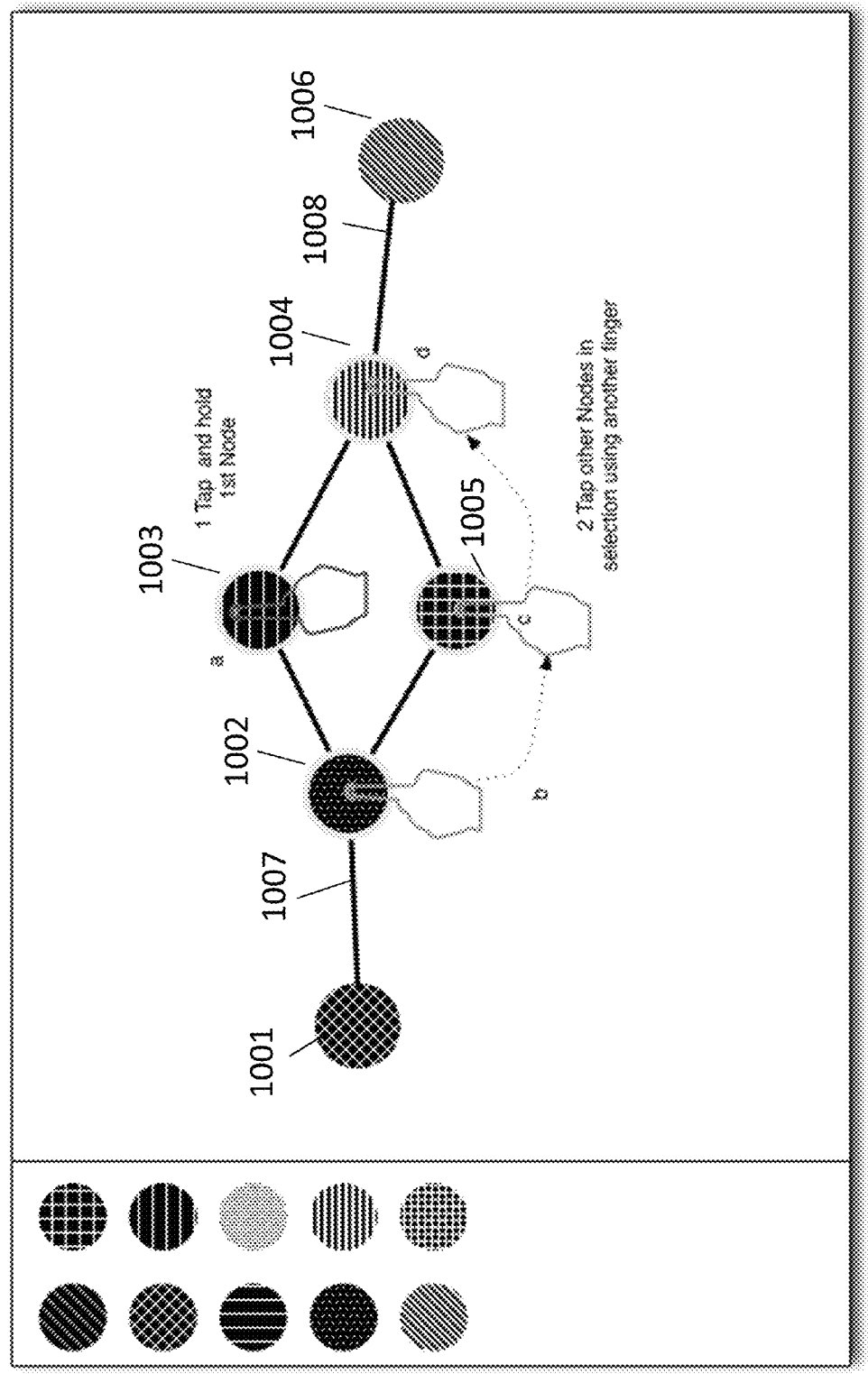
FIG. 10B: Tearing Subtrees

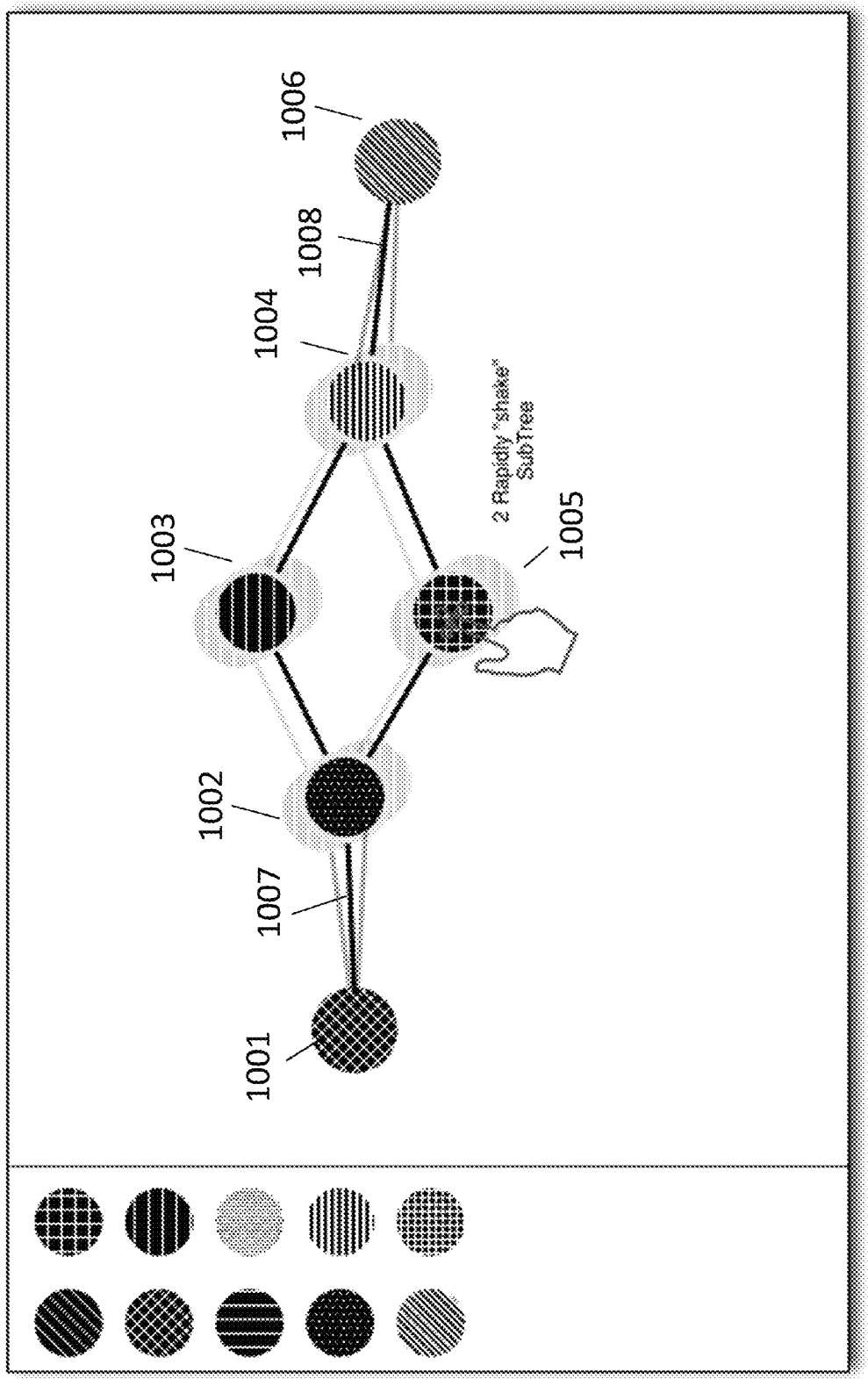
FIG. 10C: Tearing Subtrees

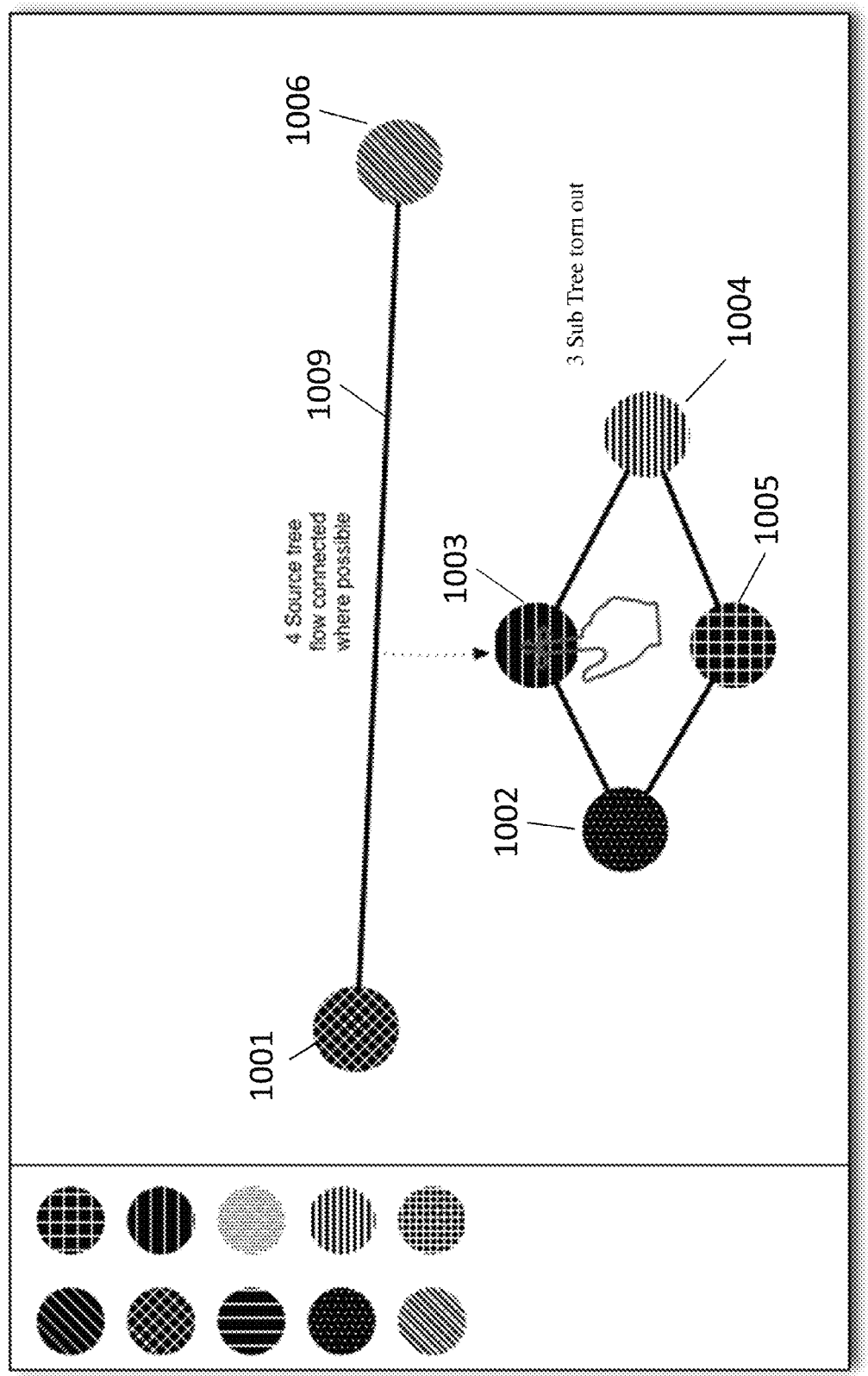
FIG. 10D: Tearing Subtrees

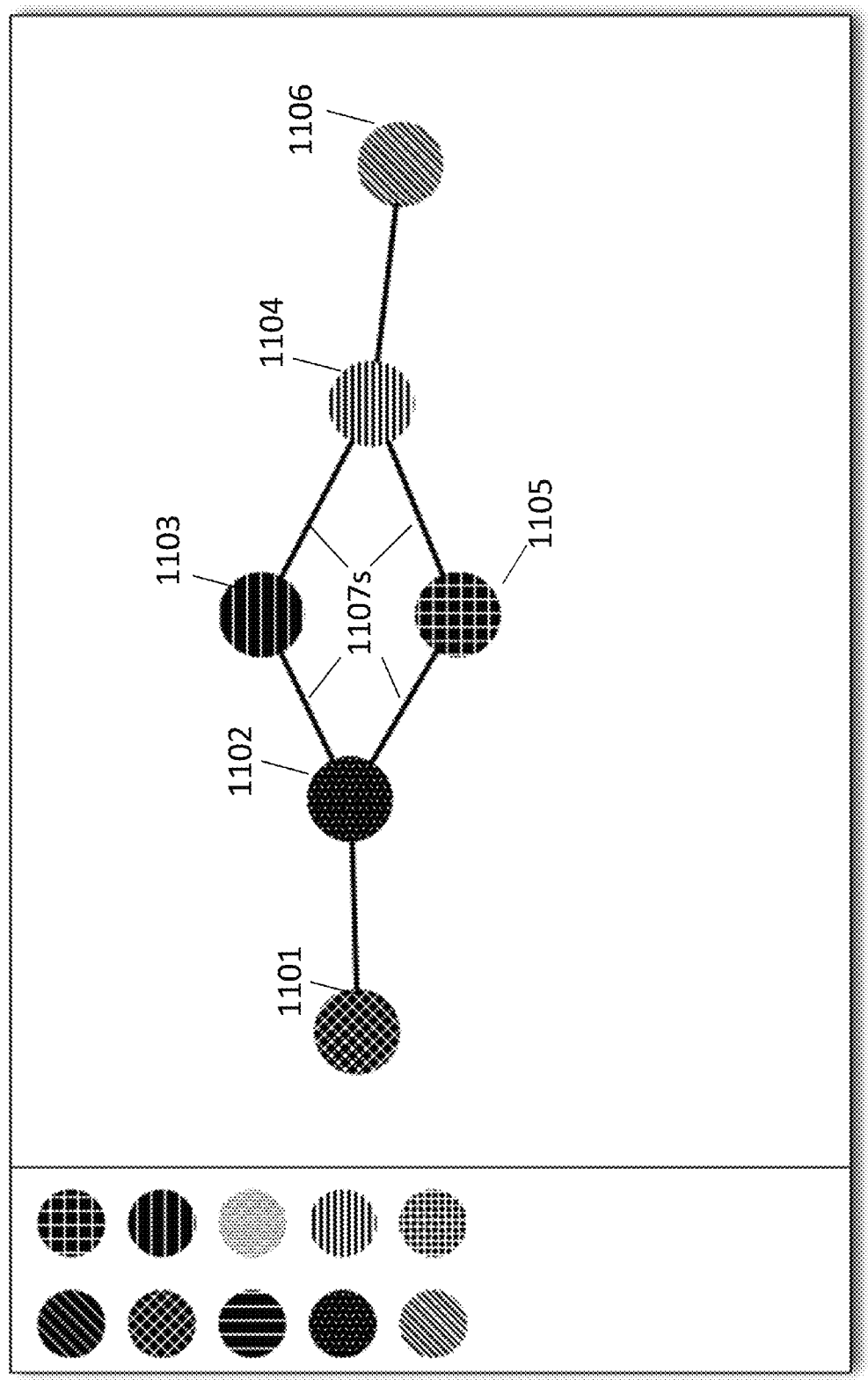

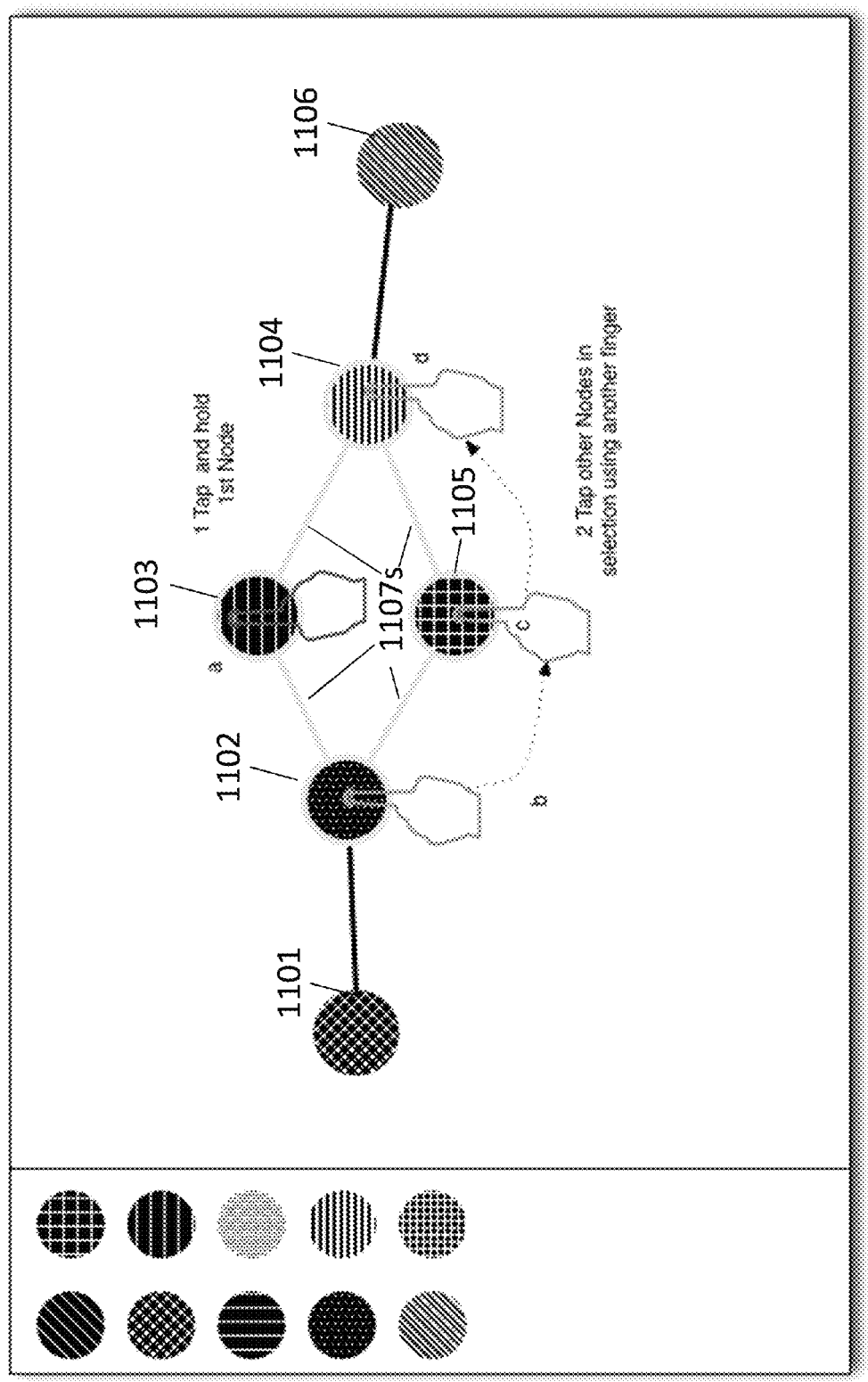
FIG. 11B: Folding Subtrees

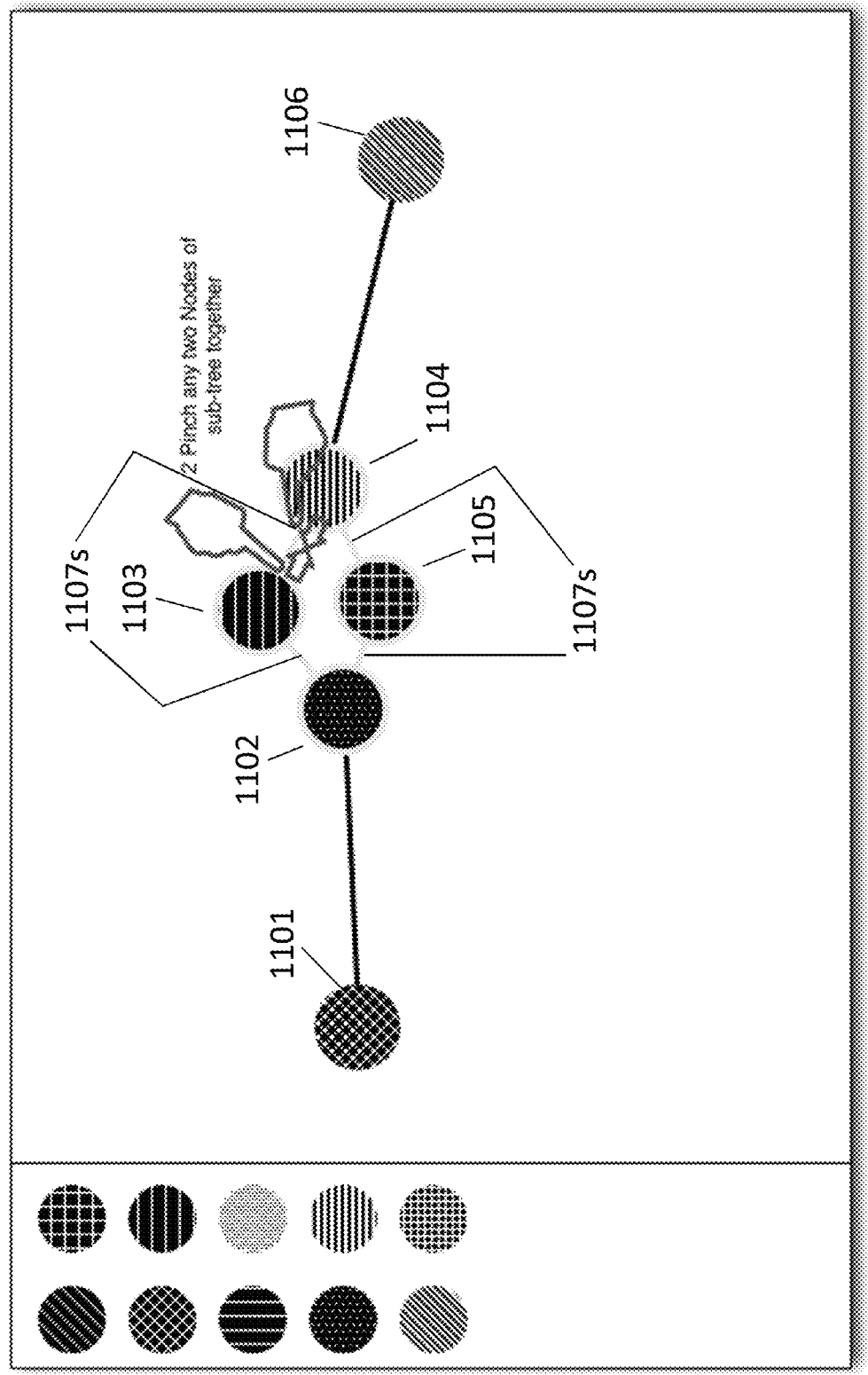
FIG. 11C: Folding Subtrees

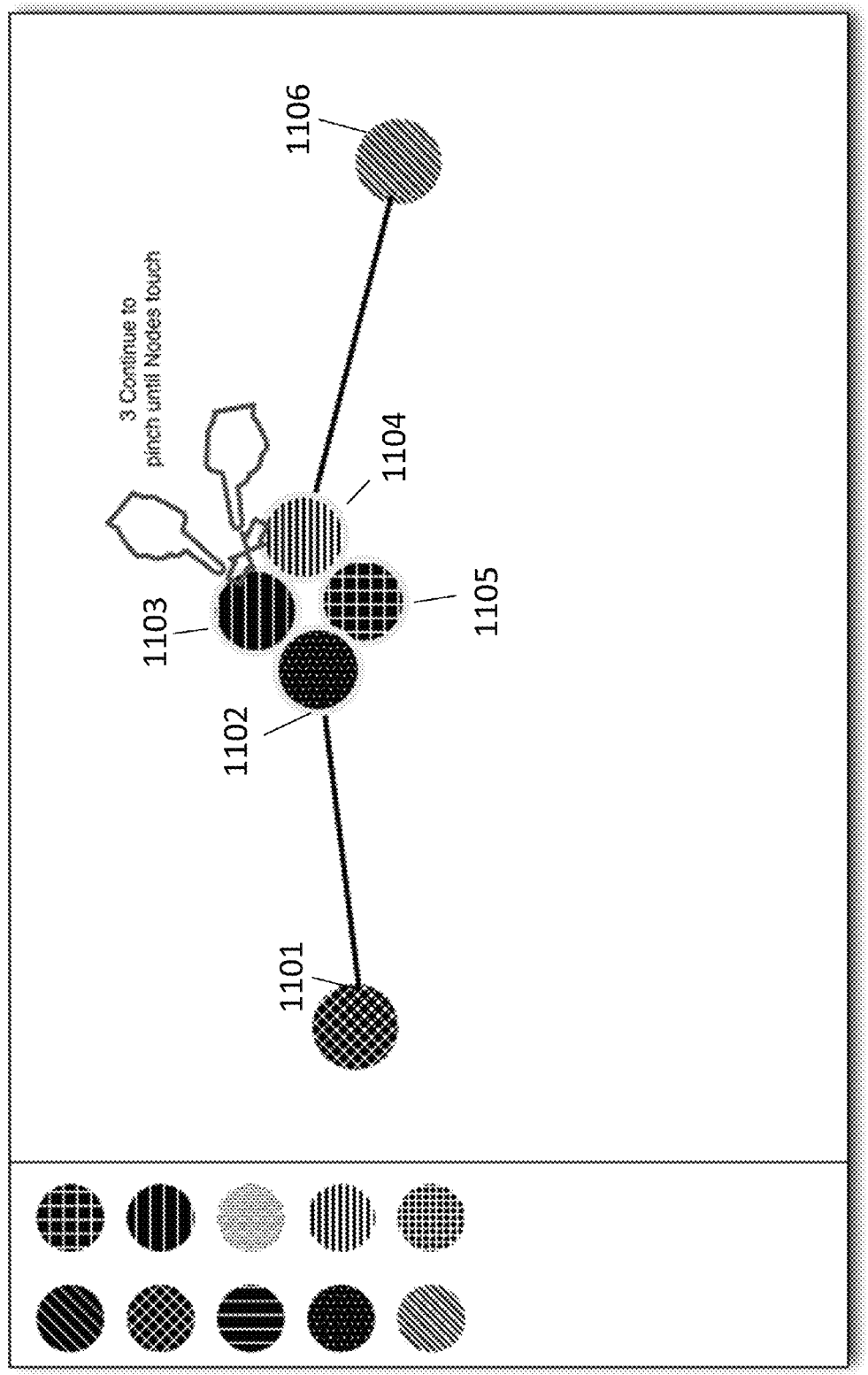
FIG. 11D: Folding Subtrees

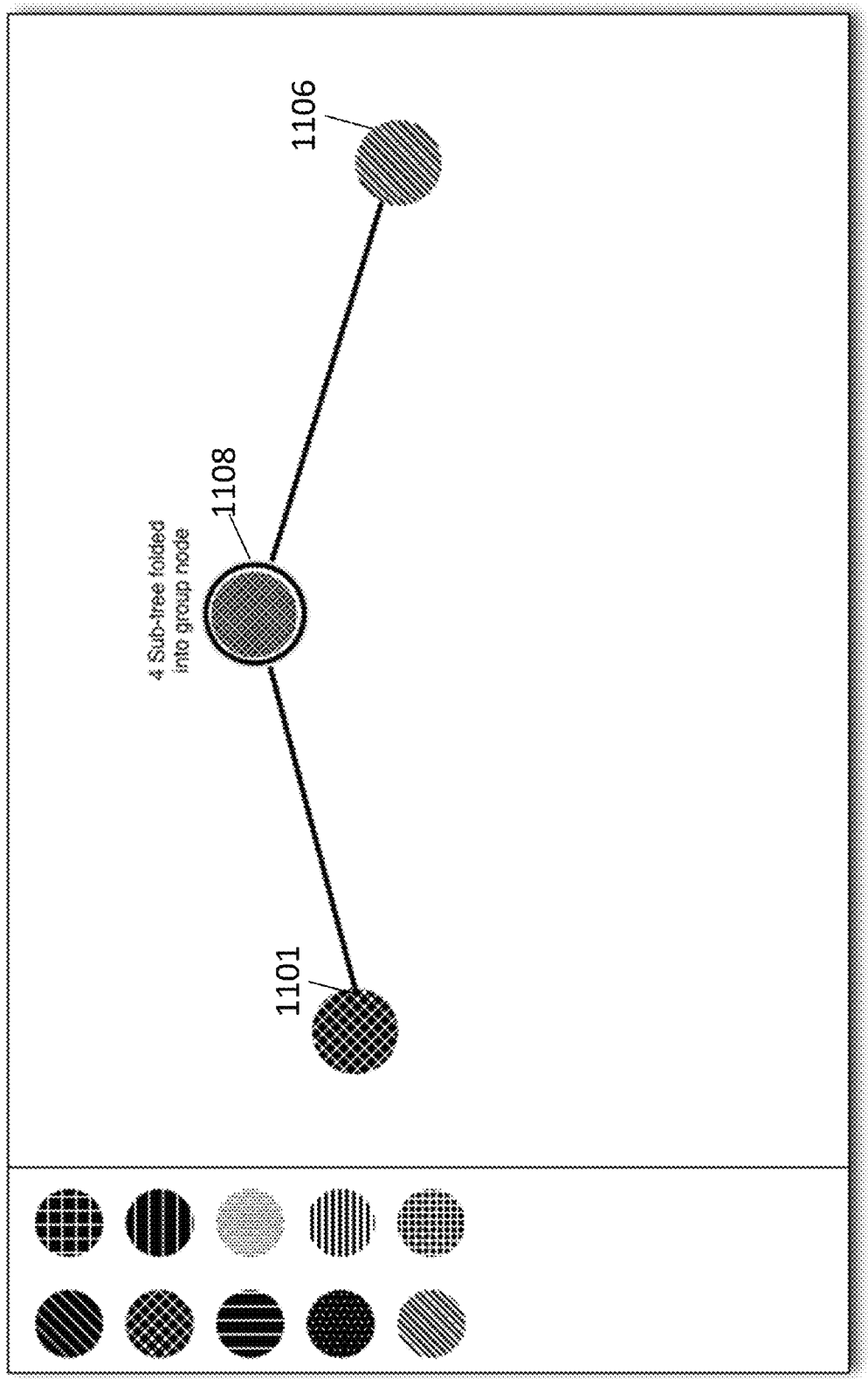

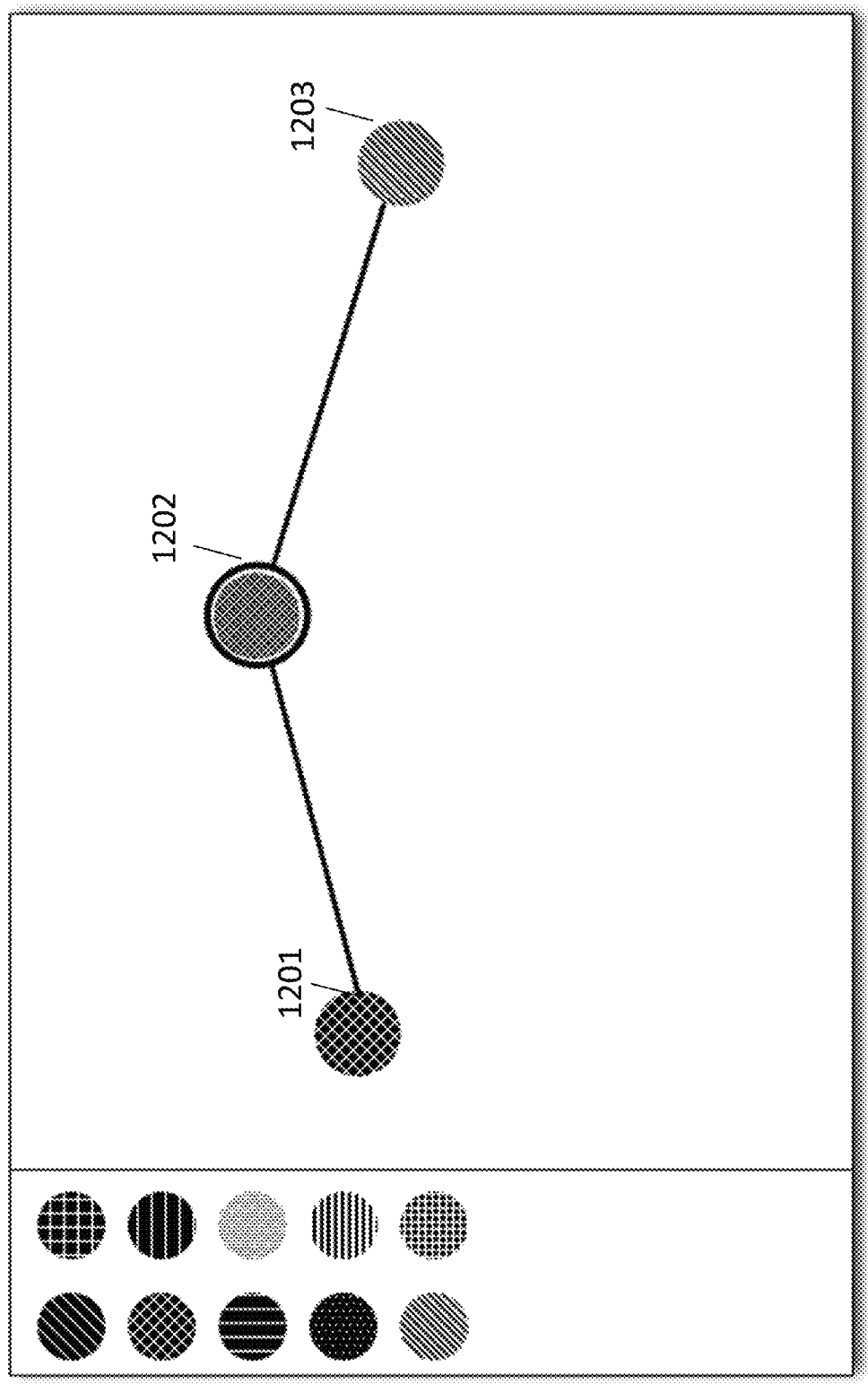

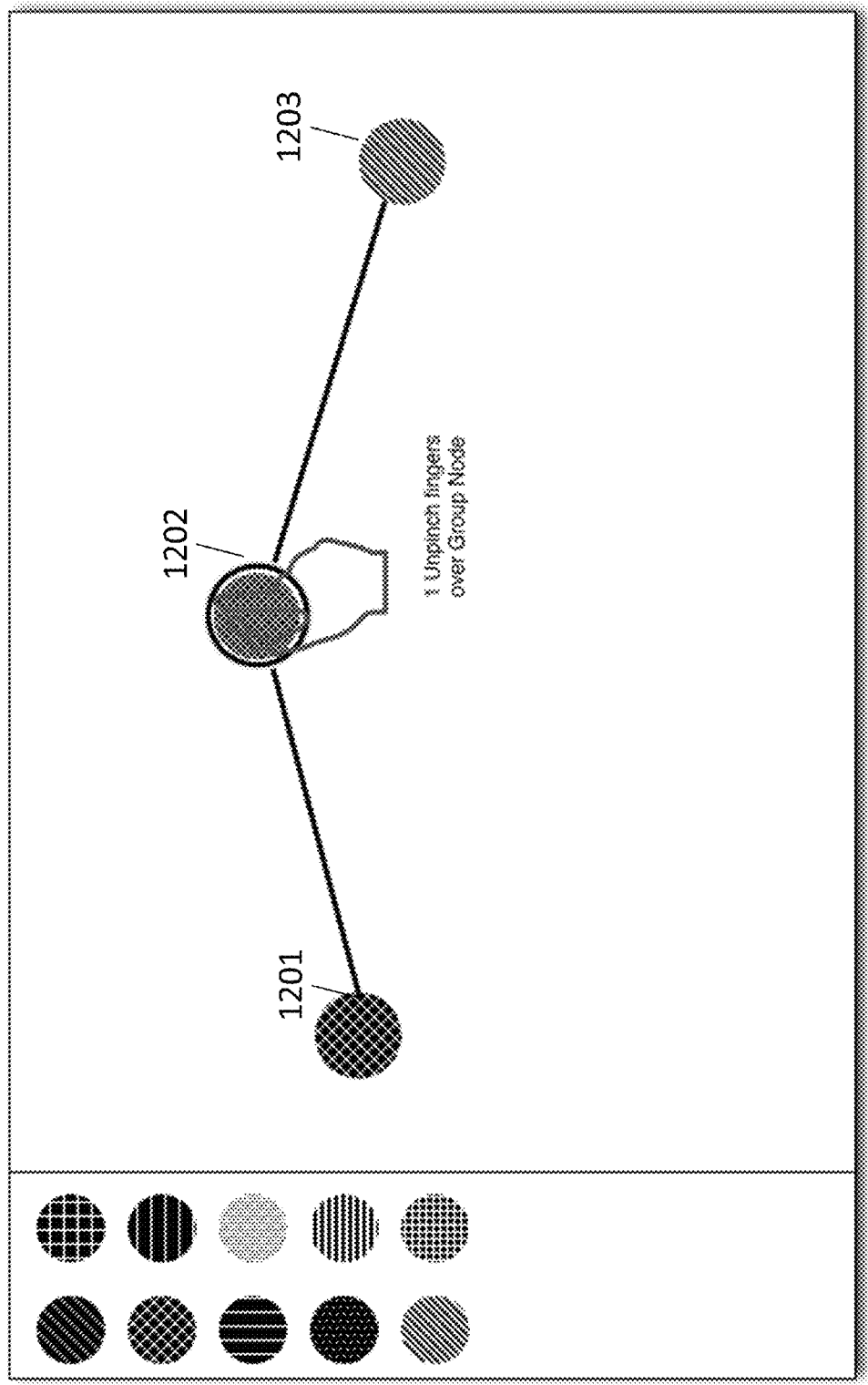
FIG. 12B: Expanding Subtrees

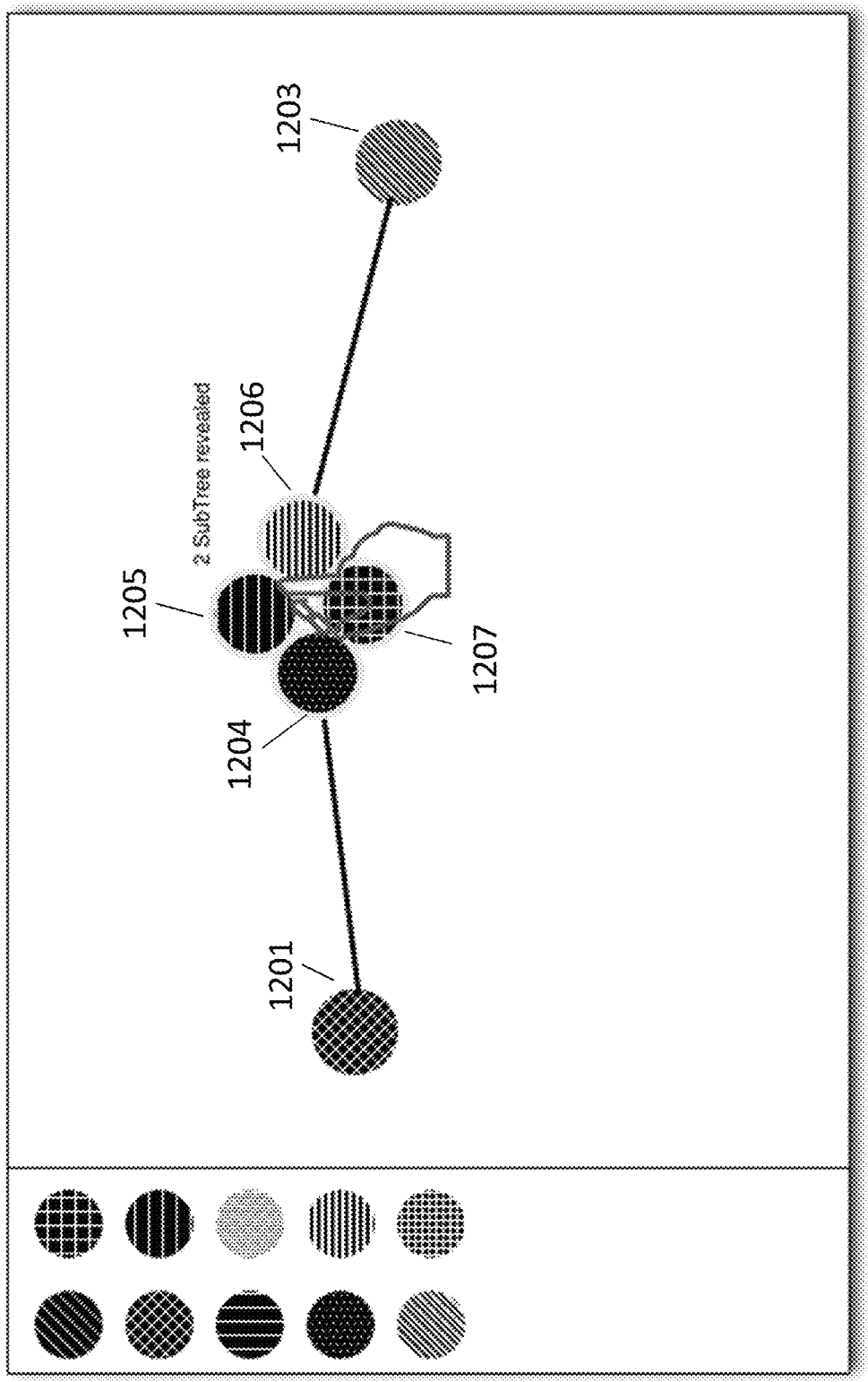
FIG. 12C: Expanding Subtrees

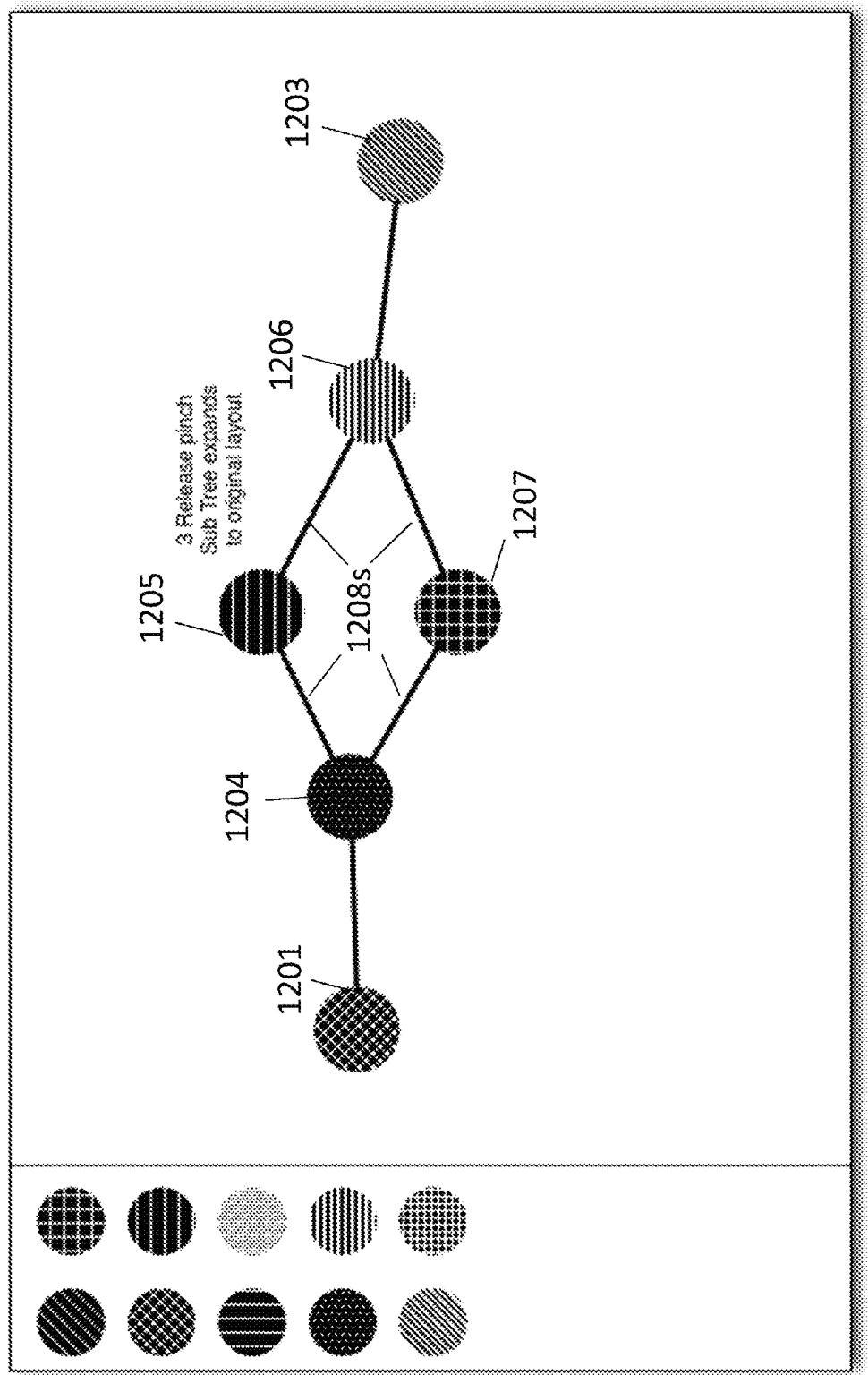
FIG. 12D: Expanding Subtrees

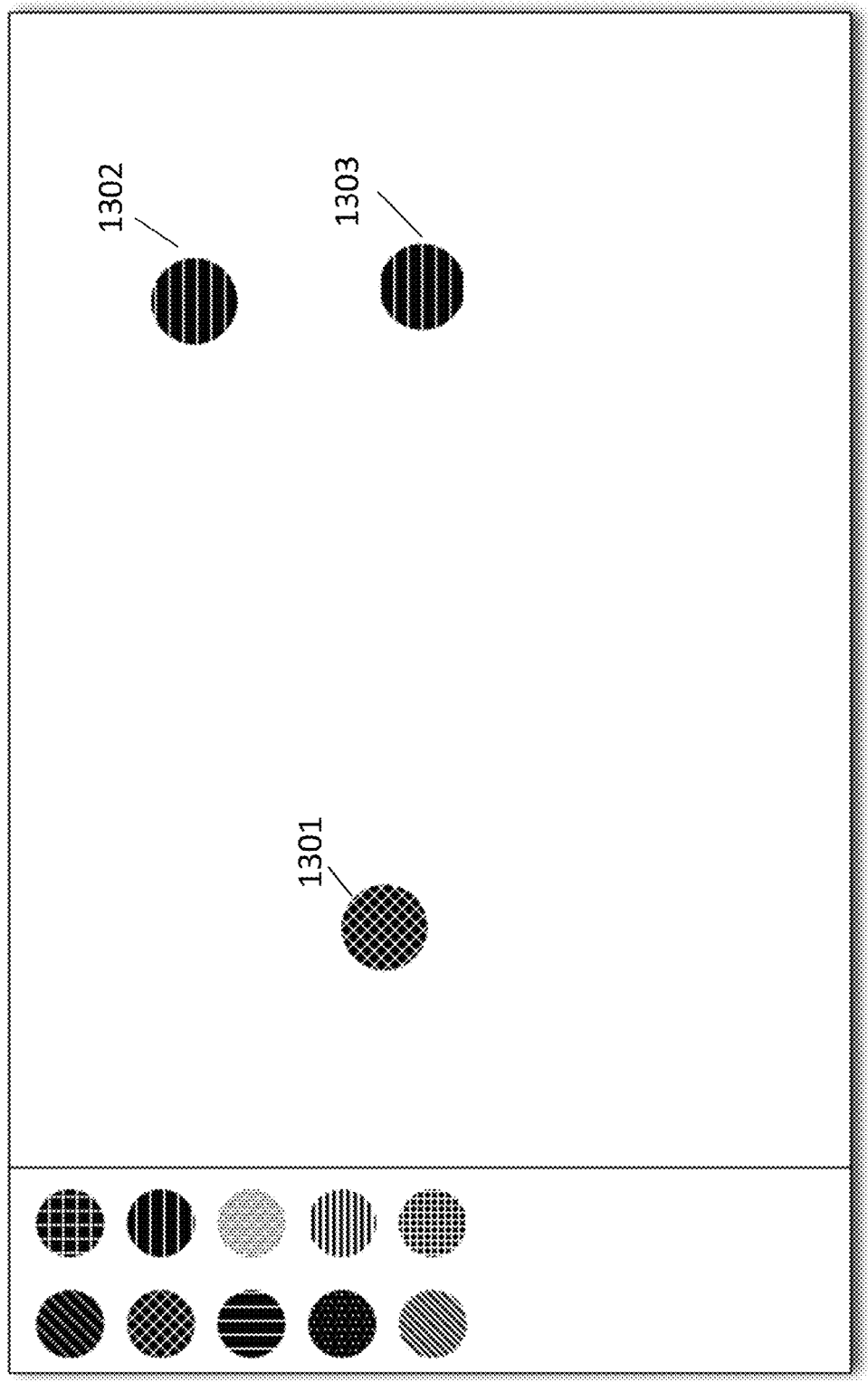
FIG. 13A: Connecting Node Ports

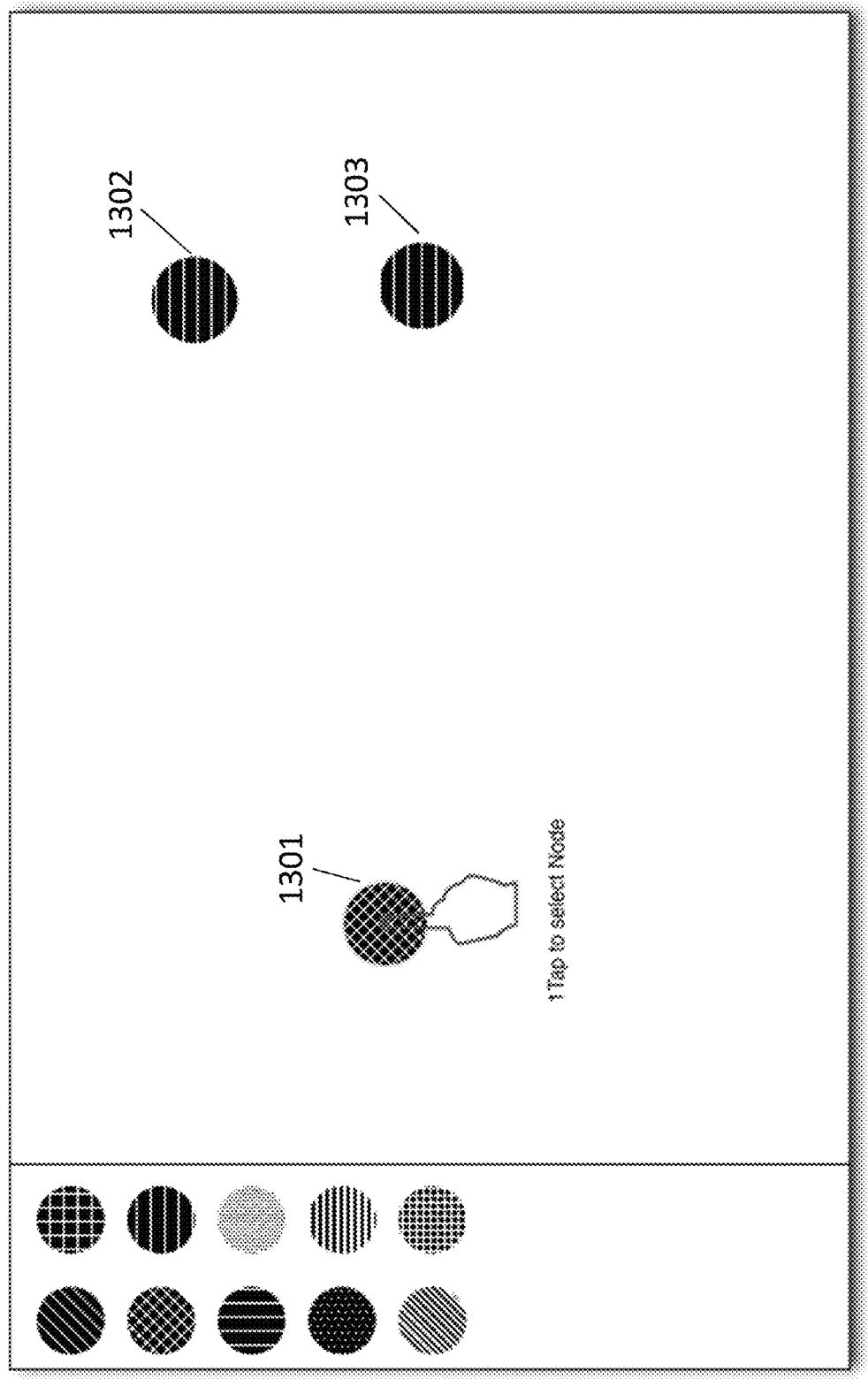

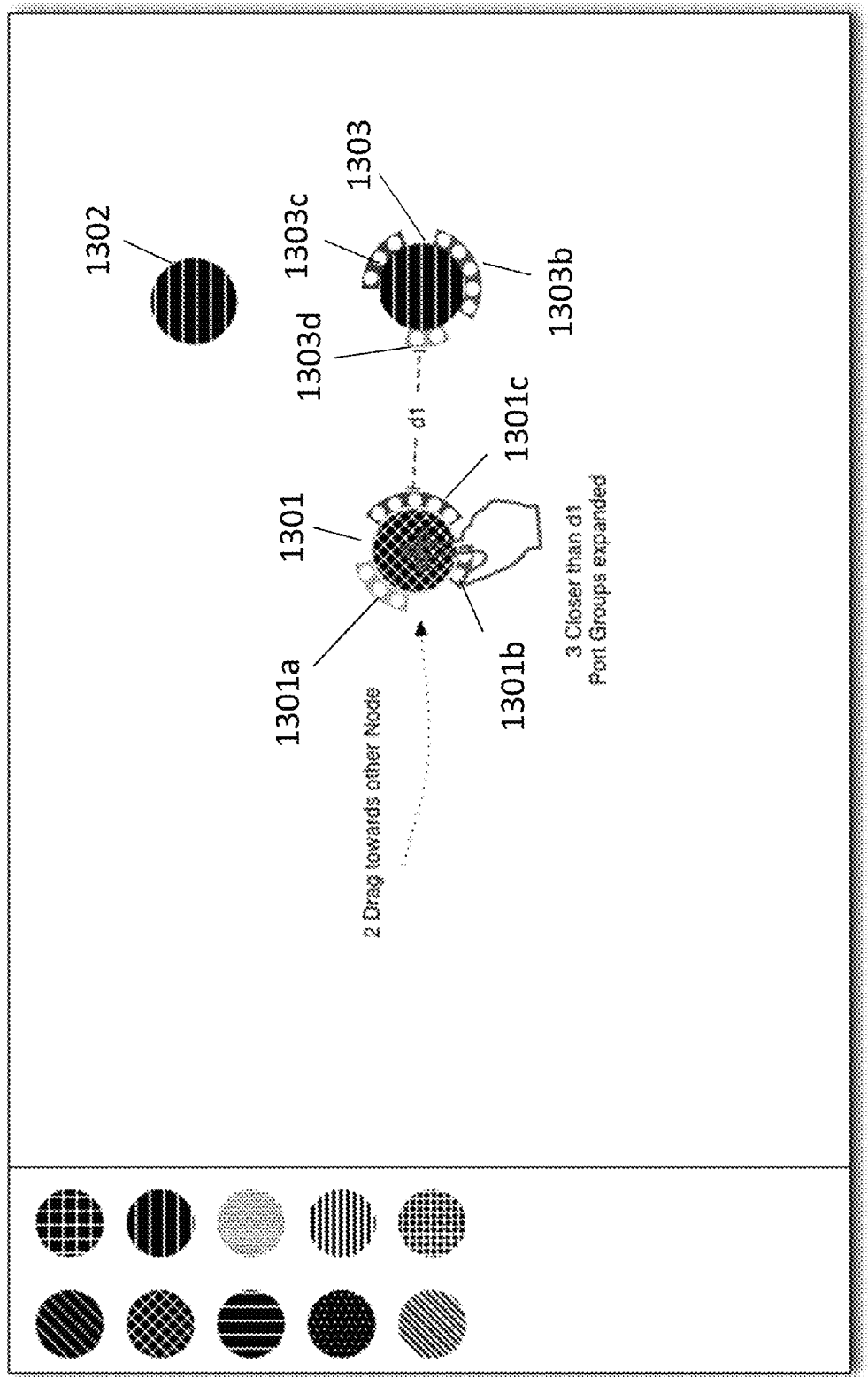
FIG. 13C: Connecting Node Ports

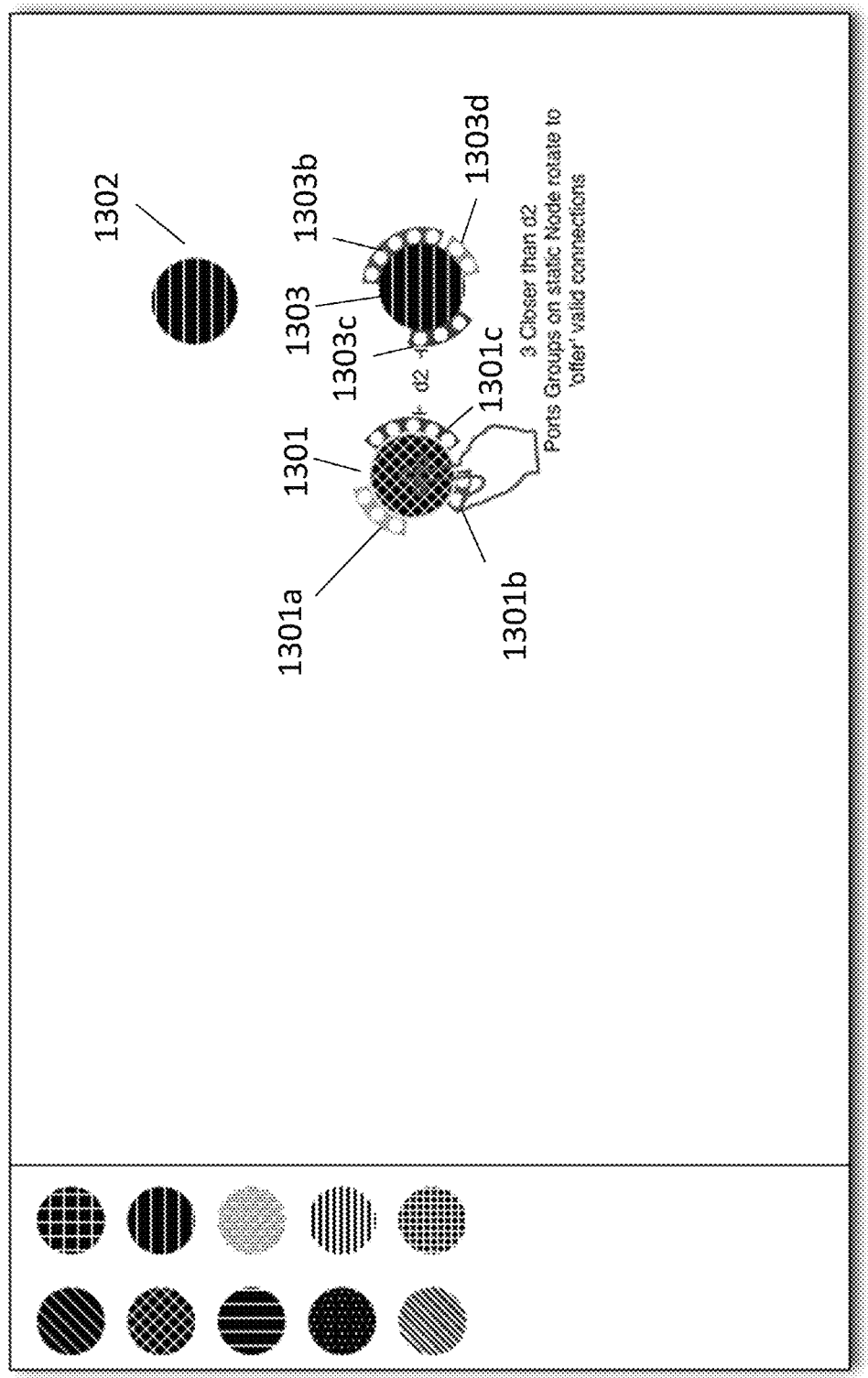
FIG. 13D: Connecting Node Ports

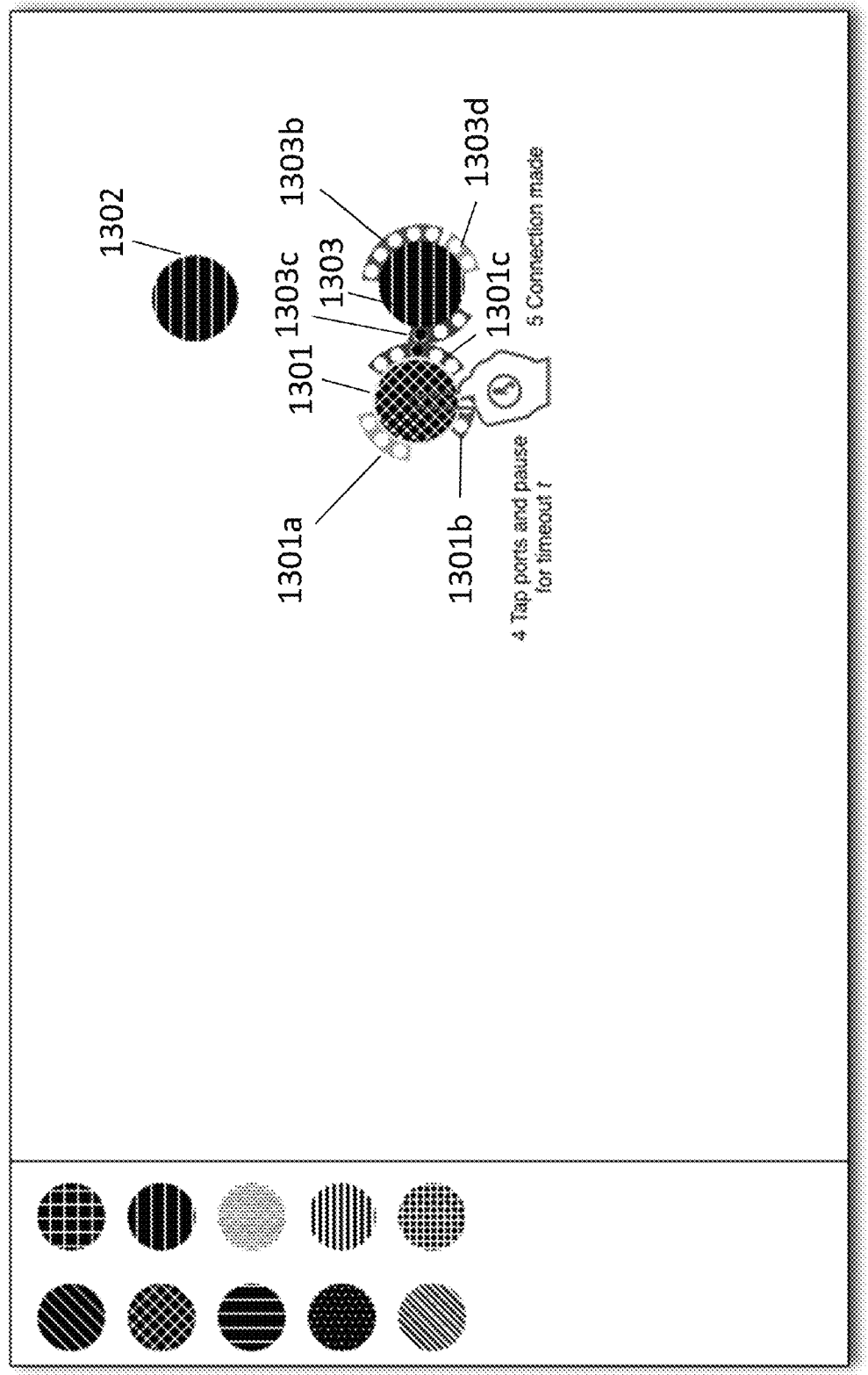
FIG. 13E: Connecting Node Ports

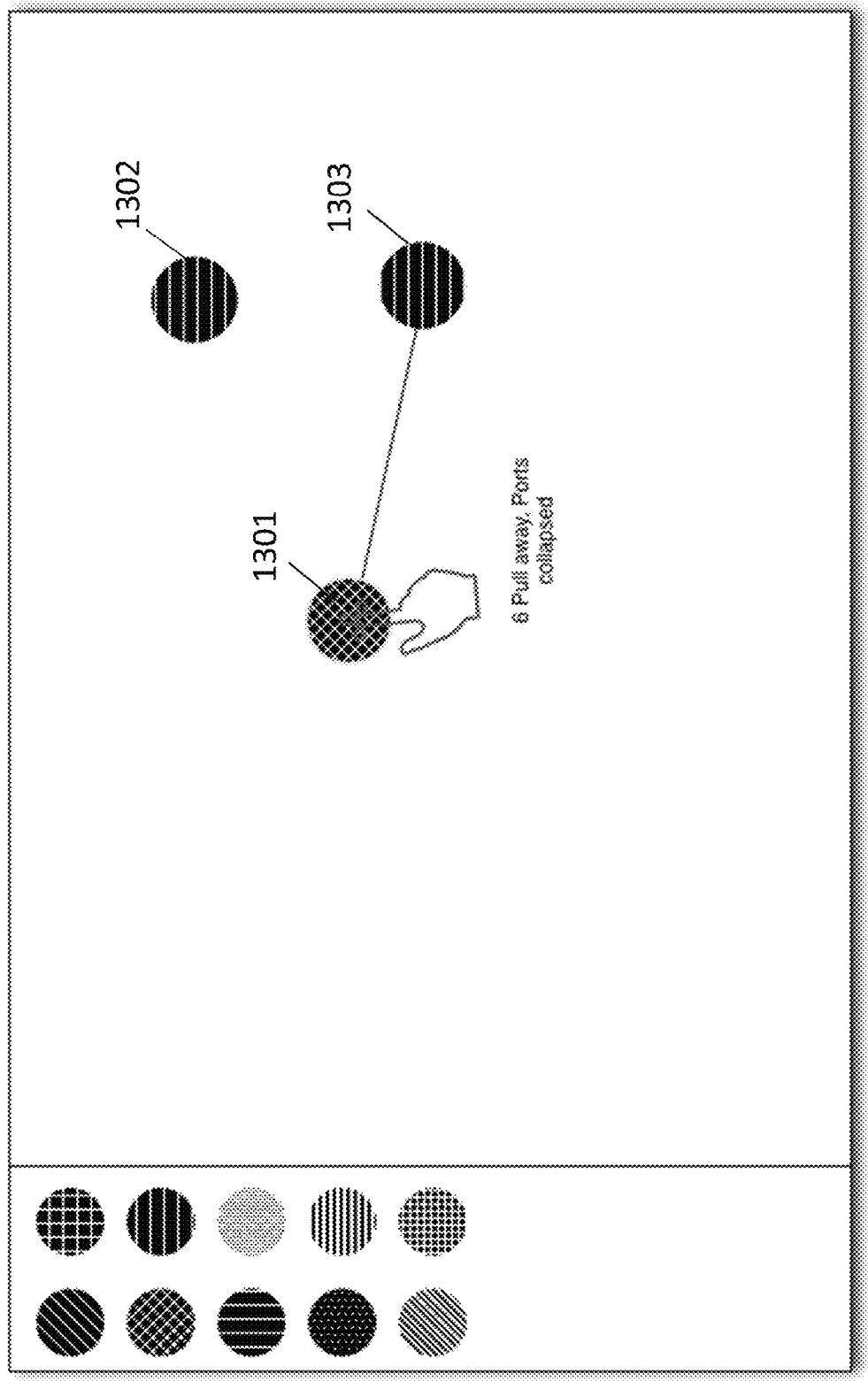
FIG. 13F: Connecting Node Ports

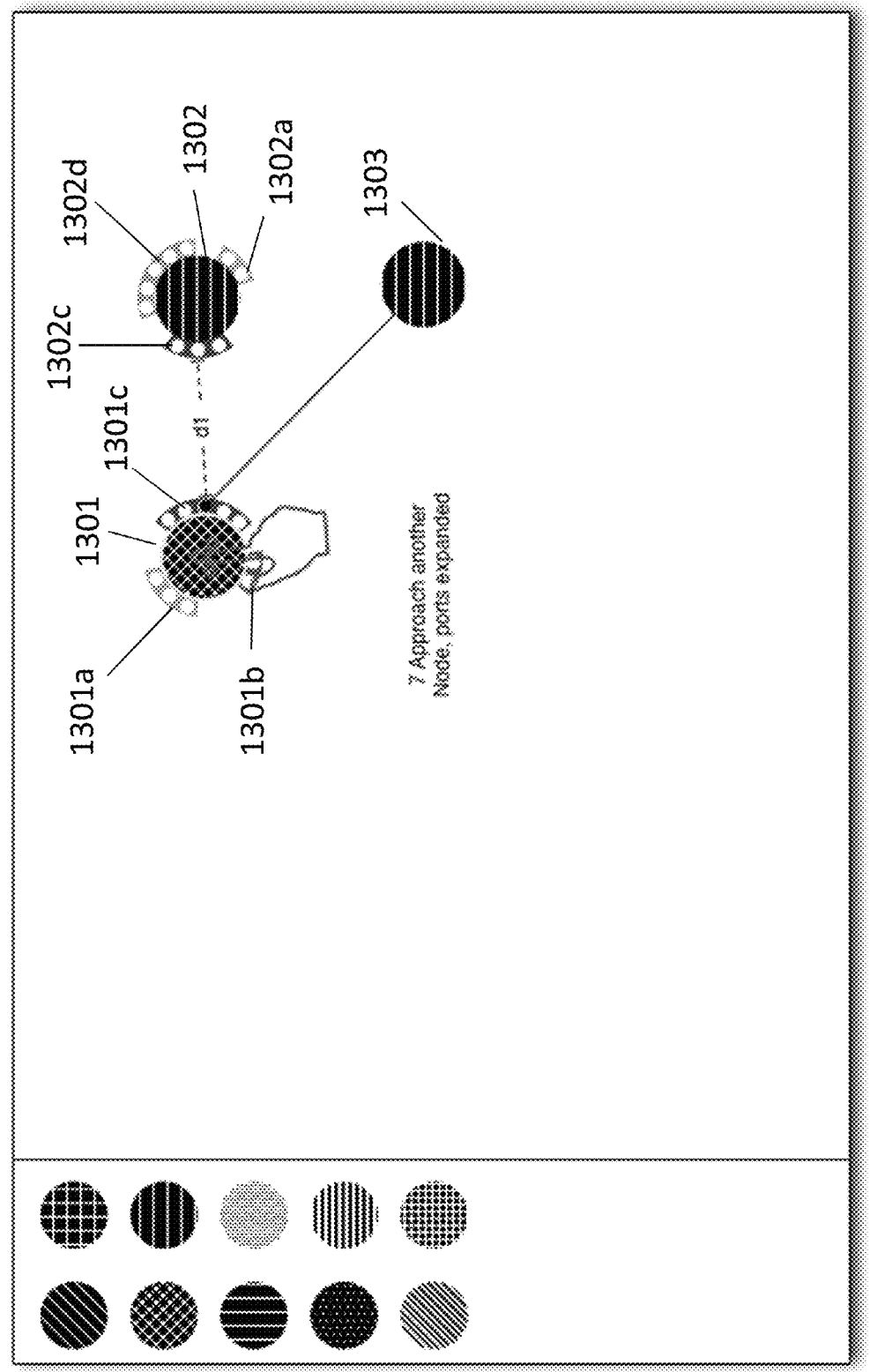
FIG. 13G: Connecting Node Ports

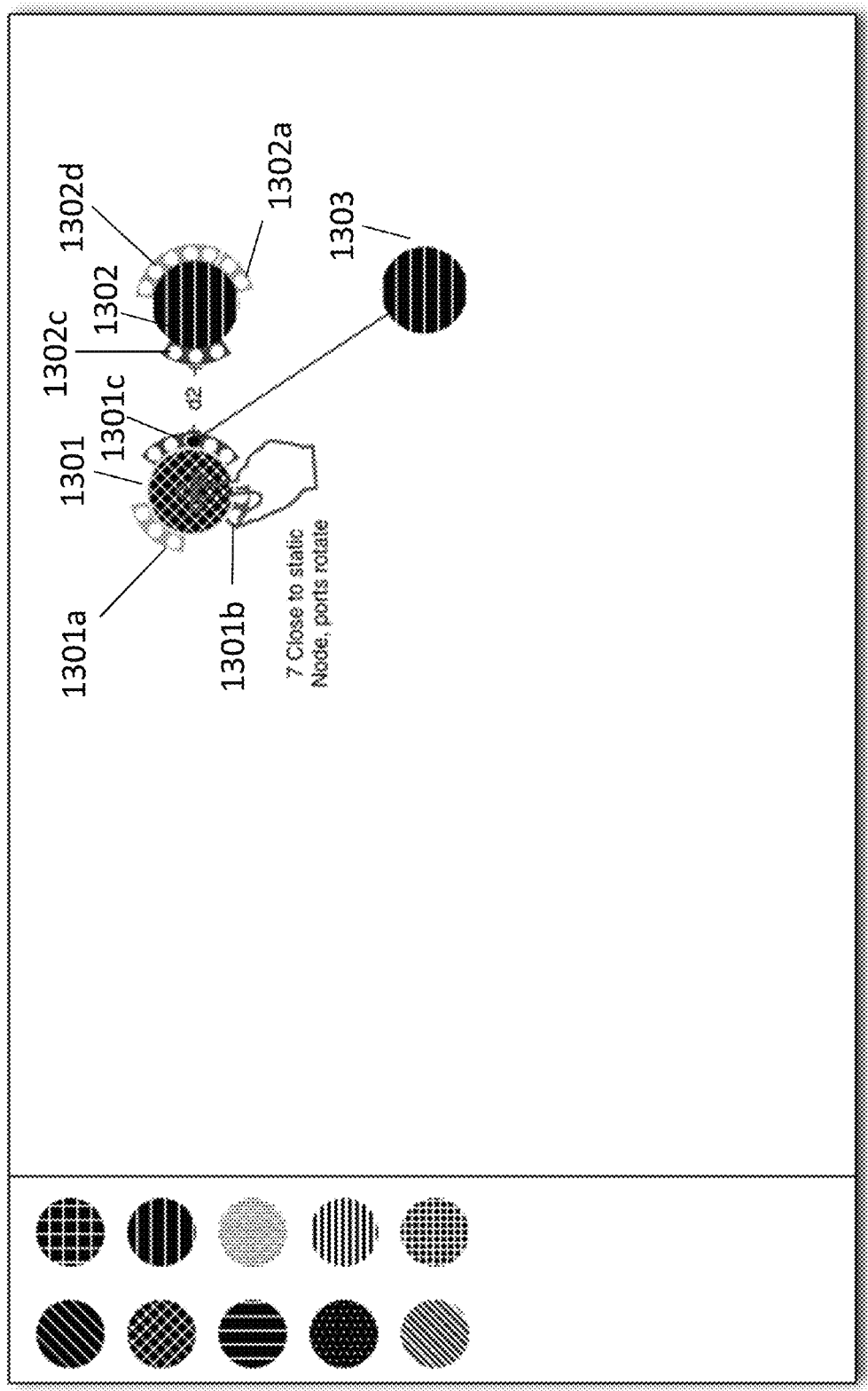
FIG. 13H: Connecting Node Ports

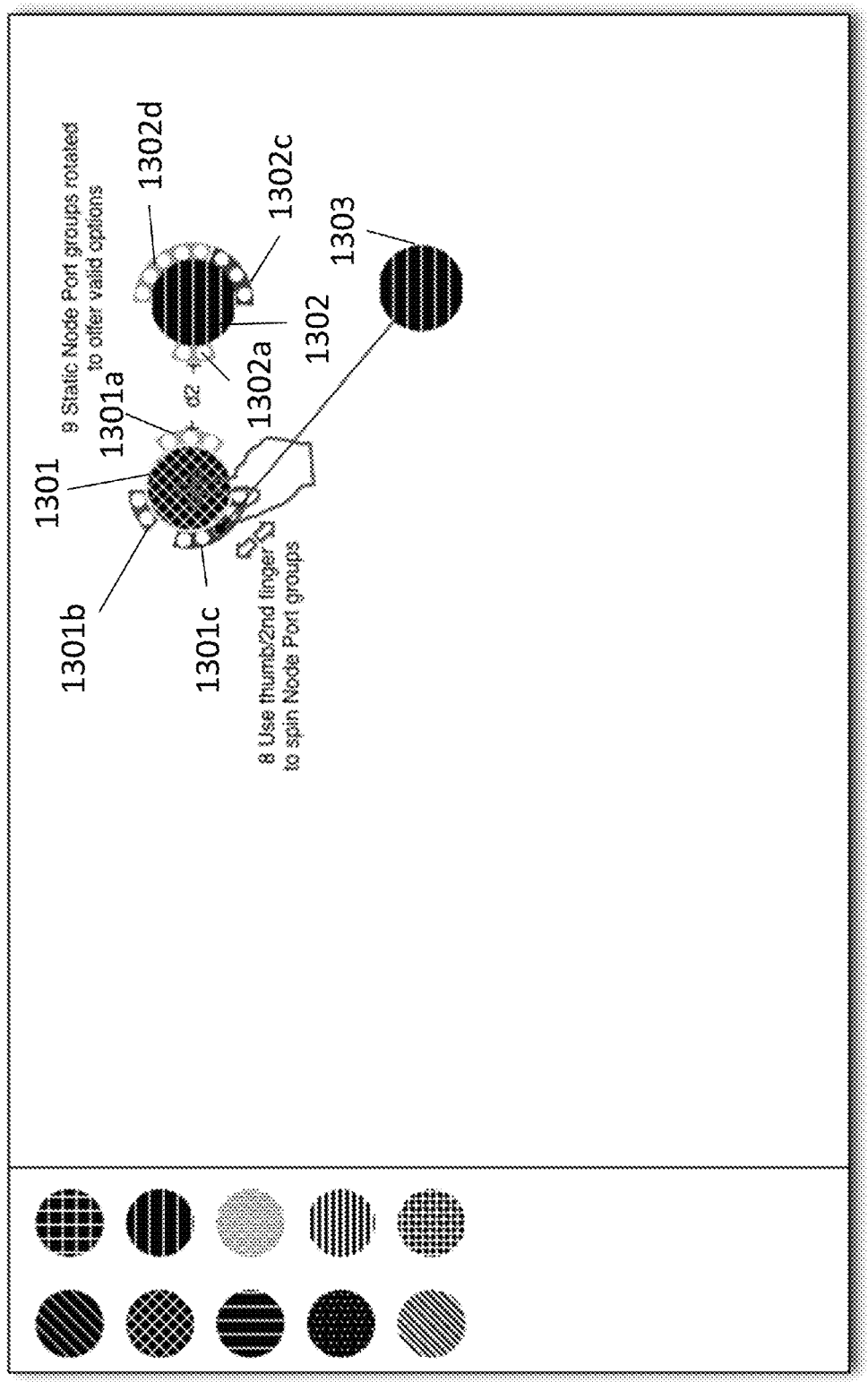

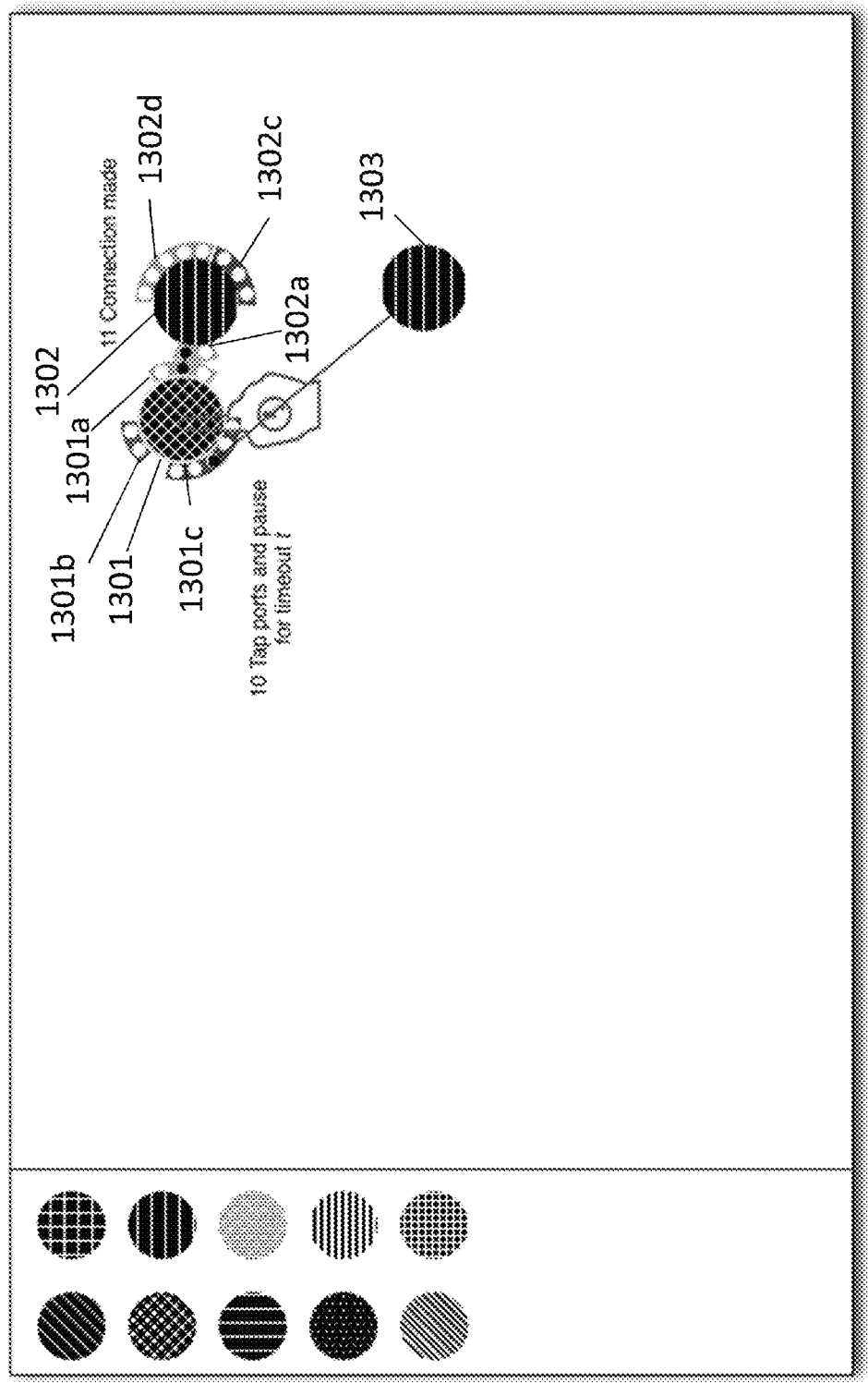
FIG. 13J: Connecting Node Ports

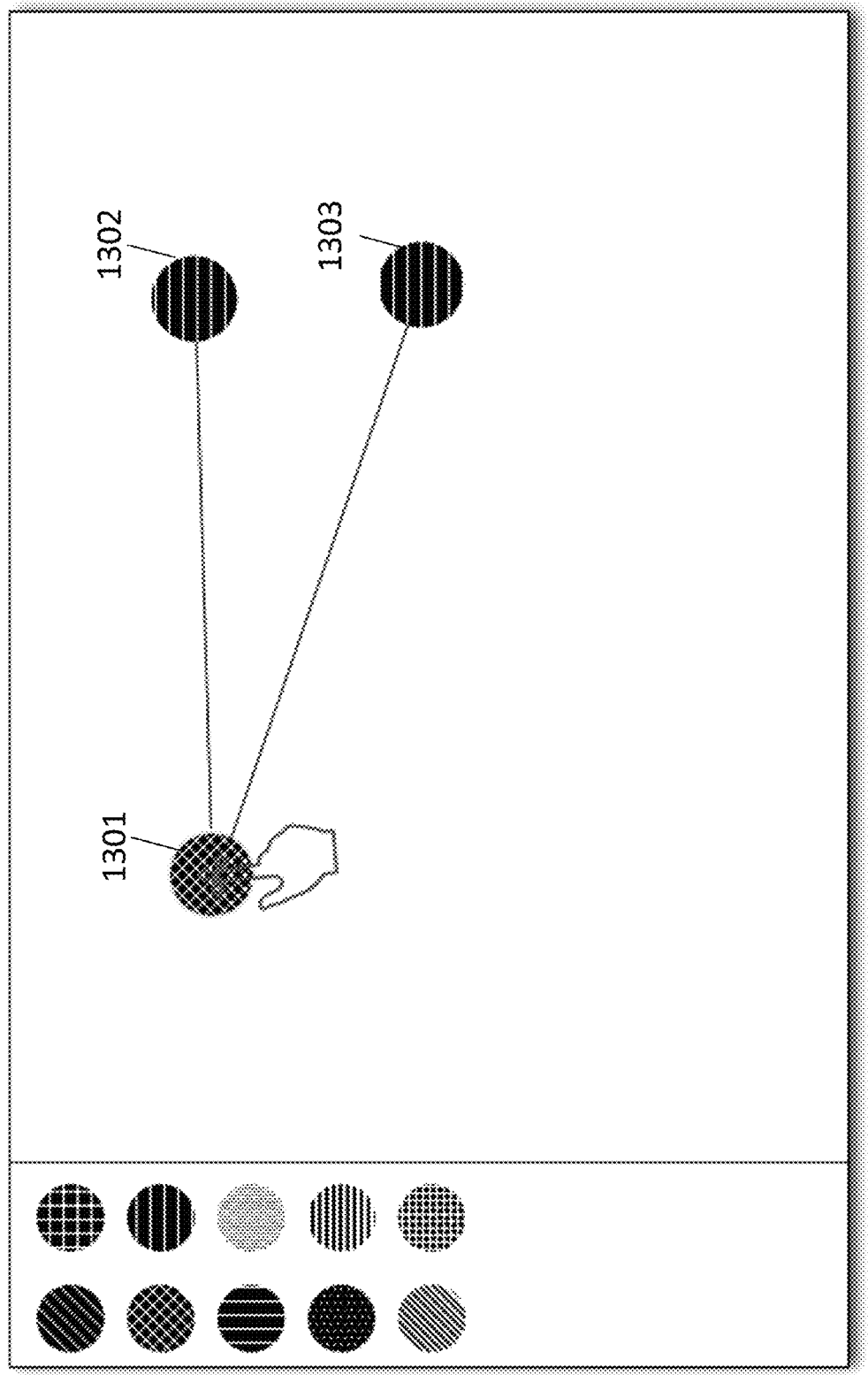

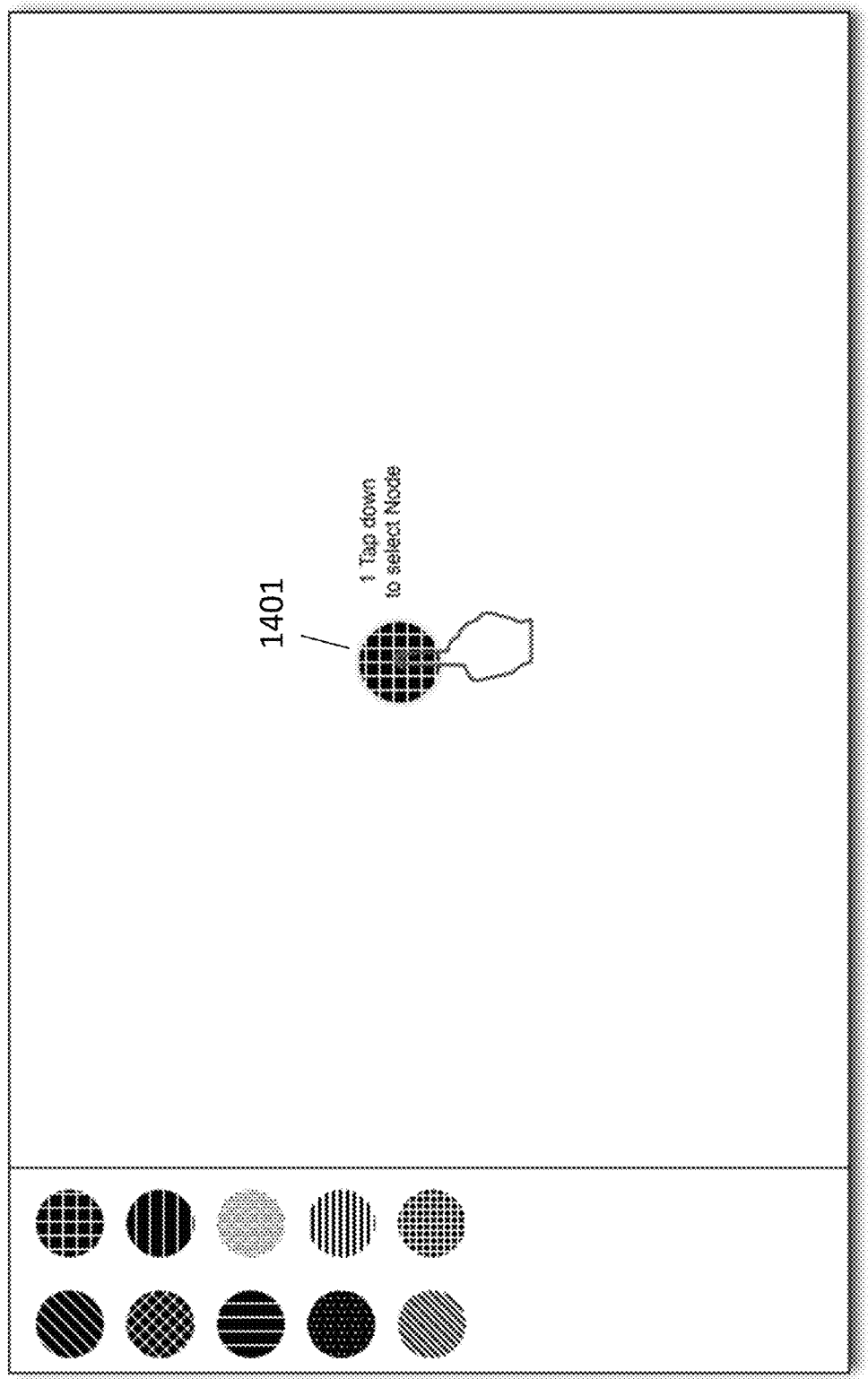

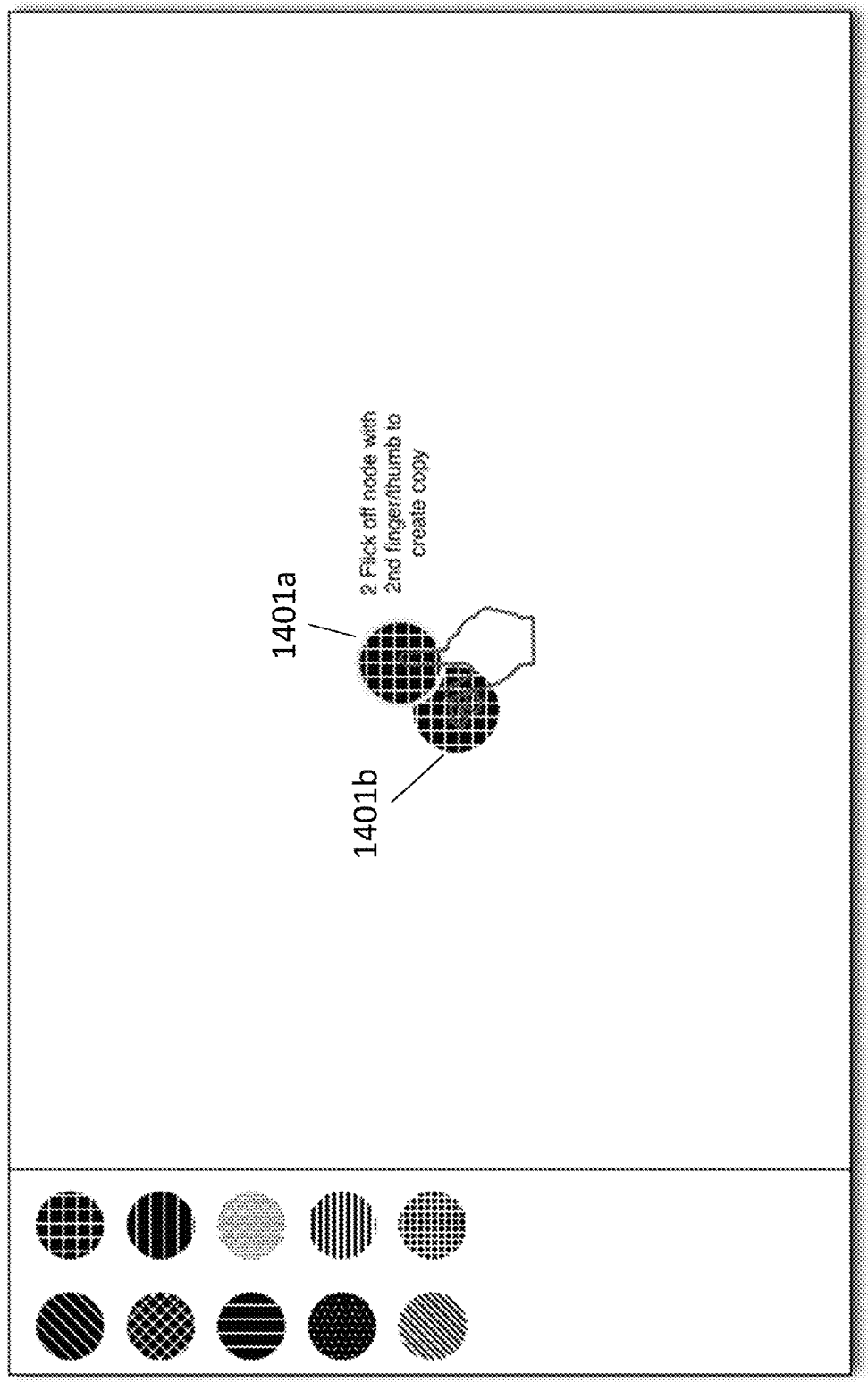
FIG. 14B: Copying Nodes

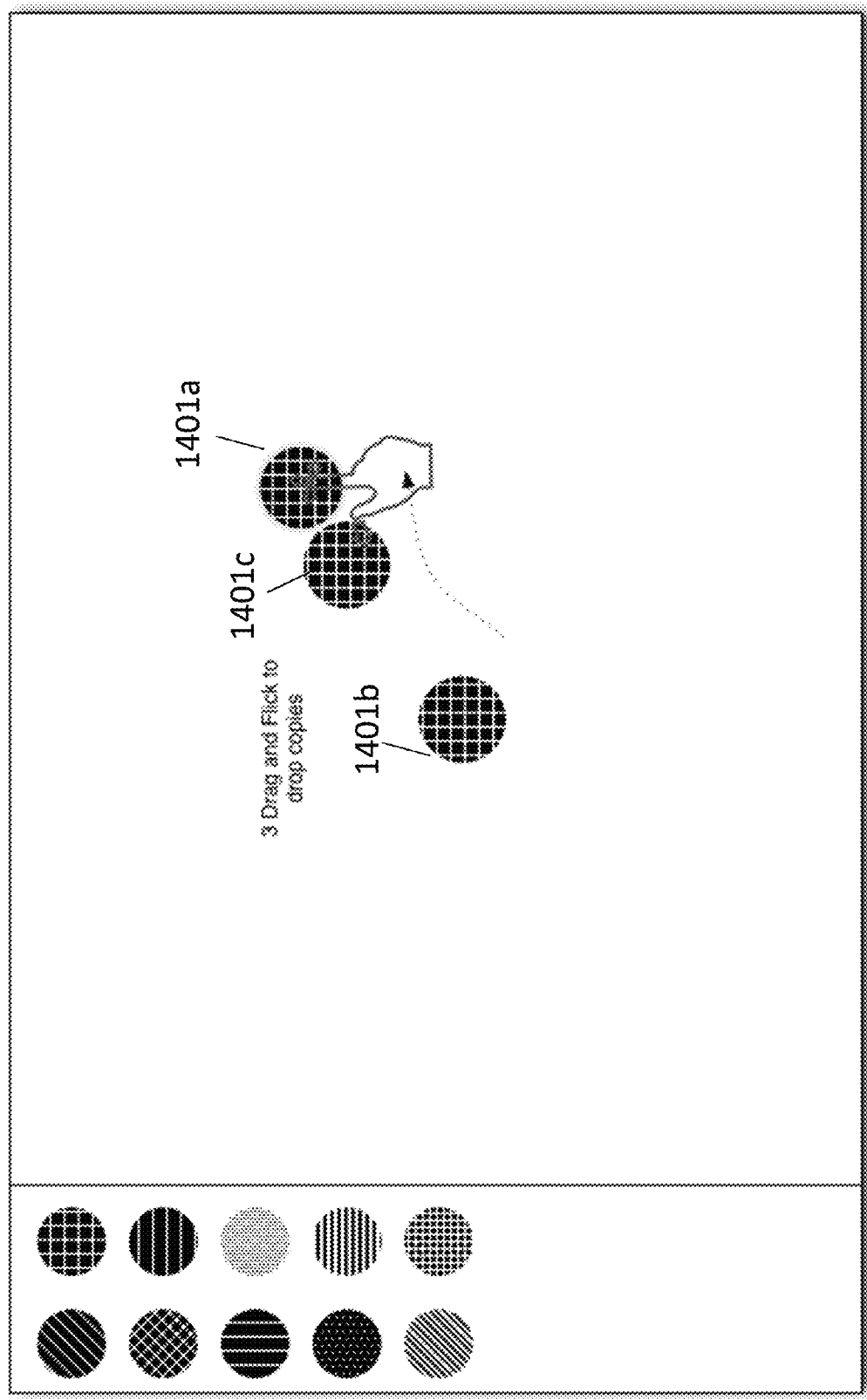

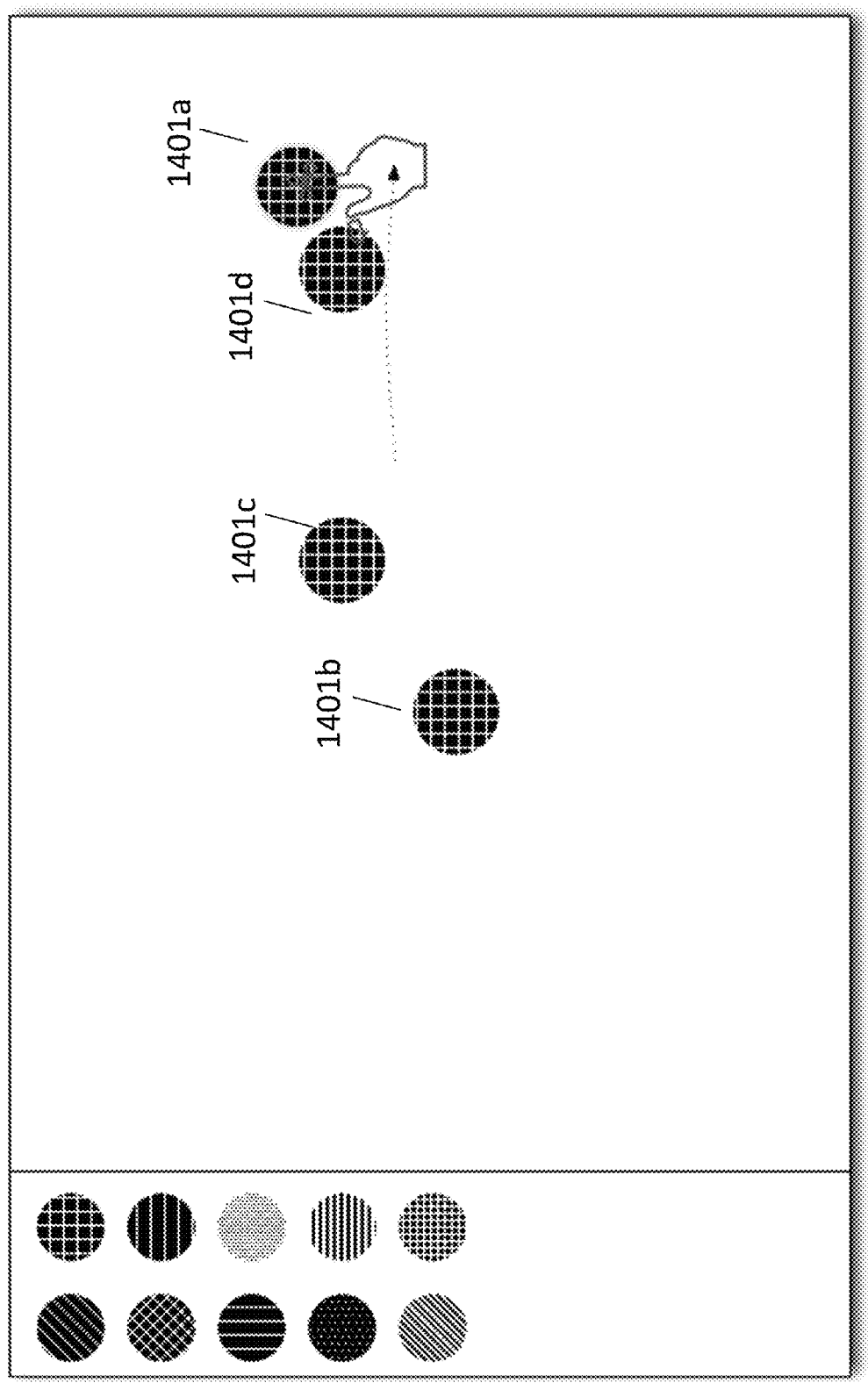

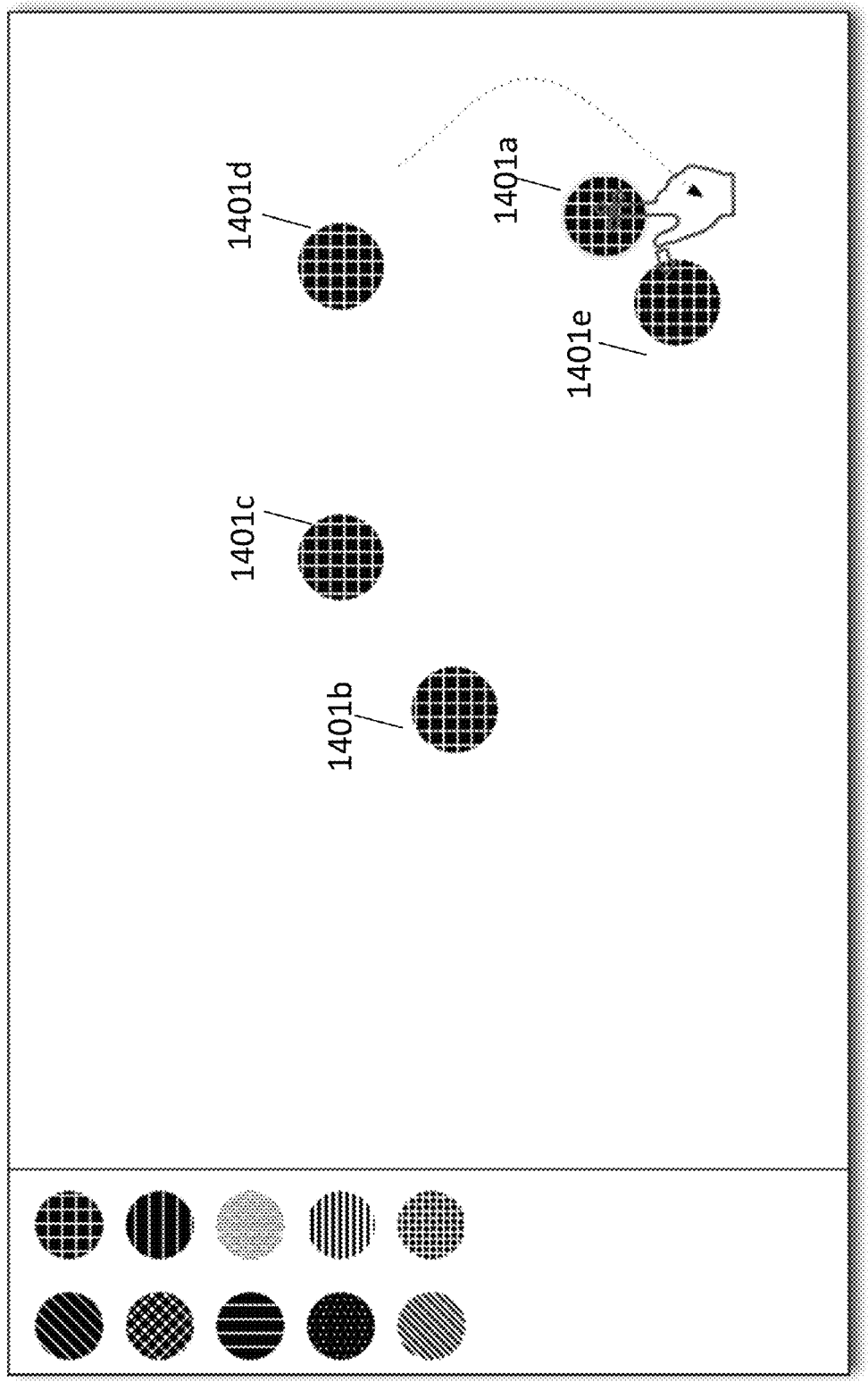
FIG. 14E: Copying Nodes

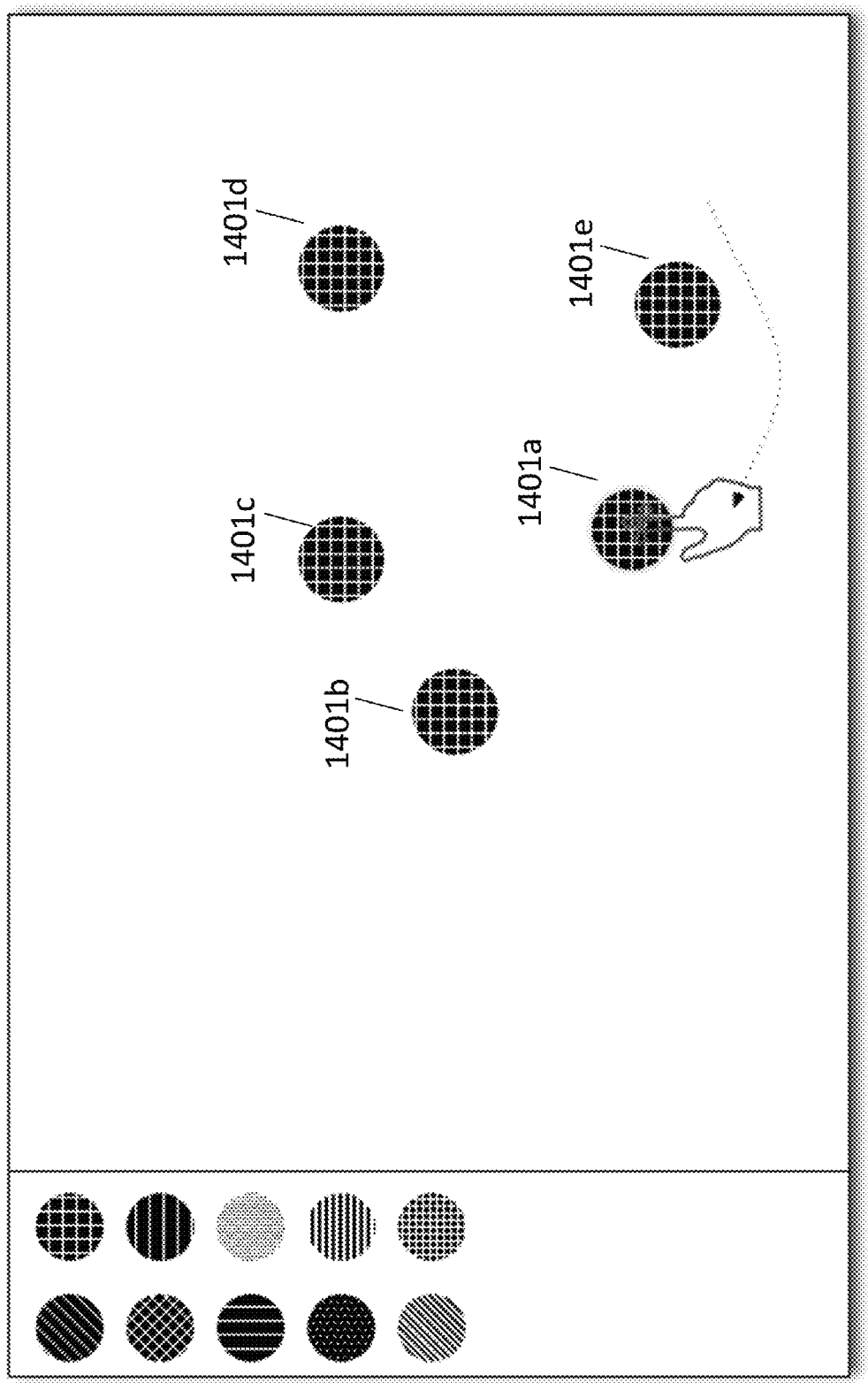
FIG. 14F: Copying Nodes

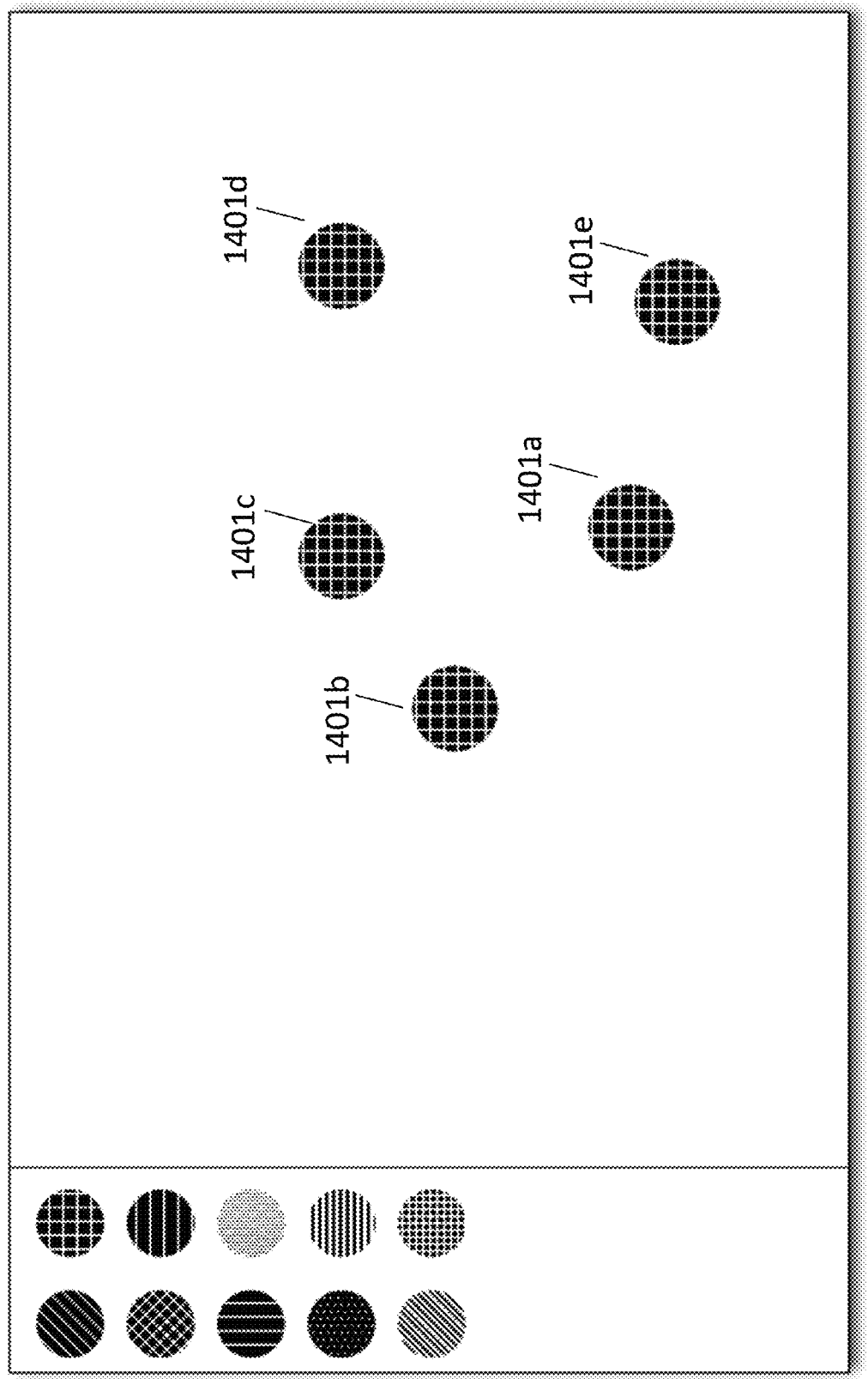

MULTI-TOUCH GESTURE-BASED INTERFACE FOR NETWORK DESIGN AND MANAGEMENT

TECHNICAL FIELD

The present disclosure relates generally to network design and management, and to graph interfaces.

BACKGROUND

Networks of computing devices may be designed or modeled using network design or modeling software that graphically represents different components of the network and relationships between those components (collectively, "network elements") as different nodes and other graphical elements on a graph. The nodes on the graph may be geometric shapes, glyphs, icons of devices, or other graphical representations of the devices. For example, different nodes may represent different routers, switches, hubs, servers, and other computing devices that are part of a network. Nodes may also represent collections or group of devices, logical or virtual components, or arbitrary collection of these. For example, the data and forwarding plane of a network switch may be represented as separate graphical objects even if contained in the same physical hardware object. Graphical connections such as line segments between the nodes may represent physical wired communicative couplings such as Ethernet, fiber, or USB; physical wireless communicative couplings such as satellite, Bluetooth, or wireless b, n, or g signaling; or logical communication sessions between the different nodes. A graph of nodes in a network may be constructed as information is inputted by a user into the network design or modeling software. In some systems, an initial graph may be constructed by the network design and modeling software automatically, by crawling the network and discovering devices that are on the network. This initial graph may be modified or customized by a user.

Network design or modeling software often includes a graph interface that allows graph nodes, graphical connections, and other graphical elements to be added, removed, arranged, or grouped on the graph. The graph interface may also support panning such that different portions of the graph may be viewed, and zooming such that portions of the graph may be viewed in more or less detail. In one example, the graph interface may include a toolbar or tool palette of selectable tools or modes for adding, removing, arranging, or grouping nodes, graphical connections, and other graphical elements, or for zooming or panning on the graph. Switching between multiple tools or modes and managing multiple nodes or groups of nodes, such as tens, hundreds, or more nodes, could involve several large cursor movements, precise clicks or selections on the part of the user, and repeated actions by the user. A single erroneous click may result in the loss of prior input. For example, a user may select several nodes by holding down the SHIFT key, and an erroneous click or a mistaken lift of a finger from the SHIFT key could cause a de-selection of the nodes already selected.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Methods, computing devices, and computer-readable media are provided for interpreting gestures and triggering actions on a graph when the gestures are detected. The triggered actions may include the addition or deletion of nodes, connections between nodes, or connections between node ports; the expansion or collapse of a set of nodes; or the copying of nodes. The input may describe an action of selecting, dragging, holding, flicking, shaking, pinching, unpinching, or spinning a graphical object such as a node or a connection. Gesture interpretation logic determines whether the input matches a stored or known gesture. If the input matches a gesture, then the gesture interpretation logic may perform an action mapped to the gesture instead of or in addition to the normal action that would otherwise be caused by each individual input.

BRIEF DESCRIPTION OF THE DRAWINGS

In the drawings:

FIG. 5A, FIG. 5B, FIG. 5C, FIG. 5D, FIG. 5E illustrate an example interface for connecting a node to other nodes by dragging and holding the node in contact with the other nodes.

FIG. 6A, FIG. 6B, FIG. 6C, FIG. 6D, FIG. 6E, FIG. 6F, FIG. 6G, FIG. 6H illustrate an example interface for connecting a subtree of nodes to other nodes by dragging and holding the subtree in contact with the other nodes.

FIG. 7A, FIG. 7B, FIG. 7C, FIG. 7D, FIG. 7E illustrate an example interface for inserting a node on a connection between other nodes by dragging and holding the node over the connection.

FIG. 8A, FIG. 8B, FIG. 8C, FIG. 8D, FIG. 8E, FIG. 8F, FIG. 8G illustrate an example interface for inserting a subtree of nodes on a connection between other nodes by dragging and holding the subtree over the connection.

FIG. 9A, FIG. 9B, FIG. 9C, FIG. 9D illustrate an example interface for tearing a node from a connection with other nodes by shaking the node.

FIG. 10A, FIG. 10B, FIG. 10C, FIG. 10D illustrate an example interface for tearing a subtree of nodes from a connection with other nodes by shaking the subtree.

FIG. 11A, FIG. 11B, FIG. 11C, FIG. 11D, FIG. 11E illustrate an example interface for folding or collapsing a subtree of nodes into a group node by pinching nodes of the subtree together.

FIG. 12A, FIG. 12B, FIG. 12C, FIG. 12D, illustrate an example interface for expanding a group node into a subtree of nodes by unpinching over the group node.

FIG. 13A, FIG. 13B, FIG. 13C, FIG. 13D, 13E, 13F, 13G, 13H, 13I, 13J, 13K illustrate an example interface for connecting a port of a node to ports of other nodes by dragging and holding the node near the other nodes.

FIG. 14A, FIG. 14B, FIG. 14C, FIG. 14D, 14E, 14F, 14G illustrate an example interface for copying a node by flicking off copies of the node as the node is dragged.

DETAILED DESCRIPTION

Figure 1:
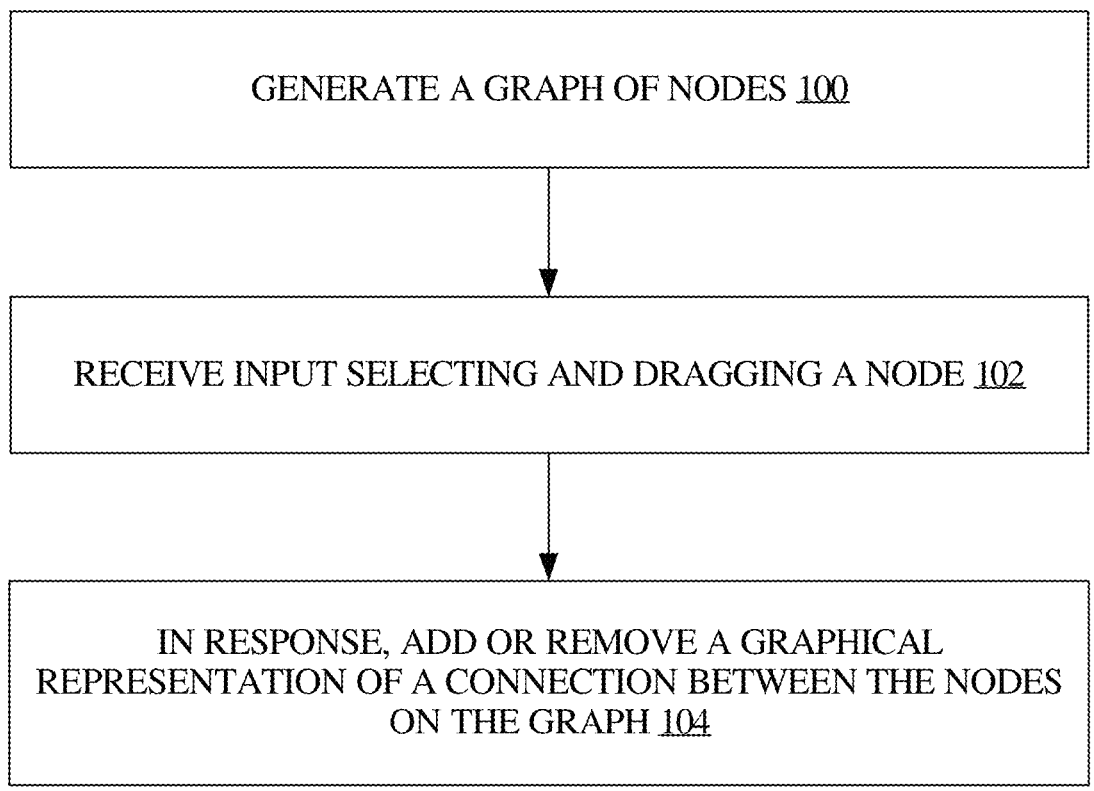
FIG. 1 illustrates a method for adding or removing a connection between nodes by dragging a node on a graph.

In various embodiments, a multi-touch gesture-based interface for network design and management, and related processes and techniques, are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Example Gesture-Based Interfaces
   3.1 Connecting Nodes and Subtrees
   3.2 Inserting Nodes and Subtrees
   3.3 Tearing Nodes and Subtrees
   3.4 Expanding Group Nodes and Collapsing Subtrees
   3.5 Connecting Node Ports
   3.6 Copying Nodes
4.0 Implementation Mechanisms—Hardware Overview
5.0 Extensions and Alternatives

---

1.0 General Overview

In an embodiment, multi-touch gesture-based interface for network design and management is described. Various example mappings of gestures to actions are provided herein. However, these mappings may be modified for different systems. Also, different systems may recognize different combinations of gestures or perform different combinations of actions. Therefore, the individual examples are not required in every implementation.

In an embodiment, a computer-implemented method is performed to add or remove a connection between graph nodes. Computing device(s) may be specially configured to generate a network topology graph in computer memory comprising data representations of graph nodes that represent network elements. In one example, the graph is displayed to a user via a touch-sensitive computer display unit. The computing device(s) receive input that selects and drags graph node(s) on the graph. In the example, the input may be touch input provided by user(s) interacting with the graph via the touch-sensitive display. Such input might not require any keyboard input from the user or other input that merely signals a certain mode of operation. For example, a node may be added or removed using touch and/or mouse gestures without using any keyboard input, such as CTRL, SHIFT, or ALT, to signal certain modes of operation. Touch input may comprise complex gestures of the user. The touch-sensitive display may be a multi-touch display that allows one node to be selected and held while another node is also selected and capable of communicating, to the computing device(s), data representing locations of both selections. The selected nodes may be manipulated on the graph as a unified set of nodes. In response to the input, the computing device(s) add or remove a graphical representation of a connection between graph nodes. The graphical representation may be added while the user is manipulating graph node(s) (i.e., before the user has completed manipulating the graph node(s)) by selecting, dragging, holding, or modifying the graph node(s), or after the user has completed manipulating the graph node(s).

In one embodiment, the computing device(s) receive input that drags and holds graph node(s) within a threshold distance of other graph node(s) for a threshold amount of time. In response to the input, the computing device(s) add a connection between the dragged and held graph node(s) and the other graph node(s). In one embodiment, the computing device(s) receive both a first input that drags and holds graph node(s) within a threshold distance of other graph node(s) for a threshold amount of time, and a second input that drags the graph node(s) away from the other graph node(s). An underlying connection between the dragged and held graph node(s) and the other graph node(s) and/or a graphical indication of the connection may be created in response to the first input or the second input. In one example, the graphical representation of the connection spans from the graph node(s) to the other graph node(s) on the graph.

In one embodiment, the input aligns a port of a selected set of nodes with a port of another set of nodes. For a network element represented by a node, a "node port" is part of the network element that can be separately treated, and the node port may be graphically represented as part of the node. For example, the port may be one of many physical or logical sockets for receiving or sending information on a connection to or from the network element. In one embodiment, selected node(s) are spun about their center, with alignment input such as a hold input and a flick input, causing the selected node(s) to rotate until the port of the selected node(s) is aligned with a port of other node(s). The spinning of the node may be restricted to the subset of aligned or viable positions in relation to ports of another node. In another example, selected node(s) may be automatically aligned to a compatible port of other node(s) even without the alignment input. Ports may be compatible with each other based on port characteristic(s) such as the type of port, speed or reliability of the port, or protocol(s) that the port(s) are capable of handling. In an example, if there are multiple compatible ports between the selected node(s) and the other node(s), then a port of the selected node(s) and/or the other node(s) may be automatically selected for connection based at least in part on a distance between the port and the node to which the port is connecting. A port of the selected node that is closest to the other node may have a higher weight or higher likelihood of selection than a port of the selected node that is on the opposite side of, or furthest from, the other node. In another example, a port of the other node that is closest to the selected node may have a higher weight or higher likelihood of selection than a port of the other node that is on the opposite side of, or furthest from, the selected node.

Whether the ports are selected automatically by the computing device(s) or manually via user interaction with the graph to select specific ports, the computing device(s) may add the connection between selected ports when the ports are aligned and/or when the selected node is held within a threshold distance or in contact with the other node. Alternatively, the computing device(s) may add a connection between compatible ports when the input causes a connection to be added, even if the compatible ports are not aligned by the input.

In one embodiment, the added connection is one of multiple added connections. In one example, the input drags a selected set of node(s) over or within a threshold distance of a previously existing connection on the graph. The previously existing connection may connect other sets of nodes to each other such as, for example, a second set of non-selected nodes and a third set of non-selected nodes. If the selected set of node(s) is held over or within the threshold distance of the previously existing connection for a threshold amount of time, the previously existing connection may be broken to insert new connection(s). For example, the previously existing connection may be removed, and a first new connection may be created between the selected set of node(s) and the second set of node(s), and/or a second new connection may be created between the selected set of node(s) and the third set of node(s). If the previously existing connection was directional, such direction may be preserved with the new connections. In one embodiment, the selected set of node(s) includes two or more nodes. For example, the two or more nodes may have been selected by multi-touch input that holds a first node (via a touch from a first finger or stylus) while the second node is selected (via a touch from a second finger or stylus).

In one embodiment, the input selects and shakes node(s). Such input might not require any keyboard input from the user or other input that merely signals a certain mode of operation. For example, a node may be selected and shaken using touch and/or mouse gestures without using any keyboard input, such as CTRL, SHIFT, or ALT, to signal certain modes of operation. In response to the input, the computing device(s) remove a connection between the selected node(s) and other node(s) on the graph. In one example, the node(s) are selected by multi-touch input, and the nodes are shaken with an up-down input or side-to-side input. Such input may be received, for example, when a user touches the node(s) and moves his or her finger back and forth on the screen. The shaking input may be detected when the selected node(s) are moved back and forth rapidly, above a threshold rate.

In an embodiment, a computer-implemented method is performed to expand or collapse a set of graph nodes. Computing device(s) may be specially configured to generate a network topology graph that includes graph nodes that represent network elements. The computing device(s) receive a first input that selects a set of nodes. For example, the first input may be multi-touch input that holds a first graph node while a second graph node is selected, forming a selected set that includes the first graph node and the second graph node. The computing device(s) may then receive a second input moving toward or away from a third input. For example, the input may be associated with different display positions that are moving away from or toward each other. Such input may be caused by, for example, two fingers moving toward or away from each other on a multi-touch display. Such input might not require any keyboard input from the user or other input that merely signals a certain mode of operation. For example, a node may be expanded or collapsed using touch and/or mouse gestures without using any keyboard input, such as CTRL, SHIFT, or ALT, to signal certain modes of operation. In response to the input, the selected set of nodes are expanded or collapsed on the graph. Collapsing the set may include replacing separately selectable graphical representations for each of the nodes of the set with a single selectable graphical representation of the nodes of the set. On the other hand, expanding the set may include replacing a single selectable graphical representation of the nodes of the set with separately selectable graphical representations of each of the nodes of the set.

In an embodiment, a computer-implemented method is performed to copy graph node(s). Computing device(s) may be specially configured to generate a network topology graph that includes graph node(s) that represent network element(s). The computing device(s) receive a first input that selects and holds a set of node(s) while a second input flicks the set of node(s). For example, the first input may be multi-touch input that holds a first graph node while a second graph node is selected, forming a selected set that includes the first graph node and the second graph node. The second input may be, for example, touch input that is generated when a user flicks a finger away from the selected set of node(s). Such input might not require any keyboard input from the user or other input that merely signals a certain mode of operation. For example, a node may be copied using touch and/or mouse gestures without using any keyboard input, such as CTRL, SHIFT, or ALT, to signal certain modes of operation. In response to the first and second inputs, the set of node(s) is copied on the graph. For example, the set of node(s) may be copied from their current location on the graph to another location away from their current location and in the direction of the second input.

Various computer-implemented methods are described. In other embodiments, a computing device may be configured to carry out the foregoing steps, or a computer-readable medium may stores instructions that, when executed, cause performance of the foregoing steps. All such steps and operations may involve the manipulation of data in computer memory to create, update or delete data representing graph nodes, edges, and other elements as further described herein.

Techniques may be described as utilizing a multi-touch interface, but other interfaces are also available for accepting similar types of input, which may include multi-part input or single-part input. For example, a touch interface may be used for many of the gestures described, whether or not the touch interface recognizes multiple touches simultaneously. As another example, a mouse or touchpad interface may be used to receive similar gesture input. In yet another example, a Microsoft Kinect motion-based interface may be used to receive similar gesture input, which may be single-part input or multi-part input that is captured from a camera and/or infrared sensors. The motion-based interface may recognize hand-waiving, other hand or arm movement, or even head, leg, or body movement. Such movements may amount to selecting, dragging, holding, flicking, shaking, pinching, unpinching, or spinning inputs.

In addition to a variety of input methods, the interface may also provide tactile, visual, audible or other forms of feedback when connections are formed or broken, or when nodes are placed with valid configurations aligned. In one example, a user device vibrates when a gesture is triggered or completed. In another example, a display of the user device momentarily brightens or displays a color or graphic when a gesture is triggered or completed. In yet another example, the user device beeps when a gesture is triggered or completed. Feedback may also be provided in these forms whenever a user completes part of a gesture but fails to complete the entire gesture. For example, when user input holds a node over another node for over a first threshold amount of time but under a second threshold amount of time, negative feedback may be provided to the user to indicate that no connection was formed between the nodes. As another example, positive feedback different from the negative feedback may be provided when the user input holds the node over the other node for over the second threshold amount of time.

2.0 Structural and Functional Overview

In one embodiment, one or more computing devices include a gesture interpretation logic for performing the techniques described herein. The gesture interpretation logic interprets gestures and triggers different actions on the graph when different gestures are detected. The triggered actions may include, for example, the addition or deletion of a node(s), connection(s) between nodes, or connection(s) between node ports; the expansion or collapse of a set of nodes; or the copying of node(s). The gesture interpretation logic may listen to or receive input to a node manipulation logic. The input may have been generated by a touch-screen interface in response to a touch from a user, by a motion-based interface in response to a motion of a user, or by other interfaces such as a touchpad, a mouse, a keyboard, a joystick or direction pad, a trackball, a remote control, or a game controller. The input may describe an action of, for example, selecting, dragging, holding, flicking, shaking, pinching, unpinching, or spinning a graphical object such as a node or a connection. The gesture interpretation logic determines whether the input matches a stored or known gesture. If the input matches a gesture, then the gesture interpretation logic may perform an action mapped to the gesture instead of or in addition to the normal action that would otherwise be caused by each individual input.

The input may include input for selecting a subtree of nodes on a graph. This selecting input may be performed serially with consecutive user inputs, or in parallel with multiple user inputs overlapping in time. On a multi-touch interface, for example, a user may touch multiple nodes simultaneously with different fingers or styluses to select a group of the multiple nodes. Alternatively, the user may select nodes one after another with the same finger or stylus. In another example, the user may drag a node from the graph to a grouping region on the graph interface, adjacent to, overlaying, or on the graph. Nodes in the grouping region may then be treated or manipulated as a group, and a group node may be created on the graph to represent the grouping region. In yet another example, the user may draw a circle around a group of nodes to select the group. Once the group has been selected, the group is manipulated or moved around on the graph by dragging the group.

FIG. 1 illustrates a method for adding or removing a connection between nodes by dragging a node on a graph. In the method, computing device(s) are configured with specialized hardware and/or specialized software to generate, in block 100, a graph of nodes. The computing device(s) receive, in block 102, input that selects and drags a node.

In response, in block 104, the computing device(s) add or remove a graphical representation of a connection between nodes on the graph. In a first example, in response to input that causes the node to contact or move near another node, optionally held for a threshold amount of time, the computing device(s) create a connection between the node and the other node. In a second example, in response to input that moves a node near a connection or on a connection between two other nodes, optionally held for a threshold amount of time, the computing device(s) insert the node on the connection by replacing the connection with two new connections, each of the new connections being between the node and one of the two other nodes. In a third example, in response to input that shakes node(s), optionally for a threshold amount of time or at a threshold rate, the computing device(s) tear the shaken node(s) from other node(s) on the graph by removing the connection between the other node(s) and the shaken node(s). In a fourth example, in response to input that causes a node port or a node to contact or move near another node port or node, optionally held for a threshold amount of time, the computing device(s) create a connection between the node port and the other node port.

In one embodiment, a connection that is added according to this technique may be added to and stored as a connection object in a data store that includes other graph elements. The connection object may identify the nodes for which the connection object serves as a connection and other information such as the type of connection and graphical information about the connection. The connection object may even contain a stored indication that the connection object was created using a gesture. A connection that is removed according to the technique described in FIG. 1 may be removed from a set of connection object(s) and other graph elements that are stored in a data store. In another embodiment, a "visible" flag for the connection object may be toggled to "off" when the connection is removed, without removing the connection object from storage.

Figure 2:
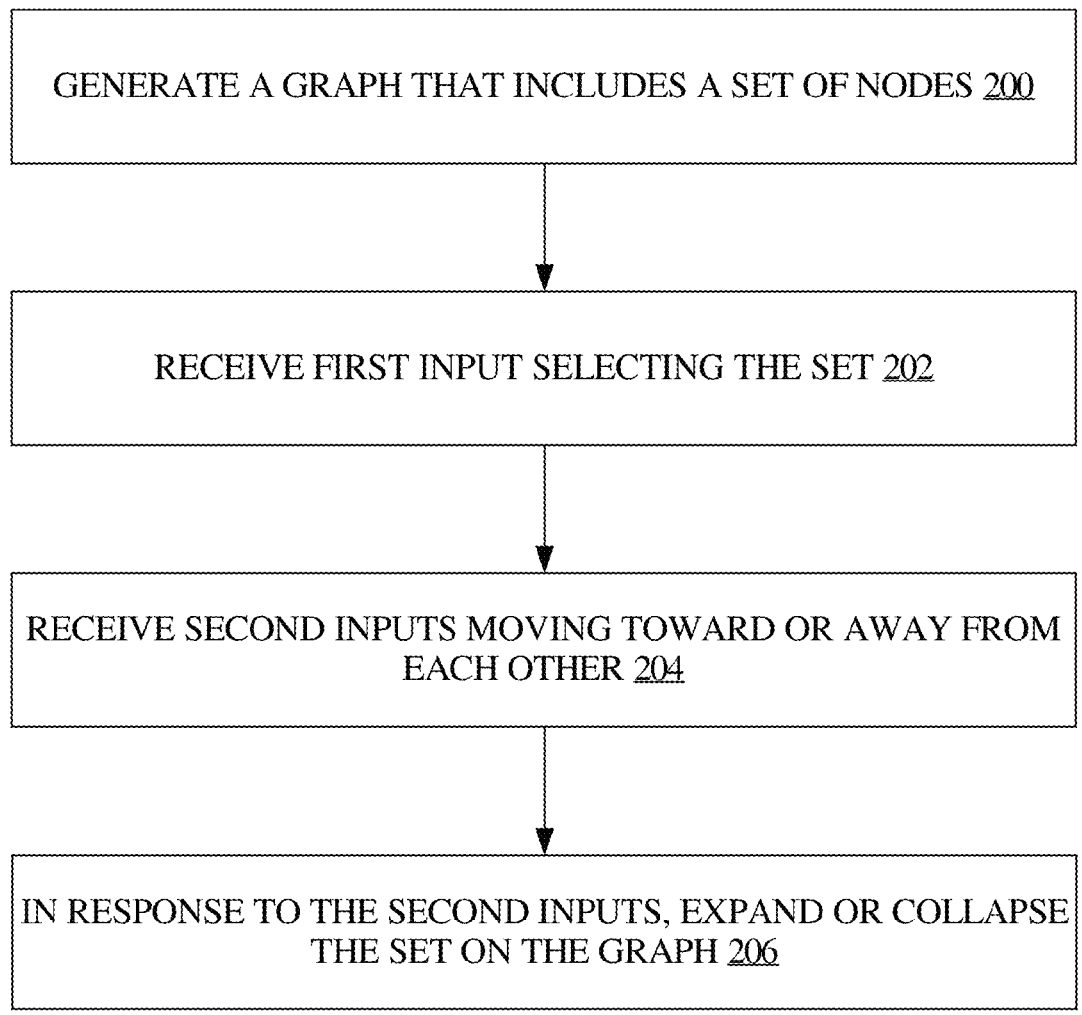
FIG. 2 illustrates a method for expanding or collapsing a set of nodes on a graph.

FIG. 2 illustrates a method for expanding or collapsing a set of nodes on a graph. In the method, computing device(s) are configured with specialized hardware and/or specialized software to generate, in block 200, a graph of nodes. The computing device(s) receive, in block 202, first input that selects a set of nodes on the graph. The set of nodes may be graphically presented as a single group node or as a tree of individual nodes. In block 204, the computing device(s) receive second inputs moving toward or away from each other. In response to second inputs that move toward each other, the tree of individual nodes may be collapsed into a group node in block 206. In response to second inputs that move away from each other, the group node may be expanded into a tree of individual nodes in block 206.

In one embodiment, a group node that is stored according to this technique may be a virtual node that references other stored nodes. The virtual node may be added when the group node is displayed and removed when the group node is not displayed. When nodes are collapsed into a group node, the data represented by nodes in the group may be merged into the group node in storage, or may remain stored as separate nodes. In another embodiment, the virtual node may be treated as a standard node that remains but is toggled as invisible when the group node is expanded. Similarly, the nodes in the group may be toggled as visible when the group node is expanded. In yet another embodiment, each node represented by a group node stores a name of a group to which the node belongs. In this embodiment, the group node may or may not be stored as a separate node.

Figure 3:
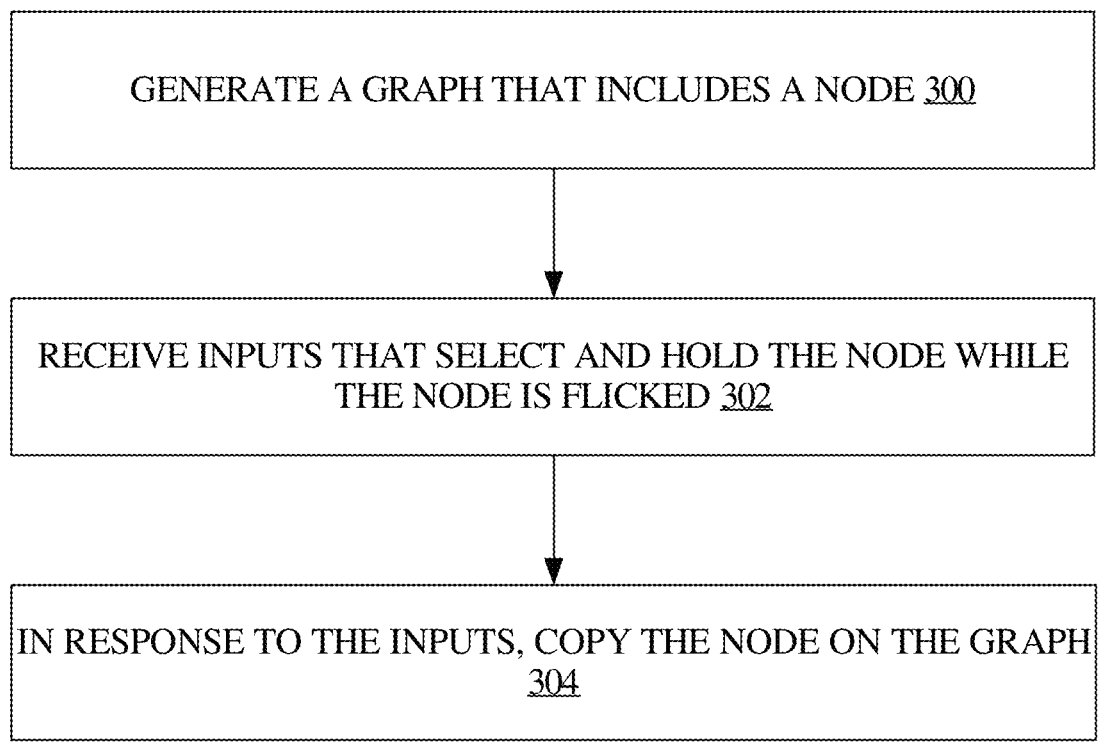
FIG. 3 illustrates a method for copying a node on a graph.

FIG. 3 illustrates a method for copying a node on a graph. In the method, computing device(s) are configured with specialized hardware and/or specialized software to generate, in block 300, a graph of nodes. The computing device(s) receive, in block 302, inputs select and hold a node while the node is flickedon the graph. In one example, the node is held in place in response to primary input, such as input from a first finger on a multi-touch screen, and the flicking is accomplished using a secondary input such as a second finger on the multi-touch screen. In response to the inputs, the node is copied on the graph in block 304.

In one embodiment, a copied node may be stored as a new and separate node in a data store. The copied node may later be changed to be different from the original node, or the copied node may remain the same as the original node. In another embodiment, copying a node causes the original node to be associated with multiple locations on the graph, without creating a separate node for the copy. For example, the node may appear at a first location defined by (50 pixels, 100 pixels) and at a second location defined by (200 pixels, 200 pixels). Other characteristics of the node might be stored once rather than multiple times, such as the color or type of the node.

3.0 Example Gesture-Based Interfaces 3.1 Connecting Nodes and Subtrees

In one embodiment, nodes may be connected to each other with or without an explicit change in mode on a toolbar. In one example, a node is treated as sticky such that touching the node to another node, or moving the node near (within a threshold distance of) another node even without touching, causes a connection to be formed between the node and the other node. The connection may be formed whenever nodes touch or are moved within a threshold distance of each other, even if the move is not complete. In other words, a connection may be formed between nodes even though one of the nodes is still being moved or otherwise actively controlled by the user. For example, the user may be touching and dragging a node on the graph as the node comes in contact with another node, and the connection may be formed between the nodes even though the user is still touching and dragging the node on the graph.

Alternatively, the connection between nodes may be formed whenever one node is held for a threshold amount of time in contact with or within a threshold distance of another node. For example, holding a node in contact with another node for at least half a second may cause a connection to be formed between the nodes, but holding the nodes in contact for less than half a second may have no effect. In another example, the user may be touching, dragging, and holding a node on the graph as the node comes within a threshold distance of another node for a threshold amount of time, and the connection may be formed between the nodes even though the user is still touching and holding the node on the graph. A node may be considered as being "held" by the input if the input causes the node to remain within a region or to be moved less than a threshold distance, even though the node may actually have moved slightly during the hold time.

In one embodiment, subtrees or groups of nodes may be connected to other subtrees or groups of nodes in the same manner that nodes are connected to each other. For example, a node subtree may be selected and moved near or in contact with another node or subtree. The connection may be formed immediately or after the nodes have been held near or in contact with each other for a threshold amount of time.

In one embodiment, the graph interface includes gesture interpretation logic for receiving user input, determining whether the user input matches any gestures, and causing actions that correspond to the matched gestures. In one example, user input may be copied to the gesture interpretation logic, and the gesture interpretation logic may be configured to interrupt, call, or update the node manipulation logic only when a gesture occurs. In this example, the gesture interpretation logic may operate independently or mostly independently of node manipulation logic by listening to input that is otherwise being handled by the node manipulation logic. In this manner, the node manipulation logic may operate without delay while the gesture interpretation logic performs the gesture mapping and triggers corresponding actions. For example, the node manipulation logic may receive input that selects and moves a node on a graph. While the node manipulation is fluidly moving the node on the graph, the gesture interpretation logic may determine whether the movements trigger any actions. If so, the gesture manipulation logic may trigger the corresponding actions with or without interrupting the node manipulation logic. Alternatively, the gesture interpretation logic may be integrated with the node manipulation logic such that gesture interpretations may be made in response to the user input but before the user input becomes effective on the graph.

In a particular example, the node manipulation logic receives input that moves and holds a node within 3 pixels of another node for 200 milliseconds. The gesture interpretation logic listens for this input checks gesture mappings to determine whether a registered condition is satisfied. One registered condition may specify that a new connection is created between nodes if the nodes are held within 5 pixels of each other for at least 250 milliseconds, and if the nodes are not already connected. In the example, the gesture interpretation logic may analyze the input to determine that the nodes have not yet been held near each other for the threshold amount of time. In one example, if a first amount of time has passed, the gesture interpretation logic may set an alarm to check the condition again when the threshold amount of time is predicted to have passed. In another example, the gesture interpretation logic may check registered conditions periodically or at specified times, with or without alarms.

If the gesture interpretation logic checks the condition again after the nodes have been held near each other for 250 milliseconds or 300 milliseconds, for example, then the gesture interpretation logic may find that the condition has been satisfied. In response to detecting that a condition has been satisfied, the gesture interpretation logic may cause an action associated with the condition. For example, the condition may be stored in a rule file, a rule table, or a rule class that associates the condition with a triggered action. In response to determining that the condition is satisfied, a corresponding action is triggered by against the graph. For example, the corresponding action may include creating a connection between the nodes that satisfied the condition.

FIGS. 5A-5E illustrate an example interface for connecting a node to other nodes by dragging and holding the node in contact with the other nodes. In the example, node 501 is dragged from location 501*a* to 501*b*, where node 501 touches node 502. If node 501 is held near or in contact with node 502 for a timeout t, then a connection 504 is formed between node 501 and 502. Connection 504 is visible as node 501 is dragged away from node 502. The process may be repeated to connect node 501 to node 503 with connection 505. The repetition of this process can be contiguous, without having to deselect and reselect the node 501.

FIGS. 6A-6H illustrate an example interface for connecting a subtree of nodes to other nodes by dragging and holding the subtree in contact with the other nodes. In the example, node tree 604-606 is selected by tapping on node 604 and holding node 604 as nodes 605 and 606 are selected using another finger. Node tree 604-606 is dragged to a location where node tree 604-606 touches node 602. If node tree 604-606 is held near or in contact with node 602 for a timeout t, then a connection 607 is formed between node 602 and node tree 604-606. In the example, the connection is formed between node 602 and 606, which is the node from node tree 604-606 that is closest to node 602. In other examples, the connection may be formed between node 602 and other nodes of node tree 604-606, or to node tree 604-606 as a whole. Connection 607 is visible as node tree 604-606 is dragged away from node 602. The process, optionally without repeating the sub-process of forming the initial selection, may be repeated to connect node tree 604-606 to nodes 601 and 603 with connections 608 and 609.

3.2 Inserting Nodes and Subtrees

In one embodiment, node(s) may be inserted on a connection between other nodes with or without an explicit change in mode on a toolbar. In one example, input that moves a node near a connection or on a connection between two other nodes causes the node to be inserted on the connection. In other words, a first connection between a first node and a second node is replaced with both a second connection between the inserted node and the first node, and a third connection between the inserted node and the second node. Another way of describing this same action is that the first connection is split into both the second connection and the third connection. Yet another way of describing this same action is that the first connection is connected to the inserted node instead of the second node, and a new connection is formed between the inserted node and the second node. From the user's perspective, these actions are all equivalent to inserting the node into the connection. The node may be inserted into the connection immediately whenever the node is moved on or near the connection, or after the node is held on or near the connection for a threshold amount of time.

In one embodiment, computing device(s) are configured with a gesture interpretation logic that receives or monitors input to a node manipulation logic. The gesture interpretation logic determines whether the input moves a node near a connection or on a connection between two other nodes. The gesture interpretation logic may also determine whether the node has been moved near or on the connection for at least a threshold amount of time. In response to determining that the node has been moved near or on the connection, optionally for at least the threshold amount of time, the gesture interpretation logic triggers the action of inserting the node on the connection by creating new connections on the graph between the node and other graph nodes that were previously connected to each other by the connection.

FIGS. 7A-7E illustrate an example interface for inserting a node on a connection between other nodes by dragging and holding the node over the connection. In the example, node 701 is dragged from location 701a to 701b, over connection 705, which connects node 702 to node 703. If node 701 is held over or near connection 705 for a timeout t, then new connection 705a is formed between node 702 and 701 and new connection 705b is formed between node 703 and 701. If node 701 is dragged away from location 701b, new connections 705a and 705b are visibly distinguished from former connection 705 because new connections 705a and 705b remain connected to node 701 and no longer form a direct connection between node 702 and node 703.

FIGS. 8A-G illustrate an example interface for inserting a subtree of nodes on a connection between other nodes by dragging and holding the subtree over the connection. In the example, node tree 803-806 is selected by tapping on node 804 and holding node 804 as nodes 805, 806, and 803 are selected using another finger. Node tree 803-806 is dragged to a location where node tree 803-806 is over or near connection 807, which connects node 801 to node 802. If node tree 803-806 is held over or near connection 807 for a timeout t, then new connection 807a is formed between node 801 and 803 and new connection 807b is formed between node 806 and 802. In the example, the connection is formed between nodes 801 and 803, which is the node from node tree 803-806 that is closest to node 801, and between 802 and 806, which is the node from node tree 803-806 that is closest to node 802. In other examples, the connection may be formed between node 801 and other nodes of node tree 803-806, or to node tree 803-806 as a whole. Similarly, the connection may be formed between node 802 and other nodes of node tree 803-806, or to node tree 803-806 as a whole. The selection of which node to form a connection from may be based on direct proximity to other nodes in the interface, or by parsing through the subtree in some logical fashion until a node is selected. If node tree 803-806 is dragged away, new connections 807a and 807b remain connected to node tree 803-806 and no longer form a direct connection between node 801 and node 802.

3.3 Tearing Nodes and Subtrees

In one embodiment, node(s) may be torn from a connection between other nodes with or without an explicit change in mode on a toolbar. In one example, input that shakes node(s) causes the node(s) to be torn from the connection. For example, shaking node(s) may trigger removal of connection(s) between the shaken node(s) and other node(s) on the graph. In another example, shaking node(s) may cause nodes on either side of the shaken node(s) to be connected to each other rather than being connected to the shaken node(s). In one embodiment, up-down input shakes the node(s) vertically. In another embodiment, side-to-side input shakes the node(s) laterally. Such input may be received, for example, when a user moves his or her finger back and forth on the screen once node(s) have been selected.

In one embodiment, a gesture interpretation logic receives or listens for input and detects shaking input when selected node(s) are moved back and forth rapidly, optionally above a threshold rate, above a threshold number of times, and/or within a threshold window of time. For example, the selected node(s) may be moved back and forth with an average velocity of 100 pixels per second, at least three times back and forth within a window of half a second. Other threshold values may also be used. In response to detecting that the input is shaking input, the gesture interpretation logic triggers an action of removing connection(s) between the selected node(s) and other node(s) on the graph.

FIGS. 9A-9D illustrate an example interface for tearing a node from a connection with other nodes by shaking the node. In the example, node 905, which is initially connected to nodes 902 and 904 with connections 907 and 908, respectively, is selected and shaken back and forth. If node 905 is shaken above a threshold rate or for longer than a threshold amount of time, node 905 is removed from node tree 901-904 and 906 by disconnecting the node from nodes 902 and 904. In the example, connections 907 and 908 are replaced with connection 909, which connects node 902 directly to node 904. In other words, the connections that were disconnected may be combined so as to not create a gap in the node tree 901-904 and 906 where node 905 previously existed.

FIGS. 10A-10D illustrate an example interface for tearing a subtree of nodes from a connection with other nodes by shaking the subtree. In the example, node tree 1002-1005 is selected by tapping on node 1003 and holding node 1003 as nodes 1004, 1005, and 1002 are selected using another finger. Node tree 1002-1005, which is initially connected to nodes 1001 and 1006 with connections 1007 and 1008, is shaken back and forth. If node tree 1002-1005 is shaken above a threshold rate or for longer than a threshold amount of time, node tree 1002-1005 is removed from node tree 1001 and 1006 by disconnecting the node tree 1002-1005 from nodes 1001 and 1006. In the example, connections 1007 and 1008 are replaced with connection 1009, which connects node 1001 directly to node 1006. In other words, the connections that were disconnected may be combined so as to not create a gap in the node tree 1001 and 1006 where node tree 1002-1006 previously existed.

3.4 Expanding Group Nodes and Collapsing Subtrees

In one embodiment, a set of nodes may be collapsed or expanded with or without an explicit change in mode on a toolbar. In one example, input that pinches or unpinches the set of nodes causes the set of nodes to be collapsed or expanded. Pinching input may be described as input that embodies an increasing distance between separate input points, and unpinching input may be described as input that reflects a decreasing distance between separate input points. In one example, the input points are locations of different fingers or styluses that are interacting with a touch screen. Pinching input and unpinching input may also be achieved by zooming in and out on a mouse, a remote control, or any other input device.

In one embodiment, a gesture interpretation logic receives or listens for input and detects pinching or unpinching input when input points increase or decrease above or near a selected group node or a selected set of nodes, or when a zoom-in or zoom-out input is received after either the group node or the set of nodes has been selected. The gesture interpretation logic may also determine whether the input points increase or decrease above a threshold amount, optionally within a window of time. In response to detecting pinching or unpinching input, the gesture interpretation logic triggers an action of expanding a group node to form a set of nodes or collapsing a set of nodes into a group node. The pinching/unpinching gesture may use two or more input points, depending on other gestures already supported on the interface. For example, two-point pinch/unpinch input may be mapped to zoom in/out functionality on the graph. In this example, the existing mapping may be overridden, or a new mapping may be created to map three-point pinch/unpinch input to expanding/collapsing functionality on the graph.

FIGS. 11A-11E illustrate an example interface for folding or collapsing a subtree of nodes into a group node by pinching nodes of the subtree together. In the example, node tree 1102-1105 is selected by tapping on node 1003 and holding node 1103 as nodes 1104, 1105, and 1102 are selected using another finger. Node tree 1102-1105, which is connected to nodes 1101 and 1106, is folded or collapsed into a group node 1108 that remains connected to nodes 1101 and 1106. Once node tree 1102-1105 has been selected, node tree 1102-1105 is collapsed into group node 1108 when any two nodes of node tree 1102-1105, or any location above or near node tree 1102-1105, is pinched together.

FIGS. 12A-12D illustrate an example interface for expanding a group node into a subtree of nodes by unpinching over the group node. In the example, group node 1202, which is connected to nodes 1201 and 1203, is selected and expanded into node tree 1204-1207 that remains connected to nodes 1201 and 1203. Group node 1202 is expanded into node tree 1204-1207 when group node 1202, or any location above or near group node 1202, is unpinched apart.

3.5 Connecting Node Ports

In one embodiment, node ports may be connected to each other with or without an explicit change in mode on a toolbar. In one example, a node port is treated as sticky such that touching the node port to another node port, moving the node port near (within a threshold distance of) another node port even without touching, or moving a node containing the node port near or in contact with another node containing the other node port, causes a connection to be formed between the node port and the other node port. The connection may be formed whenever node ports touch or are moved within a threshold distance of each other, or if the nodes containing the node ports are moved within a threshold distance of each other, even if the move is not complete.

Alternatively, the connection between nodes may be formed whenever one node port is held for a threshold amount of time in contact with or within a threshold distance of another node port, or whenever a node containing the node port is held for a threshold amount of time in contact with or within a threshold distance of another node containing the other node port.

In one embodiment, gesture interpretation logic receives or listens for input and detects port alignment input when the input aligns a port of a selected set of nodes with a port of another set of nodes. For example, selected node(s) may be spun with alignment input such as a hold input and a flick input, causing the selected node(s) to rotate until the port of the selected node(s) is aligned with a port of other node(s).

In another example, the gesture interpretation logic may automatically align selected node(s) to a compatible port of other node(s) even without the alignment input, in response to determining that the nodes or ports of the nodes are in contact or within a threshold distance of each other, and in response to determining that the nodes include at least one compatible port with each other. Ports may be compatible with each other based on port characteristic(s) such as the type of port, speed or reliability of the port, or protocol(s) that the port(s) are capable of handling. In an example, if there are multiple compatible ports between the selected node(s) and the other node(s), then a port of the selected node(s) and/or the other node(s) may be automatically selected for connection based at least in part on a distance between the port and the node to which the port is connecting. A port of the selected node that is closest to the other node may have a higher weight or higher likelihood of selection than a port of the selected node that is on the opposite side of, or furthest from, the other node. In another example, a port of the other node that is closest to the selected node may have a higher weight or higher likelihood of selection than a port of the other node that is on the opposite side of, or furthest from, the selected node.

Whether the ports are selected automatically by the gesture interpretation logic or manually via user interaction with the graph to select specific ports, the gesture interpretation logic may add the connection between selected ports when the ports are aligned and/or when the selected node is held within a threshold distance or in contact with the other node. Alternatively, the gesture interpretation logic may add a connection between compatible ports when the input causes a connection to be added, even if the compatible ports are not aligned by the input. The node ports maybe permanently shown on the interface, or hidden and shown based on threshold distance methods described above, or hidden and shown based on other user configurable preferences.

FIGS. 13A-13K illustrate an example interface for connecting a port of a node to ports of other nodes by dragging and holding the node near the other nodes. In the example, node 1301 is dragged within a threshold distance, d1, of node 1303. When node 1301 enters within the threshold distance, node ports 1301*a-c* and 1303*b-d* are displayed such that different options for connecting node 1301 to node 1303 are visible. In the example, node 1303 or node 1301 may be rotated such that compatible node ports, 1301*c* and 1303*c*, are closest to each other. As nodes 1301 and 1303 touch or become within another threshold distance, node port 1301*c* is connected to node port 1303*c*. The connection becomes visible as node 1301 is dragged away from node 1303. The process may be repeated to connect node port 1301*a* of node 1301 to node port 1302*a* of node 1302.

3.6 Copying Nodes

In one embodiment, node(s) may be copied with or without an explicit change in mode on a toolbar. In one example, input that flicks off of selected node(s) causes the selected node(s) to be copied, optionally in the direction of the flick. Flicking input may be described as input that starts at or near the selected node and moves away from the selected node before the input stops or fades. For example, the input may stop or fade as a finger lifts off of a touch screen display. In one embodiment, the flick may be caused by a single hand, with a first finger holding the selected node while a second finger, such as a thumb, flicks off of the selected node.

In one embodiment, gesture interpretation logic receives or listens for input and detects flicking input when the input starts at or near the selected node and moves away from the selected node before the input stops or fades. If the flick input occurs at or near selected node(s), the gesture interpretation logic may, in response to the flick input, copy the selected node(s) to a location on the graph near where the flick input stops or fades, to a side of the selected node(s) on the graph in the direction of the flick input, or to another location on the graph at or near the selected node(s). Multiple copies may be made as a selected node is dragged around the graph, dropping copies by flicking the copies off at various locations.

FIGS. 14A-G illustrate an example interface for copying a node by flicking off copies of the node as the node is dragged.

In the example, node 1401*a* is selected by tapping on node 1401*a* with a first finger. Node 1401*a* is then copied by flicking off a copy node 1401*b* with a second finger such as a thumb. In the example, Node 1401*a* is then dragged across the screen to various locations, dropping off copies 1401*c*, 1401*d*, and 1401*e*. The copies may be made in the different locations without deselecting node 1401*a* and without lifting the first finger.

4.0 Implementation Mechanisms—Hardware Overview

Figure 4:
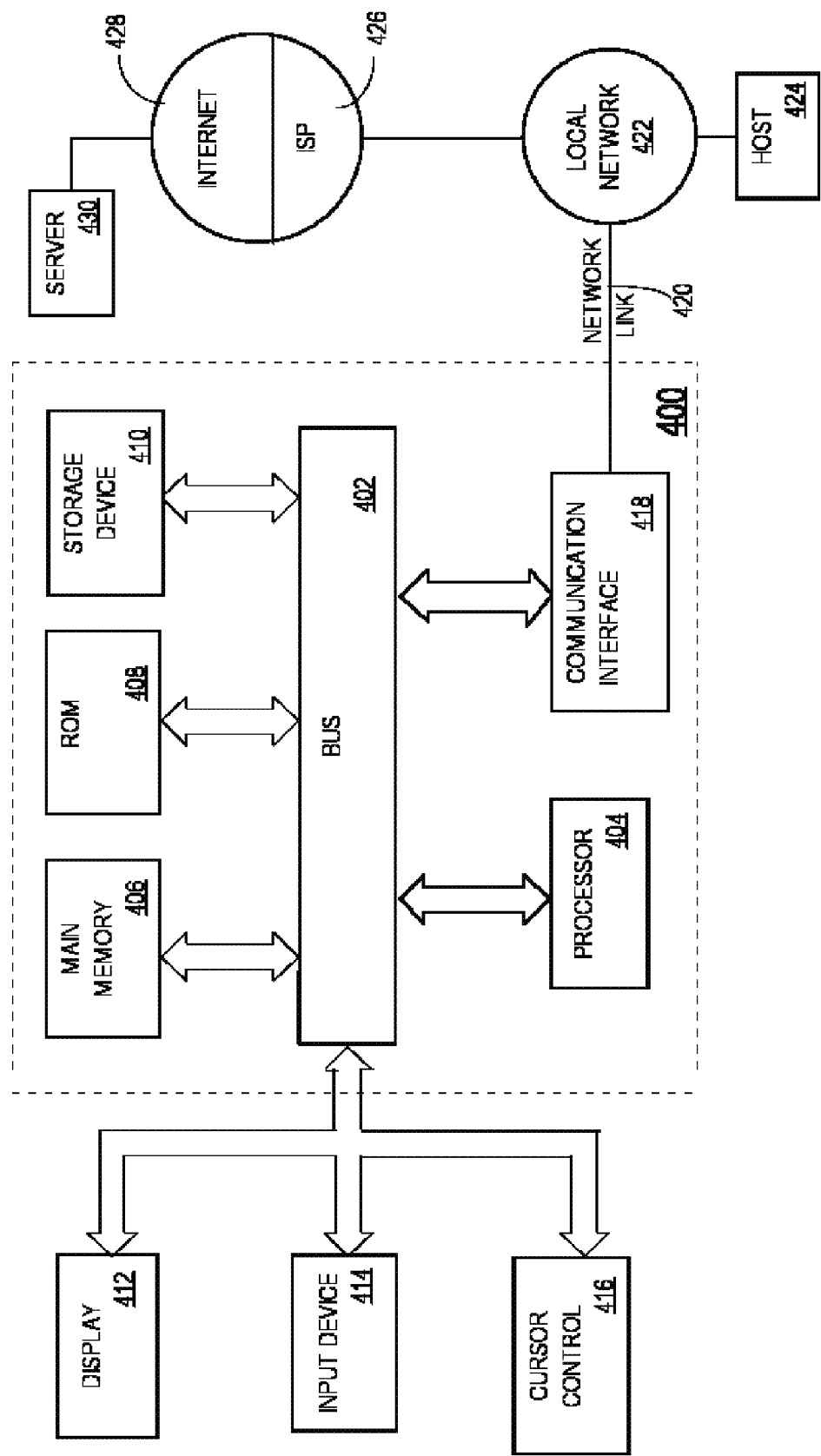
FIG. 4 illustrates an example computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

As used herein, the terms "first," "second," and "third" are used as naming conventions to distinguish different items from each other. For example, a discussion of "an item" and "another item" could be confusing if the items are referenced as "the item" and "the other item." This type of discussion is clearer if the items are named. The items could be named item A and item B, item X and item Y, or item 1 and item 2. As used herein, the chosen naming convention is "first item" and "second item." The naming convention itself is not intended to impart any characteristics or limitations to the named items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

generating a network topology graph comprising a first set of one or more graph nodes and a second set of one or more graph nodes, wherein the graph nodes represent network elements;

receiving, at a touch-sensitive display, touch input that selects and drags the first set on the network topology graph;

wherein the touch input drags the first set within a threshold distance of the second set or a particular connection to the second set and holds the first set within the threshold distance for a threshold amount of time;

in response to the touch input, adding or removing a graphical representation of a connection between the first set and the second set on the network topology graph;

wherein the first set remains selected for dragging by the touch input to enable another action;

maintaining the added or removed graphical representation of the connection between the first set and the second set on the network topology graph, while the touch input continues to drag the first set away from the second set to a third set or a distinct connection to the third set and holds the first set within the threshold distance for the threshold amount of time;

in response to the continued touch input, adding or removing a second graphical representation of a second connection between the first set and third set on the network topology graph while maintaining the added or removed graphical representation of the connection between the first set and the second set;

wherein the method is performed by one or more computing devices.

2. The method of claim 1, wherein the touch input drags the first set within the threshold distance of the second set and holds the first set within the threshold distance for the threshold amount of time, the method further comprising, in response to the touch input, adding the connection between the first set and the second set, wherein the graphical representation of the connection comprises a graphical indication that the connection was added.

3. The method of claim 2, wherein the first set comprises a first graph node and a second graph node; wherein the touch input includes multi-touch input that holds the first graph node while the second graph node is selected by only tapping the second graph node.

4. The method of claim 2, wherein the touch input dragging the first set within a particular threshold distance of the second set causes a first port of a first plurality of ports of the first set and a second port of a second plurality of ports of the second set to become visible;

wherein the touch input aligns the first port with the second port, and wherein the added connection is between the first port and the second port.

5. The method of claim 4, wherein the touch input that aligns the first port with the second port comprises multi-touch input that spins the first set.

6. The method of claim 2, wherein the connection is added between a first port of a first plurality of ports of the first set and a second port of a second plurality of ports of the second set, further comprising:

selecting the second port based at least in part on a distance between the second port and the first set; and selecting the first port based on a characteristic of the second port.

7. The method of claim 2, further comprising, in response to holding the first set within the threshold distance and for the threshold amount of time, providing another graphical indication as positive feedback that the connection was added other than the graphical representation of the connection.

8. The method of claim 1, wherein the touch input comprises a first move that drags the first set within the threshold distance of the second set and holds the first set within the threshold distance for the threshold amount of time, and wherein the touch input comprises a second move that drags the first set away from the second set, the method comprising, in response to the first move, adding the connection between the first set and the second set, and, in response to the second move, adding the graphical representation of the connection to the network topology graph, wherein the graphical representation of the connection spans from the first set to the second set on the network topology graph.

9. The method of claim 1, wherein the connection is a first new connection, wherein the touch input drags the first set over the particular connection to the second set comprising a previous connection between the second set and a third set of one or more graph nodes and holds the first set over the previous connection for the threshold amount of time, and, in response, inserting the first set between the second set and the third set on the network topology graph by replacing the previous connection with both the first new connection between the first set and the second set and a second new connection between the third set and the first set.

10. The method of claim 9, wherein the first set comprises a first graph node and a second graph node; wherein the touch input includes multi-touch input that holds the first graph node while the second graph node is selected.

11. The method of claim 1, wherein the threshold amount of time comprises at least half a second.

12. A method comprising:
generating a network topology graph comprising a set of two or more graph nodes, wherein graph nodes in the set represent network elements;
receiving, at a touch-sensitive display, a first touch input selecting the set;
receiving a multi-touch input comprising a second touch input moving toward or away from a third touch input;
in response to the multi-touch input, expanding or collapsing the set on the network topology graph;
wherein collapsing the set comprises replacing separately selectable graphical representations of the two or more graph nodes with a single selectable graphical representation of the two or more graph nodes, and wherein expanding the set comprises replacing the single selectable graphical representation of the set with the separately selectable graphical representations of each of the two or more graph nodes;
wherein the network topology graph further comprises at least one node external to the set;
wherein expanding the set enables adding or removing a graphical representation of a connection between the at least one graph node external to the set and at least one of the separately selectable graphical representations of the two or more graph nodes;
wherein the method is performed by one or more computing devices.

13. The method of claim 11, wherein the set comprises a first graph node and a second graph node, and wherein the touch input selecting the set includes multi-touch input that holds the first graph node while the second graph node is selected.

14. A method comprising:
generating a network topology graph comprising a set of one or more graph nodes, wherein graph nodes in the set represent network elements;
receiving, at a touch-sensitive display, multi-touch input comprising a first touch input and a second touch input;
wherein the first touch input selects and drags the set while the second touch input flicks the set;
in response to the multi-touch input, copying the set on the network topology graph;
receiving at the touch-sensitive display, a third touch input that flicks the set, while the first touch input continues to drag the set;
in response to the first touch input in combination with the third touch input, copying the set on the network topology graph to a different location;
wherein the method is performed by one or more computing devices.

15. One or more non-transitory computer-readable storage media storing instructions, the instructions which, when executed by one or more processors, cause performance of:
generating a network topology graph comprising a first set of one or more graph nodes and a second set of one or more graph nodes, wherein the graph nodes represent network elements;
receiving, at a computing device having a touch-sensitive display, touch input that selects and drags the first set on the network topology graph; wherein the touch input drags the first set within a threshold distance of the second set or a particular connection to the second set and holds the first set within the threshold distance for a non-instantaneous threshold amount of time;
in response to the touch input, adding or removing a graphical representation of a connection between the first set and the second set on the network topology graph
wherein the first set remains selected for dragging by the touch input to enable another action;
maintaining the added or removed graphical representation of the connection between the first set and the second set on the network topology graph, while the touch input continues to drag the first set away from the second set to a third set or a distinct connection to the third set and holds the first set within the threshold distance for the threshold amount of time;
in response to the continued touch input, adding or removing a second graphical representation of a second connection between the first set and third set on the network topology graph while maintaining the added or removed graphical representation of the connection between the first set and the second set.

16. The one or more non-transitory computer-readable storage media of claim 15, wherein the touch input drags the first set within the threshold distance of the second set and holds the first set within the threshold distance for the threshold amount of time, wherein the instructions, when executed, further cause, in response to the touch input, adding the connection between the first set and the second set, wherein the graphical representation of the connection comprises a graphical indication that the connection was added.

17. The one or more non-transitory computer-readable storage media of claim 16, wherein the first set comprises a first graph node and a second graph node; wherein the touch input includes multi-touch input that holds the first graph node while the second graph node is selected by only tapping the second graph node.

18. The one or more non-transitory computer-readable storage media of claim 16,
wherein the touch input dragging the first set within a particular threshold distance of the second set causes a first port of a first plurality of ports of the first set and a second port of a second plurality of ports of the second set to become visible;
wherein the touch input aligns the first port, and
wherein the added connection is between the first port and the second port.

19. The one or more non-transitory computer-readable storage media of claim 18, wherein the touch input that aligns the first port with the second port comprises multi-touch input that spins the first set.

20. The one or more non-transitory computer-readable storage media of claim 16, wherein the connection is added between a first port of a first plurality of ports of the first set and a second port of a second plurality of ports of the second set, wherein the instructions, when executed, further cause:
selecting the second port based at least in part on a distance between the second port and the first set; and
selecting the first port based on a characteristic of the second port.

21. The one or more non-transitory computer-readable storage media of claim 15, wherein the touch input comprises a first move that drags the first set within the threshold distance of the second set and holds the first set within the threshold distance for the threshold amount of time, and wherein the touch input comprises a second move that drags the first set away from the second set, wherein the instructions, when executed, further cause, in response to the first move, adding the connection between the first set and the second set, and, in response to the second move, adding the graphical representation of the connection to the network topology graph, wherein the graphical representation of the connection spans from the first set to the second set on the network topology graph.

22. The one or more non-transitory computer-readable storage media of claim 15, wherein the connection is a first new connection, wherein the touch input drags the first set over the particular connection to the second set comprising a previous connection between the second set and a third set of one or more graph nodes and holds the first set over the previous connection for the threshold amount of time, wherein the instructions, when executed, further cause, in response, inserting the first set between the second set and the third set on the network topology graph by replacing the previous connection with both the first new connection between the first set and the second set and a second new connection between the third set and the first set.

23. The one or more non-transitory computer-readable storage media of claim 22, wherein the first set comprises a first graph node and a second graph node; wherein the touch input includes multi-touch input that holds the first graph node while the second graph node is selected.

24. One or more non-transitory computer-readable storage media storing instructions, the instructions which, when executed by one or more processors, cause performance of:
generating a network topology graph comprising a set of two or more graph nodes, wherein graph nodes in the set represent network elements;
receiving, at a computing device having a touch-sensitive display, a first touch input selecting the set;
receiving a multi-touch input comprising a second touch input moving toward or away from a third touch input;
in response to the multi-touch input, expanding or collapsing the set on the network topology graph;
wherein collapsing the set comprises replacing separately selectable graphical representations of the two or more graph nodes with a single selectable graphical representation of the two or more graph nodes, and wherein expanding the set comprises replacing the single selectable graphical representation of the set with the separately selectable graphical representations of each of the two or more graph nodes;
wherein the network topology graph further comprises at least one node external to the set;
wherein expanding the set enables adding or removing a graphical representation of a connection between the at least one graph node external to the set and at least one of the separately selectable graphical representations of the two or more graph nodes.

25. The one or more non-transitory computer-readable storage media of claim 24, wherein the set comprises a first graph node and a second graph node, and wherein the touch input selecting the first set includes multi-touch input that holds the first graph node while the second graph node is selected.

26. One or more non-transitory computer-readable storage media storing instructions, the instructions which, when executed by one or more processors, cause performance of:
generating a network topology graph comprising a set of one or more graph nodes, wherein graph nodes in the set represent network elements;
receiving, at a computing device having a touch-sensitive display, multi-touch input comprising a first touch input and a second touch input;
wherein the first touch input selects and drags the set while the second touch input flicks the set;
in response to the multi-touch input, copying the set on the network topology graph;
receiving at the touch-sensitive display, a third touch input that flicks the set, while the first touch input continues to drag the set;
in response to the first touch input in combination with the third touch input, copying the set on the network topology graph to a different location.

\* \* \* \* \*